(12) United States Patent
Kim et al.

(10) Patent No.: US 9,830,075 B2
(45) Date of Patent: Nov. 28, 2017

(54) MOBILE TERMINAL AND CONTROL METHOD THEREOF

(71) Applicant: LG ELECTRONICS INC., Seoul (KR)

(72) Inventors: Samsick Kim, Seoul (KR); Donghwan Yu, Seoul (KR); Seojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 360 days.

(21) Appl. No.: 14/602,086

(22) Filed: Jan. 21, 2015

(65) Prior Publication Data
US 2016/0026381 A1 Jan. 28, 2016

(30) Foreign Application Priority Data

Jul. 25, 2014 (KR) ........................ 10-2014-0094939

(51) Int. Cl.
*G06F 3/048* (2013.01)
*G06F 3/0488* (2013.01)
(Continued)

(52) U.S. Cl.
CPC ......... *G06F 3/04886* (2013.01); *G06F 1/165* (2013.01); *G06F 1/1616* (2013.01);
(Continued)

(58) Field of Classification Search
None
See application file for complete search history.

(56) References Cited

U.S. PATENT DOCUMENTS 5,534,888 A * 7/1996 Lebby ................. G06F 1/1616
345/672
9,075,568 B1 * 7/2015 Gray ..................... G06F 1/1626
(Continued)

FOREIGN PATENT DOCUMENTS

EP 2129084 A1 12/2009
EP 2173082 A1 4/2010
(Continued)

OTHER PUBLICATIONS

Toshiba, "Toshiba Portégé R400 Defining the mobile avant-garde," http://uk.computers.toshiba-europe.com/Contents/Toshiba_uk/EN/Others/datasheets/PortegeR400_0707.pdf, XP055233988, Jul. 13, 2007, 2 pages.
(Continued)

*Primary Examiner* — William Trapanese
(74) *Attorney, Agent, or Firm* — Birch, Stewart, Kolasch & Birch, LLP

(57) ABSTRACT

A mobile terminal including a terminal body having an inner surface, an outer surface and side surfaces, and configured to be opened into an open state and closed into a closed state; a touch screen having first and second regions disposed on the inner surface, a third region disposed on the outer surface, and a fourth region disposed on the side surface between the first and third regions, in the closed state; and a controller configured to display an execution screen to at least one of the first and second regions in the open state, display information related to the execution screen on at least one of the third and fourth regions, based on a closed type of the terminal body corresponding folding closed the terminal body, and execute a function related to the displayed information.

27 Claims, 73 Drawing Sheets

(51) Int. Cl.
  *G06F 3/0487* (2013.01)
  *G06F 1/16* (2006.01)
  *H04M 1/02* (2006.01)
  *G06F 3/0481* (2013.01)
  *G06F 3/0482* (2013.01)
  *G06F 3/0484* (2013.01)

(52) U.S. Cl.
  CPC .......... *G06F 1/1641* (2013.01); *G06F 1/1647* (2013.01); *G06F 1/1652* (2013.01); *G06F 1/1677* (2013.01); *G06F 1/1692* (2013.01); *G06F 3/0482* (2013.01); *G06F 3/0487* (2013.01); *G06F 3/0488* (2013.01); *G06F 3/04817* (2013.01); *G06F 3/04845* (2013.01); *H04M 1/0214* (2013.01); *H04M 1/0245* (2013.01); *H04M 2250/16* (2013.01); *H04M 2250/22* (2013.01)

(56) References Cited

U.S. PATENT DOCUMENTS

| | | | | |
|---|---|---|---|---|
| 9,158,135 | B1 * | 10/2015 | Chaboud | G02F 1/0102 |
| 2008/0002115 | A1 * | 1/2008 | Polak | G02F 1/1347 |
| | | | | 349/114 |
| 2011/0216064 | A1 * | 9/2011 | Dahl | G06F 1/1616 |
| | | | | 345/428 |
| 2012/0066591 | A1 * | 3/2012 | Hackwell | G06F 3/0483 |
| | | | | 715/702 |
| 2012/0129581 | A1 * | 5/2012 | Choi | H04M 1/0218 |
| | | | | 455/575.3 |
| 2013/0222208 | A1 * | 8/2013 | Gorilovsky | G06F 1/1626 |
| | | | | 345/1.1 |
| 2014/0118258 | A1 * | 5/2014 | Park | G06F 1/1694 |
| | | | | 345/158 |

FOREIGN PATENT DOCUMENTS

| | | |
|---|---|---|
| EP | 2192750 A2 | 6/2010 |
| KR | 10-2011-0066165 A | 6/2011 |
| KR | 10-2014-0056510 A | 5/2014 |
| WO | WO 2010/028394 A1 | 3/2010 |

OTHER PUBLICATIONS

YouTube, "2014 Samsung Flexible OLED Display Phone and Tab Concept," https://www.youtube.6com/watch?v=MKG7XRsG9KQ, Published on Sep. 10, 2013, 2 pages.

YouTube, "iPhone 7—Innovative Screen," https://www.youtube.com/watch?v=impZ7krcPzl, Published on Dec. 6, 2013, 2 pages.

* cited by examiner

FIG. 20C(c″)
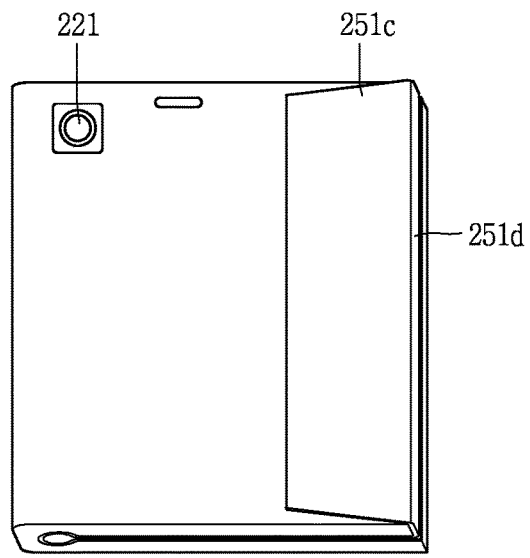
FIG. 21(a)
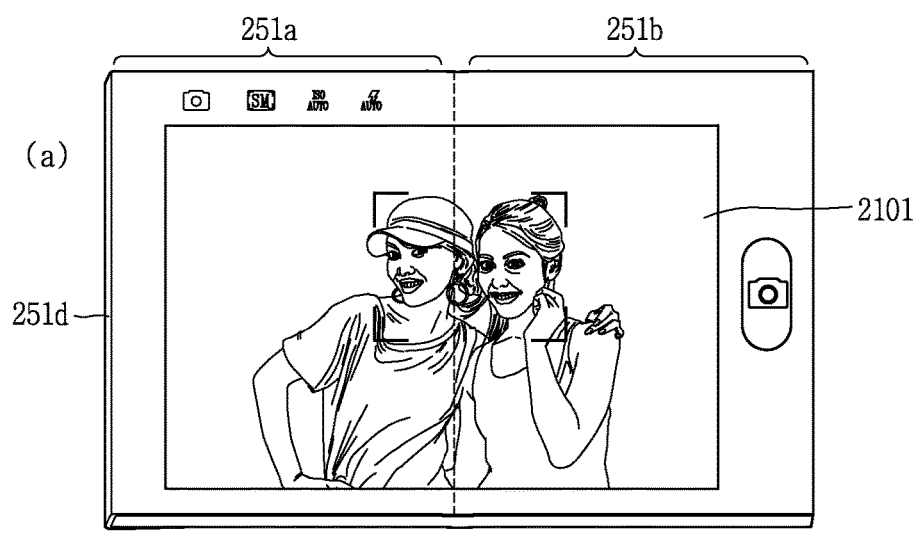

FIG. 21(b")
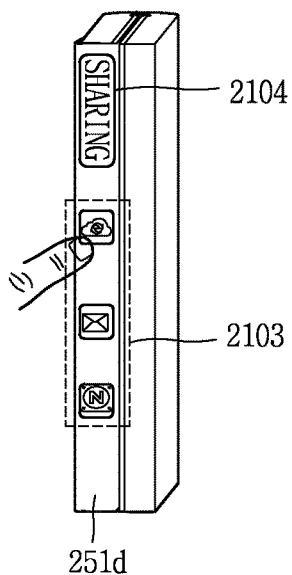
FIG. 22(a)
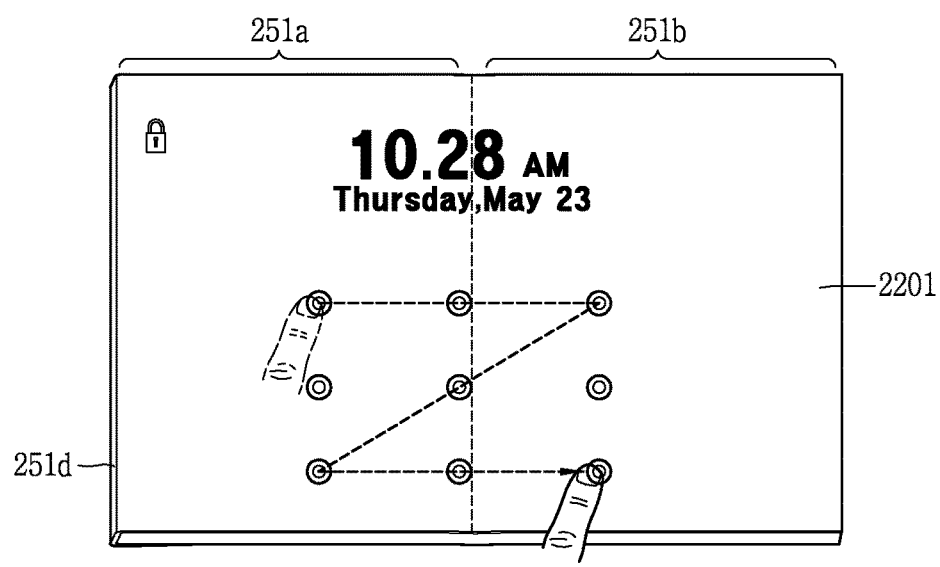

FIG. 23B(c")

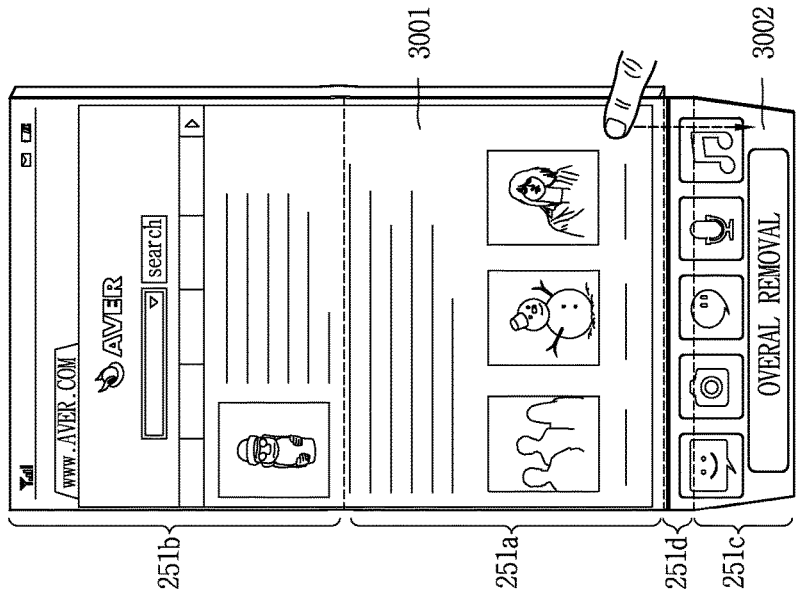
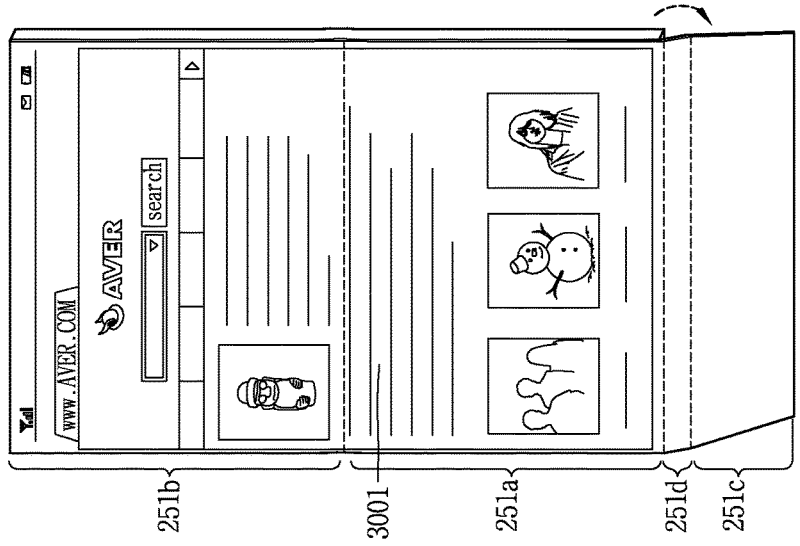

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2014-0094939, filed on Jul. 25, 2014, the contents of which is incorporated by reference herein in its entirety.

BACKGROUND OF THE INVENTION

1. Field of the Invention

This present invention relates to a mobile terminal having a display unit implemented as an inner display region extended up to an outer display region, and a control method thereof.

2. Background of the Invention

In general, a terminal may be classified into a mobile (portable) terminal and a stationary terminal. The mobile terminal may be also classified into a handheld terminal and a vehicle mounted terminal. As functions of the terminal become more diversified, the terminal can support more complicated functions such as capturing images or video, reproducing music, or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device using hardware or software. For instance, a user interface (UI) environment for allowing a user to search or select for functions easily and conveniently is being provided.

As the mobile terminal is regarded as a personal belonging for expressing a user's personality, various designs are required. The various designs include structural changes and modifications for allowing the user to use the mobile terminal in a more convenient manner.

SUMMARY OF THE INVENTION

Therefore, an aspect of the detailed description is to provide a mobile terminal capable of providing information related to a screen output to an inner display region, using a display extended to an outer side surface.

Another aspect of the detailed description is to provide a mobile terminal capable of informing an event which has occurred from an inner display region, or capable of inputting a control command with respect to a screen output to the inner display region, using a display extended to an outer side surface.

Still another aspect of the detailed description is to provide a mobile terminal capable of performing various functions by folding or unfolding an inner display region or a display extended to an outer side surface.

To achieve these and other advantages and in accordance with the purpose of this specification, as embodied and broadly described herein, there is provided a mobile terminal, including: a terminal body having an inner surface, an outer surface and side surfaces, and formed to be convertible into an open state where the inner surface is exposed to an upper side, and a closed state where the outer surface and the side surface are exposed to an upper side while the inner surface is covered; a touch screen having a first region and a second region disposed on the inner surface, a third region disposed on the outer surface, and a fourth region disposed on the side surface between the first region and the third region, in the closed state; and a controller configured to output an execution screen of at least one application to at least one of the first and second regions in the open state, and configured to display information related to the execution screen on at least one of the third and fourth regions, based on a closed type corresponding to an occurred folding event. When a touch input is applied to the region where the information has been displayed, the controller may execute at least one function related to the information.

In an embodiment, the mobile terminal may further include a sensing unit configured to sense the closed type by detecting a gradient change at the first and second regions when the folding event occurs. The controller may activate one of the third and fourth regions based on the detected closed type, such that the information related to the execution screen is displayed on the activated display region.

In an embodiment, upon detection of a first closed type where a gradient change is detected only from the first region, the controller may display a first image indicating the execution screen-related information, on the third region. Upon detection of a second closed type where a gradient change is detected from the first and second regions, the controller may display a second image indicating the execution screen-related information, on the fourth region. The first image may be different from the second image.

In an embodiment, upon detection of the first closed type, the controller may further activate the fourth region. When a drag input toward the fourth region from the third region is applied to the first image, the controller may change a size or a shape of the first image along a path of the drag input to thus extend up to the fourth region, and may perform a function corresponding to the first image.

In an embodiment, upon detection of the first closed type, the controller may further activate the fourth region. When a function corresponding to the first image is performed in the first closed type, the controller may display, on the fourth region, a third image associated with the execution of the function corresponding to the first image.

In an embodiment, the mobile terminal may further include a wireless communication unit configured to transmit and receive a message. The controller may display a message transceived through the wireless communication unit on the first and second regions in the open state. When a folding event occurs on the touch screen in a state where a written message has not been sent, the controller may display an icon for sending the written message on one of the third and fourth regions, based on a closed type corresponding to the folding event.

In an embodiment, when the folding event occurs in a state where at least one task is being performed on the execution screen, the controller may display a first icon indicating that the task is being performed, on one of the third and fourth regions, and may change the first icon into a second icon when the task is completed.

In an embodiment, the controller may block input of a control command applied to the third and fourth regions during the folding event. When the open state is converted into the closed state based on the folding event, the controller may activate one of the third and fourth regions and releases the blocking, based on a closed type corresponding to the folding event.

In an embodiment, the fourth region disposed on the side surface may extend from the third region and may be formed to have a predetermined curvature. When a folding event occurs on the display unit, the controller may control information on the execution screen to be displayed on the third region and part of the fourth region along the curvature, or only on the fourth region, based on a closed type corresponding to the folding event.

In an embodiment, when an event occurs from at least one application in the open state, the controller may output an alarm informing the event. When a drag input toward the fourth region from the first region is applied to one side of the first region in response to the alarm, the controller may execute a first function related to the event. When the drag input applied to one side of the first region is ended within the first region, the controller may execute a second function related to the event.

In an embodiment, wherein when the open state is converted into the closed state in response to the alarm, the controller outputs an image object related to processing of the event, to one of the third and fourth regions. When a drag input applied to the image object is out of a reference range, the controller may execute a third function related to the event.

When a touch input is not applied to one of the third and fourth regions where information on the execution screen has been displayed, for a preset time in the closed state, the information may disappear. When an opening event occurs in the closed state, the controller may control the disappeared information to be re-displayed or controls other information to be displayed, on one of the third and fourth regions.

In an embodiment, when the opening event occurs in a first closed state where the first region is folded to cover the second region, the controller may display information on the execution screen or other information on the execution screen, on the third region. When the opening event occurs in a second closed state where the fourth region is exposed to an upper side and the first region faces the second region, the controller may display information on the execution screen or other information on the execution screen, on the fourth region.

In an embodiment, when a touch input is applied to the fourth region in the second closed state, the controller may display icons of applications corresponding to the execution screen, based on a point where the touch input has been applied.

In an embodiment, when the open state is converted into the closed state in response to the folding event, and when the closed state is re-converted into the open state in a state where a touch input applied to one of the third and fourth regions where the information has been displayed is maintained, the controller may re-display a previously-output execution screen on at least one of the first and second regions, and may control a screen change due to execution of a function corresponding to the touch input, to be displayed on the execution screen.

In an embodiment, when the closed state corresponding to the folding event is a second closed type where the fourth region is exposed to an upper side and the first region faces the second region, the controller may sense a plurality of touch inputs applied to the fourth region. When an opening event occurs in the second closed state, the controller may convert a locked state of the mobile terminal into a released state, according to whether the plurality of sensed touch inputs match a preset pattern or not.

In an embodiment, the fourth region may be divided into a plurality of virtual regions, and the plurality of virtual regions may be generated based on an initial touch input applied to the fourth region. The plurality of touch inputs may mean touch inputs sequentially applied to at least one region in a preset order, the at least one region corresponding to the preset pattern among the generated virtual regions.

In an embodiment, among the plurality of touch inputs applied to the fourth region, the controller may ignore a touch input detected when the opening event occurs, or a touch input which has been detected before occurrence of the opening event to thus be maintained during the opening event.

In an embodiment, when the mobile terminal is converted into the released state, the controller may display icons of applications corresponding to the released state, on the fourth region. When the open state corresponding to the opening event is a first open type where only the first region has been unfolded, the controller may output, on the first region, screen information indicating events generated from applications corresponding to the released state. When the open state corresponding to the opening event is a second open type where only the second region has been unfolded while the fourth region is exposed to an upper side, the controller may output, to the second region, an execution screen of one of applications corresponding to the released state. When the open state corresponding to the opening event is a third open type where both the first region and the second region have been unfolded, the controller may output screen information indicating the event, and an execution screen of one of applications corresponding to the released state.

In an embodiment, the fourth region may be provided with a fingerprint recognition sensor. When an opening event occurs in the second closed state where the first region and the second region face each other and the fourth region is exposed to an upper side, the controller may perform a user authentication by activating the fingerprint recognition sensor, and the controller may convert a locked state into a released state based on a result on the user authentication.

In an embodiment, when an opening event occurs in the second closed state where the first region and the second region face each other and the fourth region is exposed to an upper side, the controller may display icons of executable applications on the fourth region. When an angle between the first region and the second region is equal to or more than a reference value, in a state where a touch input applied to one of the icons has been maintained, the controller may display, on the fourth region, additional information on an application corresponding to the selected icon.

In an embodiment, the third region may be provided with a fingerprint recognition sensor. When a touch event is detected from the third region in the first closed state where the first region is folded to cover the second region, the controller may perform a user authentication by activating the fingerprint recognition sensor, and the controller may convert a locked state into a released state based on a result on the user authentication. When the first closed state is converted into the second closed state where the fourth region is exposed to an upper side and the first region and the second region face each other, the controller may display information on the execution screen on the third region. When the third region is unfolded by a predetermined angle, the controller may generate a scroll bar on the fourth region, the scroll bar for up-down moving information output to the third region.

In an embodiment, when an event occurs in the first closed state where the first region is folded to cover the second region, the controller may display a notification icon indicating the event on the third region, and may control a different function to be executed according to a drag direction of a touch input applied to the notification icon.

In an embodiment, the mobile terminal may further include a camera disposed on the outer surface. When the camera operates in the open state, the controller may output a first captured image corresponding to a first capturing mode, to at least one of the first and second regions. When the closed state corresponding to the folding event is a first closed state where the first region covers the second region, the controller may convert the first capturing mode into a second capturing mode, and may output a second captured image corresponding to the second capturing mode to the third region.

In an embodiment, in one of the first capturing mode and the second capturing mode, when the open state or the first closed state is converted into the second closed state where the fourth region is exposed to an upper side and the first region and the second region face each other, the controller may display, on the fourth region, execution icons for sharing at least one of the first captured image and the second captured image.

In an embodiment, screen information corresponding to conversion of a locked state into a released state may be output to at least one of the first and second regions. When the open state is converted into the closed state corresponding to the folding event and a preset time lapses, the controller may re-convert the released state into the locked state. When a touch input corresponding to the folding event is maintained even in the closed state, the controller may maintain the released state.

When an event occurs from at least one application in the open state, the controller may output guide information for inducing the closed state, to the first region. When the event is ended in the closed state, the controller may output guide information for inducing the open state, to at least one of the third and fourth regions.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIGS. 22(a) to 22(c) are conceptual views illustrating a method of maintaining a released state in a closed state;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra hook, a wearable device (e.g. smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

Figure 1:
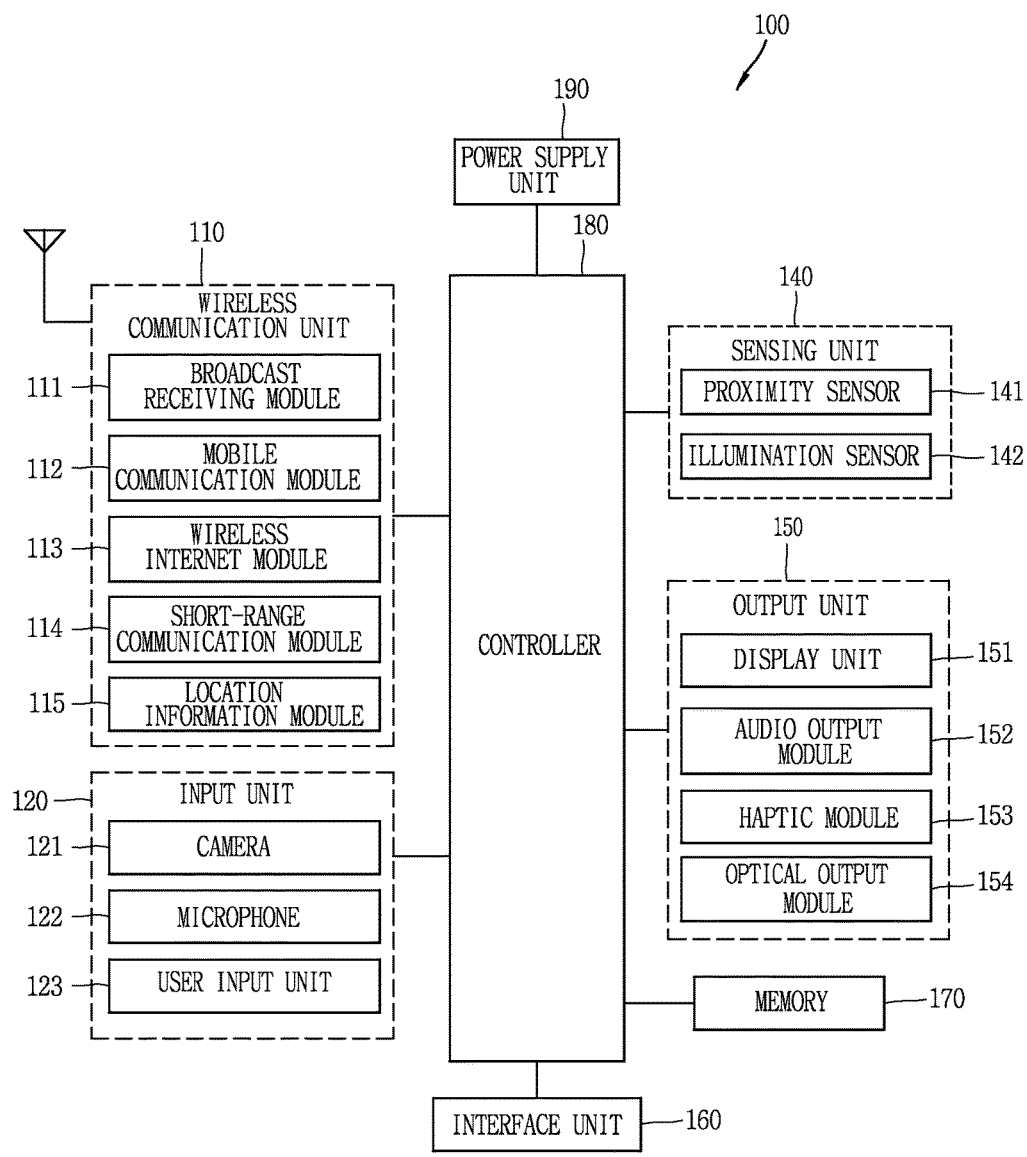
FIG. 1 is a block diagram of a mobile terminal according to an embodiment of the present invention.

FIG. 1 is a block diagram illustrating a mobile terminal 100 associated with a wearable device according to an embodiment of the present invention. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a (3-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The sensing unit 140 generates a sensing signal for controlling an operation of the mobile terminal 100, by sensing a current state of the mobile terminal such as an open or closed state of the mobile terminal 100, a position of the mobile terminal 100, whether a user has contacted the mobile terminal or not, an azimuth of the mobile terminal, and an acceleration/deceleration of the mobile terminal. For instance, when the mobile terminal 100 is a folded type mobile terminal, the sensing unit 140 may sense an open state of the mobile terminal 100 corresponding to unfolding, and a closed state of the mobile terminal 100 corresponding to folding.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100.

In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a UPS module, a position of the mobile terminal may be acquired using a signal sent from a UPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The sensing unit 140 generates a sensing signal for controlling an operation of the mobile terminal 100, by sensing a current state of the mobile terminal such as an open or closed state of the mobile terminal 100, a position of the mobile terminal 100, whether a user has contacted the mobile terminal or not, an azimuth of the mobile terminal, and an acceleration/deceleration of the mobile terminal. For instance, when the mobile terminal 100 is a folded type mobile terminal, the sensing unit 140 may sense an open state of the mobile terminal 100 corresponding to unfolding, and a closed state of the mobile terminal 100 corresponding to folding.

The display unit may be configured so that a different region can be exposed to an upper side, according to an open state or a closed state of the mobile terminal 100.

The display unit 151 may include a plurality of regions adjacent to each other. More specifically, the display unit 151 may include a first region and a second region which are exposed to an upper side in an open state, and a fourth region and a third region which are exposed to an upper side and a side surface extending from the front surface in a closed state. The first to fourth regions of the display unit 151 may be folded or unfolded in a preset direction. When the display unit 151 is configured as a stereoscopic display for displaying a stereoscopic image, a different stereoscopic image may be displayed according to a folding type and a folded degree of at least one of the first to fourth regions.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100 or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static: Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further, the display unit 151 may be formed to have a plurality of regions adjacent to each other, and may be configured so that at least part of the plurality of regions can be folded or unfolded in a preset direction. In an open state, the display unit 151 is configured so that all of the plurality of regions can be unfolded for display. In this instance, the state will be referred to as an 'extended open state' for distinguishment from when only a first region and a second region are exposed to an upper side. In a closed state, the display unit 151 is configured to have an outer surface (or a front region of an outer surface), an inner surface, and a side surface extending from the inner and outer surfaces, thereby having a larger screen.

Next, FIGS. 2A-2C and 3(*a*) to 3(*d*) include conceptual views illustrating an operation of the mobile terminal according to an embodiment of the present invention. Referring to FIG. 3(*a*), the display unit 251 includes a first inner display region 251*a* and a second inner display region 251*b* disposed at a left side and a right side on a front surface of the body, respectively, in an open state. The first inner display region 251*a* and the second inner display region 251*b* may be formed to be symmetrical, or may be formed such that one of them is larger than the other.

The first inner display region 251*a* and the second inner display region 251*b* may be folded or unfolded with respect to each other, with a predetermined angle, i.e., 0°~210° or 0°~360° according to a hinge structure. The first inner display region 251*a* and the second inner display region 251*b* may be defined as inner surface (inner side surface) display regions, since they are exposed to outside only in an open state. In the aforementioned extended open state, the first inner display region 251*a* (first region), the second inner display region 251*b* (second region), an outer display region 251*c* (third region) and a side display region 251*d* (fourth region) may be defined as inner display regions (see also FIGS. 2A-2C).

The open state means an exposed state of an inner surface of the mobile terminal, i.e., a state where a plurality of display regions disposed on an inner surface of the mobile terminal are exposed to an upper side by being unfolded based on a hinge portion. For instance, as shown in FIG. 3(*a*), a state where the first inner display region 251*a* and the second inner display region 251*b* are exposed to an upper side by being completely unfolded from each other may be referred to as an 'open state'. The state is similar to a state where a book has been unfolded.

In addition, a state where the first inner display region 251*a*, the outer display region 251*c* and the side display region 251*d* as well as the first region and the second inner display region 251*b* are completely unfolded to thus be exposed to an upper side, may be an 'extended open state'.

The mobile terminal 200 may be converted into a 'folded state' from the aforementioned open state, or vice versa. The folded state means a state where the first region or the second region is backward bent in the open state. The folded state occurs when a hinge portion between the first region and the second region is backward bent. The folded state may also occur when a hinge portion provided at least one between the first region and the second region, between the first region and the fourth region, and between the third region and the fourth region is backward bent.

As shown in FIG. 3(*a*), in the open state, an execution screen of at least one application, i.e., a dialogue screen 301 of a message application may be output to a total region of the first inner display region 251*a* and the second inner display region 251*b*. The dialogue screen output to the first inner display region 251*a* and the second inner display region 251*b* is merely exemplary. A graphic user interface (GUI) of an application being currently executed may be output to at least one of the first inner display region 251*a* and the second inner display region 251*b*.

When at least one of the first inner display region 251*a* and the second inner display region 251*b* has been deactivated, if a touch input is applied to the first inner display region 251a or the second inner display region 251b, or if the first inner display region 251a or the second inner display region 251b is unfolded after being bent a little upward/downward, at least one of the first inner display region 251a and the second inner display region 251b is converted into an activated state. Thus the aforementioned execution screen of at least one application may be output.

In this state, the sensing unit may sense a folding event occurring at the display unit. The folding event means that the first inner display region 251a and the second inner display region 251b first and second inner display regions) are folded to an approaching direction based on a hinge portion, as an external force is applied to a body which encloses the first inner display region 251a and the second inner display region 251b.

In an 'open state, if the 'Raiding event' that the first inner display region 251a and the second inner display region 251b are folded to face each other based on a hinge portion provided between the first inner display region 251a and the second inner display region 251b, the controller may recognize a closed type corresponding to the folding event.

The closed type corresponding to the folding event may include a first closed type to simultaneously fold the first inner display region 251a and the second inner display region 251b on each other; a second closed type to fold the first inner display region 251a so as to cover the second inner display region 251b, by much moving the first inner display region 251a while the second inner display region 251b is scarcely moved; and a third closed type to fold the second inner display region 251b so as to cover the first inner display region 251a, by moving the second inner display region 251b while the first inner display region 251a is scarcely moved. An open state of the mobile terminal 200 may be converted into a closed state by one of the first to third closed types.

Figure 2A:
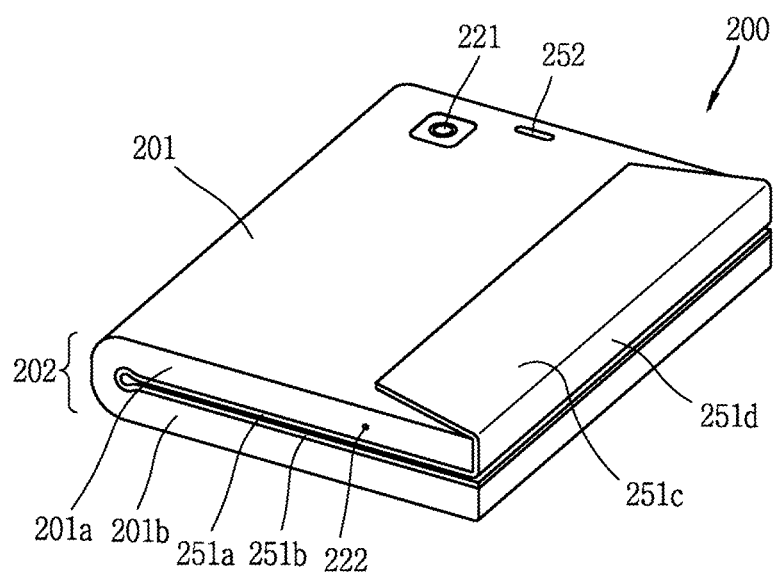
FIGS. 2A and 2B are views illustrating a closed state of a mobile terminal according to an embodiment of the present invention, which are viewed from different directions.
Figure 2B:
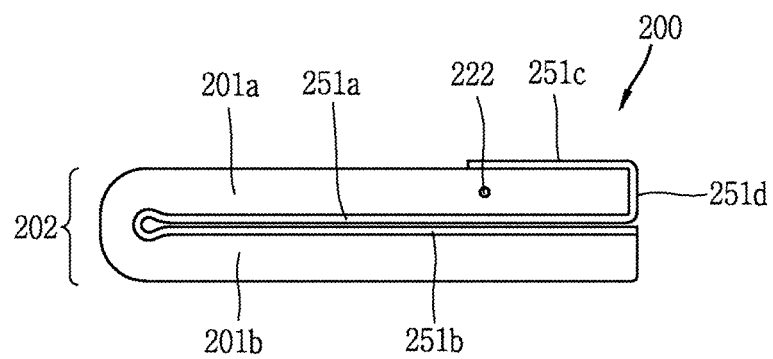

As shown in FIGS. 2A and 2B, the display unit 251 may be configured to include, in a closed state, a first inner display region 251a and a second inner display region 251b disposed on an inner surface of the mobile terminal 200, an outer display region 251c disposed on an outer surface of the mobile terminal 200, and a side display region 251d disposed on a side surface of the mobile terminal 200 by being extended from one side of the first inner display region 251a and one side of the outer display region 251c.

When the closed type is the first closed type, the mobile terminal 200 is closed so that the side display region 251d can be exposed to an upper side. When the closed type is the second closed type, the mobile terminal 200 is closed so that the outer display region 251c can be exposed to an upper side. When the closed type is the third closed type, the mobile terminal 200 is closed so that only a rear frame or a rear cover can be exposed to an upper side.

Figure 3A:
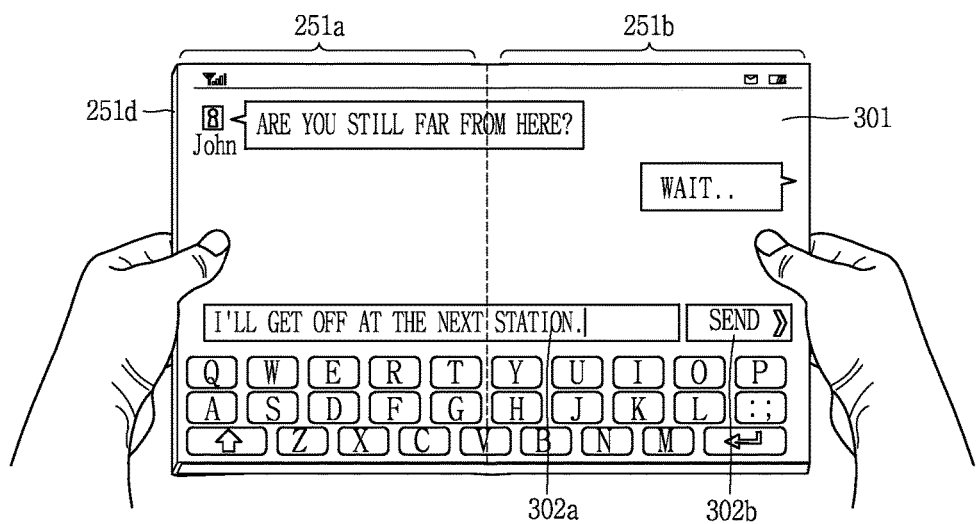
FIGS. 3(a) to 3(d) are conceptual views illustrating an operation of a mobile terminal according to an embodiment of the present invention.
Figure 3B:
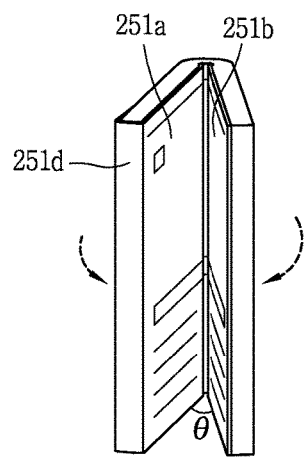

For instance, if a folding event to simultaneously fold the first inner display region 251.a and the second inner display region 251b occurs as shown in FIG. 3(b) the controller 180 displays information related to an execution screen output from the first inner display region 251a and the second inner display region 251b (e.g., chat window), on the side display region 251d disposed on a side surface of the mobile terminal 200 by being extended from one side of an inner display region and one side of an outer display region.

The information related to an execution screen is variable according to an output state and an output operation of an execution screen output to the inner display regions when a folding event occurs, a type of a corresponding application, etc. If a folding event occurs in a state of FIG. 3(a), the controller 180 can recognize a type of an application corresponding to a dialogue screen output to the first inner display region 251a and the second inner display region 251b, a lastly-executed task, a non-completed task, etc.

When an 'open state' of the mobile terminal is completely converted into a 'closed state' as the 'folding event' occurs, the controller may control information related to an execution screen, to be displayed on an outer display region.

The 'closed state' means a state where an outer surface of the mobile terminal has been exposed to outside. That is, the 'closed state' means a state where at least one of an outer display region and a side display region has been exposed to an upper side, as a plurality of display regions disposed on an inner surface of the mobile terminal are partially or wholly folded on each other based on a hinge portion. If the plurality of inner display regions of the Mobile terminal have been completely folded on each other based on the hinge portion, the first inner display region 251a and the second inner display region 251b are converted into a deactivated state.

A state where the inner display regions of the mobile terminal have been partially folded on each other may be determined as a closed state or an open state, according to a size of an angle formed between the inner display regions in response to a folding event.

That is, when an angle between the inner display regions is more than a reference angle may be defined as an open state. Further, when the angle between the inner display regions is less than the reference angle may be defined as a closed state. Thus, if the inner display regions are repeatedly folded or unfolded at an angle close to a reference angle, a closed state and an open state may be repeatedly converted to each other.

For instance, as shown in FIG. 3(b), if an angle between the first inner display region 251a and the second inner display region 251b is equal to or more than a reference angle ('θ'), no information may be displayed on the side display region 251d. And the first inner display region 251a and the second inner display region 251b may maintain an activated state.

Further, if the angle between the first inner display region 251a and the second inner display region 251b is decreased to a value less than the reference angle ('θ'), an open state may be converted into a closed state, and the first inner display region 251a and the second inner display region 251b are converted into a deactivated state. This is like an operation to fold two sides of a book so that a thickness of the book can be seen from a front side.

Figure 3C:
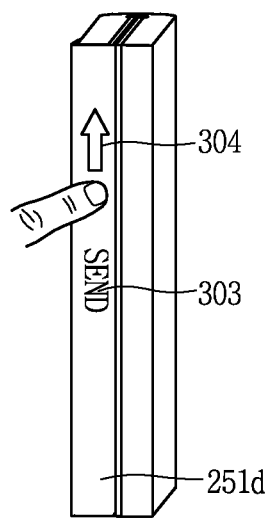

As shown in FIG. 3(c), information related to an execution screen which has been output to the first inner display region 251a and the second inner display region 251b is displayed on the side display region 251d. The information output to the side display region 251d in a closed state is different from information which has been output to the first inner display region 251a and the second inner display region 251b in an open state. For this, the first inner display region 251a, the second inner display region 251b and the side display region 251d may be divided from one another by different types of graphic user interfaces (GUIs).

More specifically, if a folding event to simultaneously fold the first inner display region 251a and the second inner display region 251b based on a hinge portion occurs, when a message 302a written on a dialogue screen 301 of FIG. 3(a) has not been sent yet (302b), an icon 304 for sending the written message 302a, and guide information 303 may be output to the side display region 251d.

The icon 304 may inform an input type of a control command, i.e., a drag direction of a touch input, in the form of an arrow (e.g., an upward drag touch input). "Send" indicating message transmission may be displayed on the guide information 303. If a flicking touch input is applied to a region where the guide information 303 has been displayed, the written message may be displayed in the form of a preview.

The icon 304 and the guide information 303 may be displayed based on a point where a user's touch input has been applied. For instance, if a folding event occurs in a state where a user has held (touched) a left lower end of the first inner display region 251a and a right lower end of the second inner display region 251b in a symmetrical manner, the icon 304 and the guide information 303 may be displayed at a position adjacent to the touch-applied point.

The icon 304 and the guide information 303 may be displayed in the form of a bar-type image long-formed along a side surface of the side display region 251d. Alternatively, the icon 304 and the guide information 303 may be displayed in the form of a moving image according to the amount of information to be displayed.

The display unit 151 may include a touch sensor configured to sense a touch input so that a touch input to the icon 304 can be implemented. The display unit 151, which was outputting visual information such as images (e.g., GUI), texts and icons, may be converted into a deactivated state if a predetermined time lapses or a specific control command is input.

When the icon 304 and the guide information 303 are output, a corresponding voice may be output through the audio output unit 252 (see FIG. 2A). For instance, a voice guidance, such as "please push a sending button upward (or downward) if you want to send a. message", may be output.

Figure 3D:
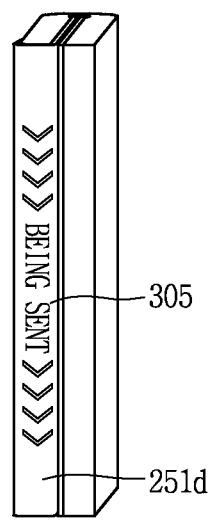

In this state, if a drag input (e.g., upward drag input) is applied to the icon 304 toward a direction indicated by the icon 304 displayed on the side display region 251d, the message 302a written in an open state of the mobile terminal is sent to another party's mobile terminal. That is, a task having not been completed in an open state may be consecutively performed in a closed state. While the message is sent, an image indicating that the message is being sent may be displayed on the side display region 251d as shown in FIG. 3(d). While the message is sent, the side display region 251d may be temporarily converted into a deactivated state (or input of a control command to the side display region 251d may be blocked).

Upon completion of the message transmission, an image indicating completion of the message transmission may be displayed on the side display region 251d for a preset time. Then the side display region 251d may be converted into an activated state, thereby sensing a subsequent input or preparing for a subsequent operation (e.g., 'opening event' to be explained later in more detail).

In addition, upon completion of the message transmission, information different from an execution screen which has been output to the first inner display region 251a and the second inner display region 251b can be displayed on the side display region 251d. For instance, icons of applications which have been recently executed on the first inner display region 251a and the second inner display region 251b, or icons of an application being currently executed on the first inner display region 251a and the second inner display region 251b may be displayed in a preset order.

Under such configuration, when a user has folded the mobile terminal without completing a task being executed on an inner display region in an open state, the rest of the task may be performed by using an outer display without re-opening the mobile terminal. This can allow a simple user interface to be implemented. Even in a closed state, information on a task lastly-executed on the inner display region or information on an application being currently executed may be provided. This allows information to be provided to a user in a novel manner.

Figure 2C:
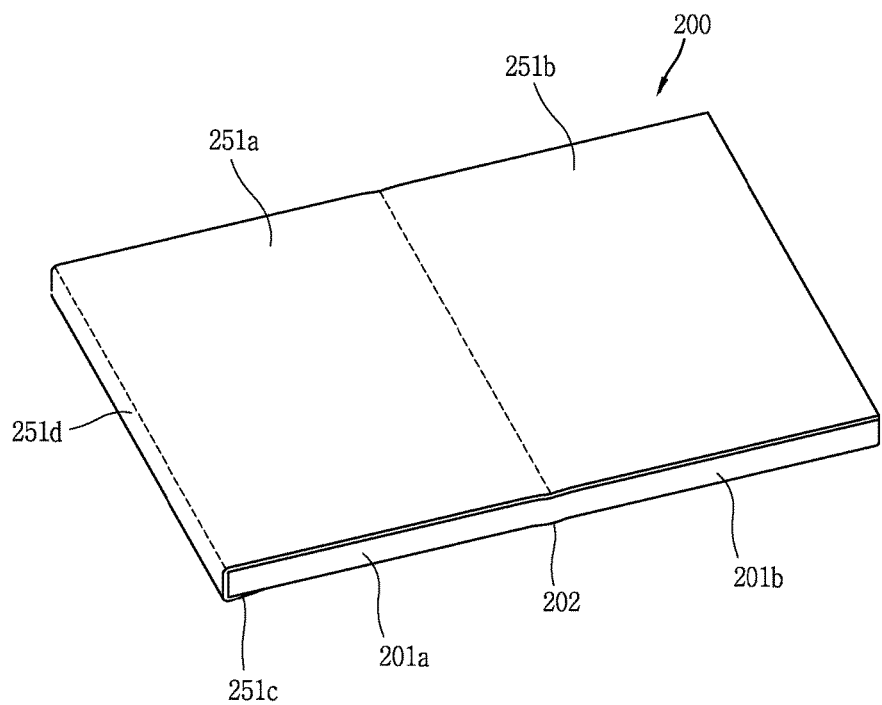
FIG. 2C is a view illustrating an open state of a mobile terminal according to an embodiment of the present invention.

Hereinafter, a hardware configuration of the mobile terminal which performs such operation will be explained in more detail with reference to FIGS. 2A to 2C. FIGS. 2A and 2B are views seen from different directions when the mobile terminal according to an embodiment of the present invention is in a closed state, and FIG. 2C is a view seen from a front side when the mobile terminal according to an embodiment of the present invention is in an open state.

The mobile terminal 200 of FIGS. 2A and 2B includes a folder type terminal body in a closed state. However, the present invention is not limited to this. The folder type terminal body may include a first body 201a, and a second body 201b formed as at least one side of the first body 201a has been folded or unfolded.

As shown in FIGS. 2A and 2B, when the first body 201a and the second body 201b are overlapped with each other, i.e., when the first body 201a and the second body 201b have been folded on each other based on a hinge portion 202, may be referred to as a closed configuration. In the closed state, the first body 201a and the second body 201b are arranged to face each other.

In the closed state, there are provided the display region 251c disposed on an outer front surface ('outer display region'), and the display region 251d extending from the outer display region 251c and arranged on a side surface of the mobile terminal ('side display region'). One side of the side display region 251d is extending to one side of the first and second inner display regions 251a and 251b covered by the first body 201a and the second body 201b.

In a closed state, the outer display region 251c, and the side display region 251d are in an exposed state, whereas the first and second inner display regions 251a and 251b are in a covered state. However, the plurality of display regions which can be folded or unfolded may form a single display by being connected to each other. In another embodiment, a plurality of display regions may be connected to each other, thereby forming the display unit 151 which can be folded or unfolded.

One side (e.g., an edge) of the outer display region 251c, and one side (e.g., an edge) of the side display region 251d may be partially covered by a case or a cover. In addition, the side display region 251d may be formed to have a predetermined curvature. In this instance, the outer display region 251c disposed on an outer front surface is connected to the side display region 251d in a rounded form. Thus, even when the outer display region 251c is exposed to a user's front side, at least part of the side display region 251d may be also exposed to a user's front side.

The hinge portion 202 is configured to support partial folding or whole folding of the first and second inner display regions 251a and 251b, based on a corresponding region. In a closed state, the first and second inner display regions 251a and 251b folded on each other by the hinge portion 202 are disposed at the first body 201a and the second body 201b, respectively. The hinge portion 202 may be folded at a specific angle within a predetermined angle (0°~180°) based on a connection part between the first and second inner display regions 251a and 251b (e.g., a central part), or at a specific angle within a predetermined angle (0°~360°) according to its structure.

The first body 201a and the second body 201b may include a case (casing, housing, cover, etc.) which forms appearance of the mobile terminal 200. In this embodiment, the case 201 may be divided into a front case and a rear case. Various types of electronic components are mounted at a space between the front case and the rear case. At least one intermediate case may be additionally disposed between the front case and the rear case.

The case 201 may be formed by injection-molding synthetic resin or may be formed of a metal, for example, stainless steel (STS), aluminum (Al), titanium (Ti) or the like. The outer display region 251c, the audio output unit 252, the camera module 221, etc. may be disposed at one side of the case which forms the appearance of the first body 201a (i.e., the front case). The hinge portion 202 may be disposed at one side surface (e.g., left side surface) extending from the front case, and the side display region 251d extending toward the inner display regions may be disposed at another side surface (e.g., right side surface).

The outer display region 251c and the side display region 251d are configured to display visual information related to information processed by the first and second inner display regions 251a and 251b of the mobile terminal 200. For instance, the outer display region 251c and the side display region 251d may display information on an execution screen of an application program driven by the mobile terminal 200, or information on user interface (Up and graphic user interface (GUI) by the execution screen information, and various UI and GUI information related to an execution screen processed by the first and second inner display regions 251a and 251b.

The display unit may include at least one of a liquid crystal display (LCD), a thin film transistor-liquid crystal display (TFT-LCD), an organic light emitting diode (OLED), a flexible display, a 3-dimensional (3D) display and an e-ink display.

As another example, the display unit may be a flexible display unit. The flexible display unit includes a display which can be curved, bent, twisted, folded and rolled by an external force. The flexible display unit may include a general flexible display and electronic paper (also known as e-paper).

The general flexible display means a display which can be bent, curved or folded like paper, while maintaining the conventional flat display characteristic. Further, the general flexible display means a light and non-breakable display fabricated on a thin and flexible substrate. The term e-paper may be used to refer to a display technology employing the characteristic of a general ink, and is different from the conventional flat panel display in view of using reflected light. E-paper is generally understood as changing displayed information (images or texts) using a twist ball or via electrophoresis using a capsule.

The terminal body configured so that at least part of the display unit can be folded or unfolded due to its flexible material characteristic may be implemented. The display unit may include a touch sensor for sensing a touch input applied to the display unit, so that a control command can be input according to a touch type. Once a touch input is applied to the outer display region 251c and the side display region 251d, the touch sensor may sense the touch input, and the controller may generate a control command corresponding to the touch input. Content which is input in a touching manner may be a text or numerical value, or a menu item which can be indicated or designated in various modes.

The touch sensor may be configured in a form of a film having a touch pattern, and may be disposed between a window and a display on a rear surface of the window. Alternatively, the touch sensor may be a metal wire which is patterned directly on the rear surface of the window. Still alternatively, the touch sensor may be integrally formed with the display. For example, the touch sensor may be disposed on a substrate of the display or within the display.

The display unit may form a touch screen together with the touch sensor. In this instance, the touch screen may function as the user input unit 123 (refer to FIG. 1). Characteristics of the display unit are equally applied to the first and second inner display regions 251a and 251b so as to be connected to the side display region 251d.

That is, the display unit is disposed on part of a front surface, and a side surface of the mobile terminal in a closed state, and is configured to display visual information. The display unit is formed to be extended up to an inner surface of the mobile terminal, as well as a front surface and a side surface of the mobile terminal. More specifically, the display unit includes a first inner display region 251a, a second inner display region 251b, an outer display region 251c and a side display region 251d. The first inner display region 251a and the second inner display region 251b are disposed on a front surface of the mobile terminal in an open state. The outer display region 251c is extending from the first inner display region 251a, and is disposed on part of a front surface of the mobile terminal in a closed state. The side display region 251d is disposed on a side surface of the mobile terminal in a closed state.

The audio output unit 252 may be disposed on part of an entire region where the outer display region 251c has been arranged, and may include an aperture to permit generated audio to pass. One alternative is to allow audio to be released along an assembly gap between structural bodies (for example, a gap between the window and the front case). In this instance, a hole independently formed to output audio may not be seen or is otherwise hidden in terms of appearance, thereby further simplifying the appearance of the mobile terminal 200. In addition, the audio output unit 252 may be further provided on a rear surface of the mobile terminal 200.

The camera module 221 may be disposed on part of an entire region where the outer display region 251c has been arranged, close to the audio output unit 252. The camera module 221 processes image frames of still pictures or video obtained by image sensors in a video or image capture mode. The processed image frames may be displayed on the display unit 151 (especially, on the outer display region 251c), or may be stored in memory 170.

A camera module may be additionally provided on an inner surface of the terminal body. In this instance, the camera module may face a direction which is opposite to a direction faced by the camera module 221, and may have different pixels from those of the camera module 221.

For example, the camera module 221 may operate with relatively lower pixels (lower resolution). Thus, the camera module 221 may be useful when a user can capture his face and send it to another party during a video call or the like. Further, the camera module may operate with a relatively higher pixels (higher resolution) such that it can be useful for a user to obtain higher quality pictures for later use. Such camera modules may be installed at the terminal body so as to rotate or pop-up.

In addition, a rear input unit may be provided on a rear surface of the mobile terminal 200, as another example of the user input unit 123. The rear input unit may receive various commands for controlling an operation of the mobile terminal 200. For instance, the rear input unit is configured to input commands such as POWER ON/OFF, START, END and SCROLL, and is configured to input commands for controlling a level of sound output from the audio output unit 252, or commands for converting the current mode of the display unit to a touch recognition mode. The rear input unit may be configured to receive a touch input, a push input, or a combination thereof.

The mobile terminal 200 of FIG. 2C includes a folder type terminal body in an open state. As shown in FIG. 2C, the open state of the mobile terminal 200 may indicate a state where the first and second inner display regions 251*a* and 251*b* have been exposed to an upper side, as the first body 201*a* and the second body 201*b* rotate in a direction to move far from each other. That is, the open state may indicate a state where the first body 201*a* and the second body 201*b* have been unfolded from each other based on the hinge portion 202.

Under this state, the plurality of inner display regions 251*a* and 251*b* connected to each other are exposed to an upper side. For instance, the first inner display region is disposed at a left region of the mobile terminal 200, and the second inner display region is disposed at a right region of the mobile terminal 200. The aforementioned side display region 251*d* is disposed at a left side of the first inner display region 251*a*, in an extending manner.

As the first inner display region 251*a* is exposed to an upper side, the outer display region 251*c* connected to the side display region 251*d* is covered by contacting the floor. The covered outer display region 251*c* may be unfolded toward an upper side together with the side display region 251*d*, while maintaining an open state of the mobile terminal. Thus, the mobile terminal may be converted into the aforementioned 'extended open state'.

In this instance, the display unit may have a larger screen, since the first inner display region 251*a*, the second inner display region 251*b*, the side display region 251*d*, and the outer display region 251*c* are connected to one another. In an open state, part of the side display region 251*d* may be independently operated from the first inner display region 251*a* and the second inner display region 251*b*.

In an extended open state, the outer display region 251*c* and the side display region 251*d* may be independently operated from the first inner display region 251*a* and the second inner display region 251*b*. Especially, in an extended open state, screen information different from an execution screen output to the first inner display region 251*a* and the second inner display region 251*b* may be output to the outer display region 251*c* and the side display region 251*d*. Alternatively, the outer display region 251*c* and the side display region 251*d* may be configured to receive a specific control command for controlling an output of an execution screen to the first inner display region 251*a* and the second inner display region 251*b*.

In another embodiment, screen information output to the first inner display region 251*a* and the second inner display region 251*b* is extended up to the side display region 251*d*. Thus, a user can use the display unit by extending the current execution screen into a larger size.

An accessory for protecting an appearance or assisting or extending the functions of the mobile terminal. 200 can also be provided on the mobile terminal 200. As one example of an accessory, a cover or pouch for covering or accommodating at least one surface of the mobile terminal 200 may be provided. The cover or pouch may cooperate with the display unit 251 to extend the function of the mobile terminal 200. Another example of the accessory is a touch pen for assisting or extending a touch input to a touch screen.

The touch pen may be coupled to the mobile terminal 200, by being inserted into a hinge portion provided between the first inner display region 251*a* and the second inner display region 251*b*.

As aforementioned, the controller of the mobile terminal 200 may generate a control signal for controlling a screen output to an inner display region, using the outer display region in an open state or a closed state. Alternatively, the controller 180 can generate a control signal related to a specific function.

Figure 4:
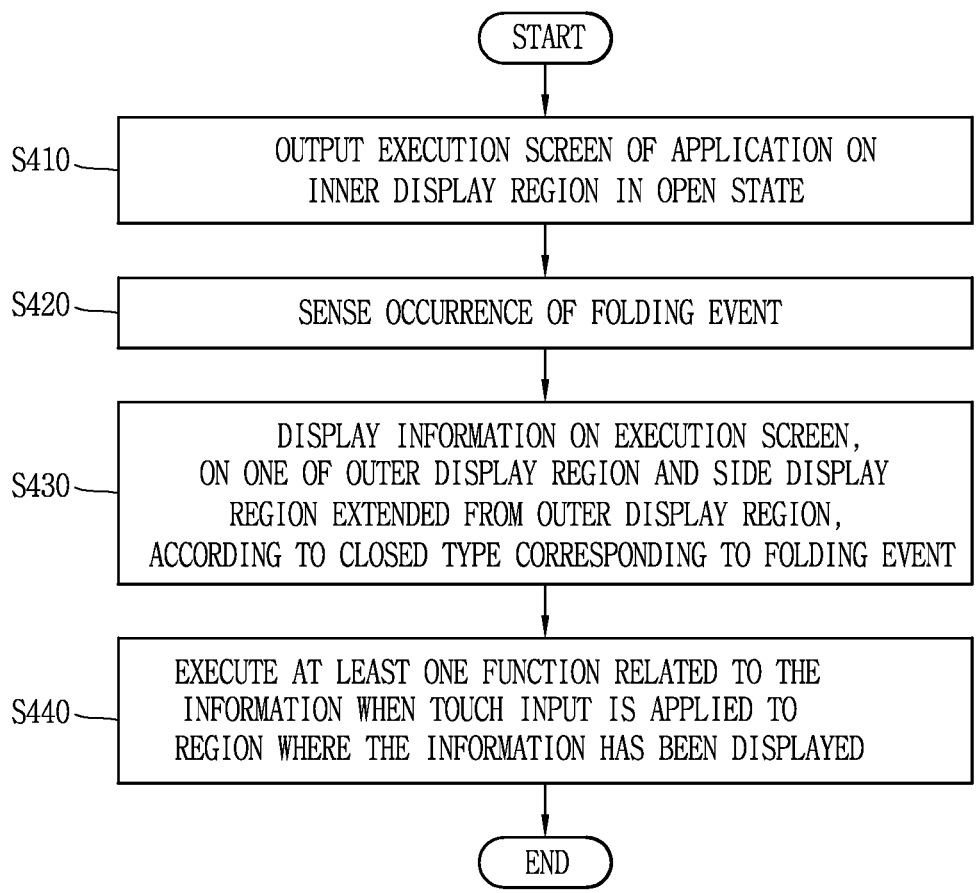
FIG. 4 is a flowchart illustrating a method of controlling a mobile terminal according to an embodiment of the present invention.

Hereinafter, a method of outputting information related to a screen output to an inner display region and controlling a specific function, by combining an open state or a closed state of the mobile terminal, with an inner display region, an outer display region and a side display region will be explained in more detail. In particular, FIG. 4 is a flowchart illustrating a control method according to an embodiment of the present invention, and FIGS. 5(*a*) to 5(*c*) are conceptual views illustrating FIG. 4.

In an open state, the controller 180 can output an execution screen of at least one application, to an inner display region of the mobile terminal 200 (5410).

As aforementioned, the open state means an exposed state of an inner surface of the mobile terminal, i.e., a state where a plurality of display regions disposed on an inner surface of the mobile terminal are exposed to an upper side by being partially or wholly unfolded based on a hinge portion. For instance, as shown in FIG. 5(*a*), when the first inner display region 251*a* and the second inner display region 251*b* are exposed to an upper side by being completely unfolded from each other, may be referred to as an 'open state'. The state is similar to when a book has been unfolded.

In addition, in an extended open state where the first inner display region 251*a* and the second inner display region 251*b* have been completely unfolded, and where the first inner display region 251*a*, the outer display region 251*c* and the side display region 251*d* have been completely or almost unfolded to be exposed toward an upper side, an execution screen of at least one application can be output to an extended inner front surface display.

When converting an open state where an execution screen of at least one application is being output to an inner front surface display, into an extended open state, the execution screen can be output up to the outer display region 251*c* and the side display region 251*d* (extended displays). Alternatively, screen information related to other application (e.g., icons or an execution screen corresponding to other application, etc.) may be output to the outer display region 251.*c* and the side display region 251*d* (extended displays).

When at least one of the first inner display region 251*a* and the second inner display region 251*b* is in a deactivated state, if a touch input is applied to the first inner display region 251*a* or the second inner display region 251*b*, or if the first inner display region 251*a* or the second inner display region 251*b* is unfolded by being upward/downward bent a little, at least one of the first inner display region 251*a* and the second inner display region 251*b* can be converted into an activated state. Thus, the execution screen of at least one application can be output to at least one of the first inner display region 251*a* and the second inner display region 251*b*.

In this instance, any type of applications may be output to the inner front surface display. More specifically, applications may be referred to as 'application programs', which mean all types of programs which can be driven in the mobile terminal. Such applications may be programs related to a web browser, moving image play, schedule management, calls, games, music, document tasks, messages, finance, e-books, traffic information, application update, etc. Thus, an execution screen of applications means various visual information output to the display unit and a screen change, which result from as the applications are executed.

Figure 5A:
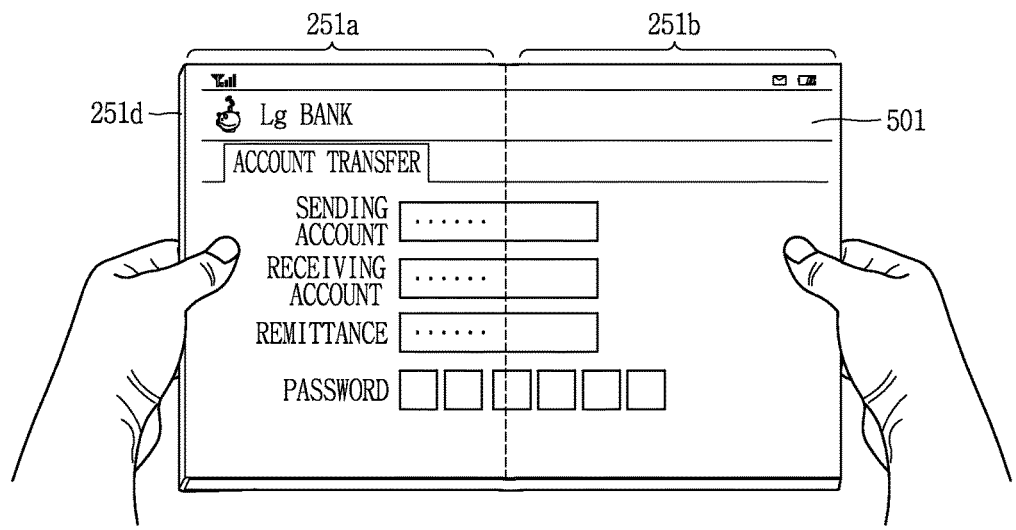
FIGS. 5(a) to 5(c) are conceptual views illustrating the flowchart of FIG. 4.

For instance, as shown in FIG. 5(a), screen information 501 for performing a finance application and an account transfer are output to a single screen connected to a first inner display region 251a disposed on a left front surface, and a second inner display region 251b disposed on a right front surface. When the mobile terminal operates in a first mode, a single screen can be output to the first inner display region 251a and the second inner display region 251b.

When the mobile terminal operates in a second mode, a screen can be output to one of the first inner display region 251a and the second inner display region 251b, or different screens can be output to the first inner display region 251a and the second inner display region 251b. When the mobile terminal operates in a third mode, a single screen can be output to the first inner display region 251a, the second inner display region 251b, an outer display region 251c and a side display region 251d, or different screens can be output to the outer display region 251c and the side display region 251d. In this embodiment, the mobile terminal may operate in the first mode, in the second mode, or in the third mode.

In this state, the controller 180 can sense that a folding event has occurred on the display unit 251, through the sensing unit (S420). The folding event may mean that the first inner display region 251a and the second inner display region 251b (i.e., inner front surface displays) are folded on each other toward an approaching direction based on a hinge portion, as an external force is applied to a body corresponding to one region of the display unit (i.e., the first inner display region 251a and the second inner display region 251b) in an open state. Alternatively, the folding event may mean that the outer display region 251c and the side display region 251d displayed on an inner front surface in an 'extended open state' are backward bent to be disposed on an outer side surface.

The sensing unit 140 of the mobile terminal may sense whether a folding event has occurred or not, using at least one of a gyro sensor, a geomagnetic sensor, an acceleration, sensor and an illumination sensor. The sensing unit 140 senses a tilted angle (or folded angle) of a specific display region, based on a ground surface. Results on the sensing are sent to the controller 180.

The sensing unit 140 may sense not only a folding angle corresponding to a folding event, but also an arrangement angle of the mobile terminal. If a folding event occurs when the mobile terminal has been unfolded in a vertical direction unlike in FIG. 5(a), and if the mobile terminal is rotated in a horizontal direction, the sensing unit 140 can sense an arrangement, angle of the mobile terminal corresponding to the folding event. The sensed arrangement angle may be sent to the controller 180.

The controller 180 can control an output operation corresponding to the folding event and a change of the arrangement angle. For this, the gyro sensor, the geomagnetic sensor, the acceleration sensor, etc. of the sensing unit 140 are disposed at a point where a folding event, occurs, or around the point (e.g., between first and second inner display regions).

The controller 180 can convert the open state into a closed state, based on a closed type corresponding to the folding event. Then the controller 180 can display information on the execution screen, on one of the outer display region 251c and the side display region 251d (S430). If a folding event occurs on first and second inner display regions, the sensing unit 140 can sense a gradient change on the first and second inner display regions, thereby sensing a closed type of the mobile terminal.

As aforementioned, the closed type corresponding to the folding event may include a first closed type to simultaneously fold the first inner display region 251a and the second inner display region 251b; a second closed type to fold the first inner display region 251a so as to cover the second inner display region 251b, by much moving the first inner display region 251a while the second inner display region 251b is scarcely moved; and a third closed type to fold the second inner display region 251b so as to cover the first inner display region 251a, by much moving the second inner display region 251b while the first inner display region 251a is scarcely moved. An open state of the mobile terminal 200 may be converted into a closed state by one of the first to third closed types.

When the closed type is the first closed type, the mobile terminal 200 is closed so that the side display region 251d can be exposed to an upper side. When the closed type is the second closed type, the mobile terminal 200 is closed so that the outer display region 251c can be exposed to an upper side. When the closed type is the third closed type, the mobile terminal 200 is closed so that only a rear frame or a rear cover can be exposed to an upper side.

As aforementioned, the closed type may be determined by combining at least one of a gyro sensor, a geomagnetic sensor, an acceleration sensor and an illumination sensor, or by recognizing a moving distance of a hinge portion. For instance, as shown in FIGS. 5(a) and (b), as a user simultaneously folds the first inner display region 251a and the second inner display region 251b, the outer display region (i.e., the side display region 251d) may be exposed to an upper side. Thus, information related to screen information output to the first inner display region 251a and the second inner display region 251b may be displayed on the side display region 251d.

As the aforementioned folding event occurs, the controller 180 can convert an open state of the mobile terminal into a closed state. In this instance, the controller 180 can control visual information related to screen information which has been output in the open state, to be displayed on an outer display or an outer display region.

The closed state means when an inner surface of the mobile terminal is covered but an outer surface of the mobile terminal is exposed to outside. That is, the closed state means when the outer display region 251c and the side display region 251d have been exposed to an upper side as a plurality of display regions disposed on an inner surface of the mobile terminal are partially or wholly folded based on a hinge portion. In the closed state, the first inner display region 251a and the second inner display region 251b disposed on an inner surface of the mobile terminal are converted into a deactivated state.

When the inner display regions of the mobile terminal have been partially folded on each other may be determined as a closed state or an open state, according to a size of an angle formed between the inner display regions in response to a folding event. That is, when an angle between the inner display regions is more than a reference angle may be defined as an open state. Further, when the angle between the inner display regions is less than the reference angle may be defined as a closed state. Thus if the inner display regions are repeatedly folded or unfolded at an angle close to a reference angle, a closed state and an open state may be repeatedly converted to each other.

Figure 5B:
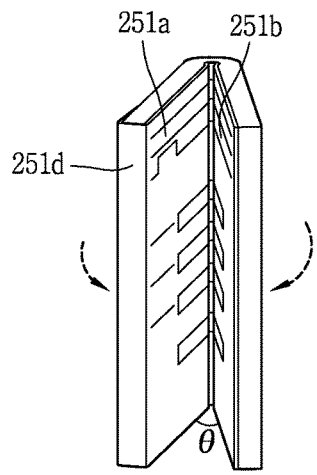

For instance, as shown in FIG. 5(b), if an angle between the first inner display region 251a and the second inner display region 251b is equal to or more than a reference angle ('θ') (i.e., if an open state is implemented), no information may be displayed on the side display region 251d. As the first inner display region 251a and the second inner display region 251b maintain an activated state, the screen information 501 for executing an account transfer may be continuously output.

Figure 5C:
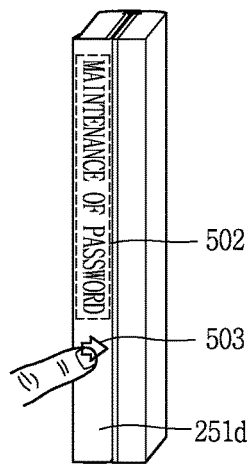

Further, if the angle between the first inner display region 251a and the second inner display region 251b is decreased to a value less than the reference angle ('θ') (i.e., if a closed state is implemented as shown in FIG. 5(c)), the first inner display region 251a and the second inner display region 251b are converted into a deactivated state. In addition, visual information related to the screen information 501 can be output to the side display region 251d.

In another embodiment, only when the inner display regions of the mobile terminal have been completely folded, it may be determined that an open state has been converted into a closed state. In this instance, when an angle between the first inner display region 251a and the second inner display region 251b of the display unit is '0', predetermined information may be displayed on the outer display region 251c or the side display region 251d.

The execution screen-related information may mean an application related to screen information which has been output to the first inner display region 251a and the second inner display region 251b when a folding event occurs, a non-completed task, a task being currently executed, an operation state, etc. For this, if a folding event occurs, the controller 180 can recognize screen information which has been output to the first inner display region 251a and the second inner display region 251b at that time, an application being currently executed, a task state, an operation state, etc.

The controller 180 can determine information to be displayed on the outer display region 251c or the side display region 251d, in connection with the recognized screen information, an application which is being executed, a task state, an operation state, etc. For instance, when a folding event occurs as shown in FIG. 5(a), the controller 180 can recognize that screen information which has been output to the first inner display region 251a and the second inner display region 251b is a finance application, and a state corresponding to an execution screen is a security authentication-completed state. The security authentication indicates an authentication corresponding to input of a password or an authorization code.

In this state, if the mobile terminal is closed as the first inner display region 251a and the second inner display region 251b are simultaneously folded on each other, an icon 503 and guide information. 502 for maintaining a security authentication is output to the side display region 251d which is to be exposed to an upper side. In this instance, a display direction of the guide information 502 corresponds to a folding direction of the first inner display region 251a and the second inner display region 251b.

For instance, if the first inner display region 251a and the second inner display region 251b are simultaneously folded on each other after rotating in a horizontal direction like a book, the information is displayed on the side display region 251d in a vertical direction. Further, if the first inner display region 251a and the second inner display region 251b are simultaneously folded on each other after rotating in a vertical direction like a notebook, the information is displayed on the side display region 251d in a horizontal direction. That is, since the information is displayed in a direction matching a user's eye line, a user's convenience can be enhanced.

The icon 503 and the guide information 502 may be displayed based on a point to which a touch input corresponding to a folding event has been applied. For instance, if a folding event occurs when a user has held (touched) a left upper end of the first inner display region 251a and a right upper end of the second inner display region 251b in a symmetrical manner, the icon 503 and the guide information 502 may be displayed at a position adjacent to the touch-applied point. The display unit may be provided with a touch sensor so that a touch input to the icon 503 can be implemented.

The icon 503 and the guide information 502 may be displayed as different images (e.g., different images in shape, length, color etc.) or moving images, according to a type of an application being currently executed when a folding event occurs, a type of a non-completed task, the amount of a non-completed task, etc. For instance, the icon 503 and the guide information 502 may be an icon and guide information for maintaining a security authentication in a finance application, as shown in FIG. 5(c).

If information on an execution screen output to a display corresponding to an open state is displayed on a display selected in a closed state, and if a touch input is applied to a region where such information has been displayed, the controller executes at least one function related to information displayed on the selected display (S440).

For instance, as shown in FIG. 5(c), if a drag input is applied to the side display region 251d toward a direction indicated by the icon 503 for maintaining a security authentication (e.g., right direction), the controller maintains a security-authenticated state on a web page 501, for an account transfer which has been executed in an open state of the mobile terminal (or updates at least once). Thus, even if a time set as a default vale to release a security authentication state on a corresponding web page (e.g., 1 minute and 30 seconds) has lapsed, the security authentication state is maintained. If the mobile terminal is re-converted into an open state after 2 minutes, a recently-output screen, i.e., screen information for executing an account transfer, is re-output to the first inner display region 251a and the second inner display region 251b. And the security authentication state is maintained on the corresponding screen information.

In this instance, guide information for executing other function may be displayed according to a type of a touch input applied to the guide information 502. For instance, if a flicking touch input of a preset direction is applied to the guide information 502, a 'password maintenance' may be changed into a 'password release'. In this state, if a touch input is applied to the icon 503, the security authentication applied to the web page 501 in an open state is immediately released. In another embodiment, if a flicking touch input of a preset direction is applied to the guide information 502, different information related to screen information which has been output in an open state (e.g., related other finance applications) may be displayed.

The controller 180 can control other function to be additionally executed, according to a release point of a drag input applied to the icon 503 displayed on the side display region 251d. For instance, when an arrow direction indicated by the icon 503 is a left direction unlike in FIG. 5(c), if a drag input applied to the icon 503 is released on the outer display region 251c after being extended up to the outer display region 251c, the controller 180 can execute a function to maintain a security authentication-completed state, but also may further execute a control operation to maintain such state for a longer time (e.g., more than 3 minutes) than a default value set by the web page 501.

If a preset time lapses when a user's touch input has not been applied to the icon 503 or the guide information 502, visual information displayed on the side display region 251d may disappear, and the touch sensor may maintain an activated state so as to sense a touch input for a predetermined time.

FIG. 5(c) illustrates only an execution key related to maintenance of a security authentication. However, in another embodiment, a key or an input method for releasing a security authentication may be further displayed. In this instance, if a user applies a preset type of touch input to the key for releasing a security authentication, a security authentication performed on the web page output to the first inner display region 251a and the second inner display region 251b is immediately released. For instance, when a user lends a mobile terminal to another person, the user may immediately perform a security release without opening the mobile terminal, for prevention of leakage of financial information.

As aforementioned, the mobile terminal according to an embodiment of the present invention may control an output operation of an inner display region, using an outer display region. Especially, if a folding event occurs when a specific task has not been completed on the inner display region, the mobile terminal may perform the specific task in a closed state, using the outer display region.

Further, if an open state of the mobile terminal is converted to a closed state when a specific task which was being executed in the open state has not been completed, information on the specific task is differently processed according to a closed type corresponding to a folding event.

Figure 6A:
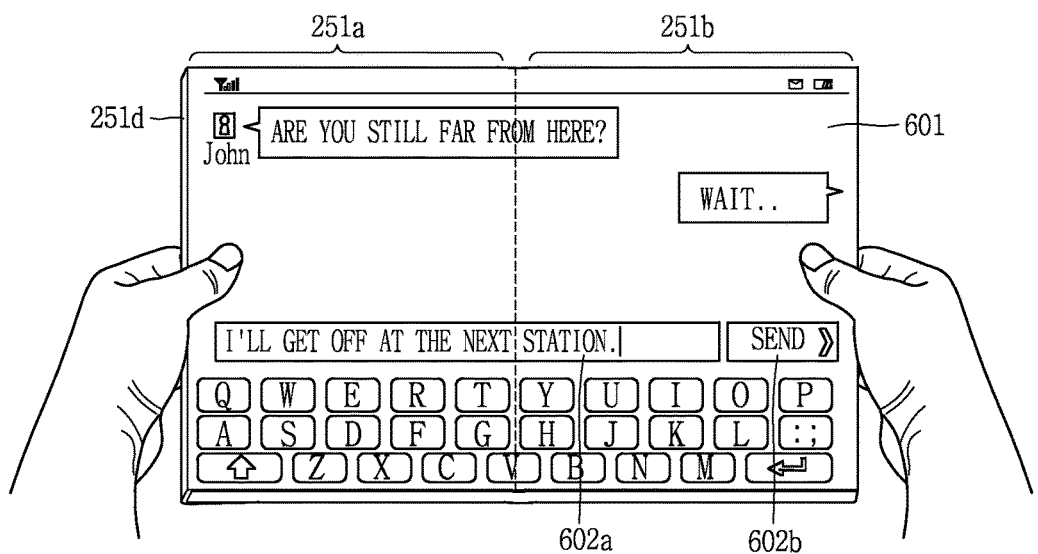
FIGS. 6A(a) to 8(d) are views illustrating examples of an operation of a mobile terminal according to an embodiment of the present invention, which are conceptual views illustrating a method of executing a task which has not been completed on an inner display region, using an outer surface display.
Figure 6A:
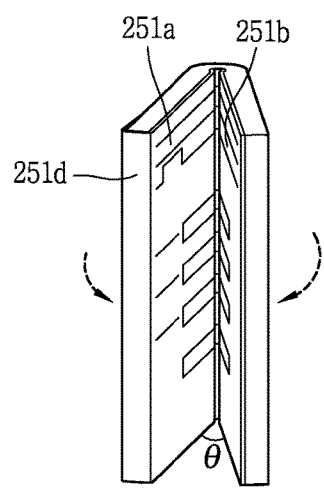
Figure 6A:
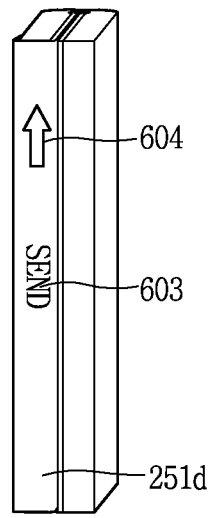
Figure 6A:
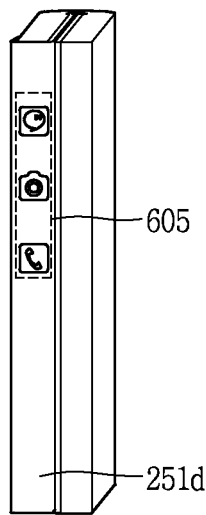

Next, FIGS. 6A(a) to 8(d) are conceptual views illustrating examples of an operation of the mobile terminal according to an embodiment of the present invention. FIGS. 6A(a) to 8(d) illustrate various embodiments performed by an outer display when a folding event occurs when a task has not been completed on an inner display region.

As shown in FIGS. 6A(a) to 6A(d), when an execution screen of a message application has been output to first and second inner display regions 251a and 251b, and when a written message 602a has not been sent, the sensing unit may sense occurrence of the aforementioned folding event between the first inner display region 251a and the second inner display region 251b.

While the folding event occurs, the controller maintains a deactivated state of an outer display region 251c and a side display region 251d disposed on an outer surface of the mobile terminal. The controller 180 can recognize a closed type corresponding to the folding event, according to a sensing result by the sensing unit 140.

As aforementioned, the closed type corresponding to the folding event may include a first closed type to simultaneously fold the first inner display region 251a and the second inner display region 251b on each other; a second closed type to fold the first inner display region 251a so as to cover the second inner display region 251b, by much moving the first inner display region 251a while the second inner display region 251b is scarcely moved; and a third closed type to fold the second inner display region 251b so as to cover the first inner display region 251a, by much moving the second inner display region 251b while the first inner display region 251a is scarcely moved. An open state of the mobile terminal 200 may be converted into a closed state by one of the first to third closed types.

When the closed type is the first closed type, the mobile terminal 200 is closed so that the side display region 251d can be exposed to an upper side. When the closed type is the second closed type, the mobile terminal 200 is closed so that the outer display region 251c can be exposed to an upper side. When the closed type is the third closed type, the mobile terminal 200 is closed so that only a rear frame or a rear cover can be exposed to an upper side. As aforementioned, the closed type may be determined by combining at least one of a gyro sensor, a geomagnetic sensor, an acceleration sensor and an illumination sensor, or by recognizing a moving distance of a hinge portion.

For instance, referring to FIGS. 6A(a) and (b), if an angle between the first inner display region 251a and the second inner display region 251b is equal to or more than 'θ' a deactivated state of the side display region 251d is maintained. In addition, even if an angle between the first inner display region 251a and the second inner display region 251b is equal to or more than 'θ' in the second closed type, a deactivated state of the third region 251d is maintained.

If an open state of the mobile terminal is converted into a closed state based on a folding event, the controller 180 can convert either the outer display region (third region), or the side display region (fourth region) into an activated state, based on a closed type corresponding to the folding event.

More specifically, if the first closed type where a gradient change is detected only from the first inner display region 251a disposed on a left inner surface of the mobile terminal, the controller displays information related to a screen which has been output to the inner display regions, on the outer display region 251c. If the second closed type where a gradient change is detected from both the first inner display region 251a disposed on a left inner surface and the second inner display region 251b disposed on a right inner surface, the controller displays information related to a screen which has been output to the inner display regions, on the side display region 251d. If an open state of the mobile terminal is converted into a closed state, the first and second inner display regions 251a and 251b may be converted into a deactivated state.

As shown in FIG. 6A(c), if an open state of the mobile terminal is converted into a closed state as the first inner display region 251a and the second inner display region 251b disposed on an inner surface are simultaneously folded, a first image for sending a message 602a written in the open state, i.e., an icon 604 and guide information 603 are displayed on the side display region 251d. If a user performs a drag input toward a direction indicated by the icon 604, the message 602a is sent to another party's mobile terminal.

Figure 6B:
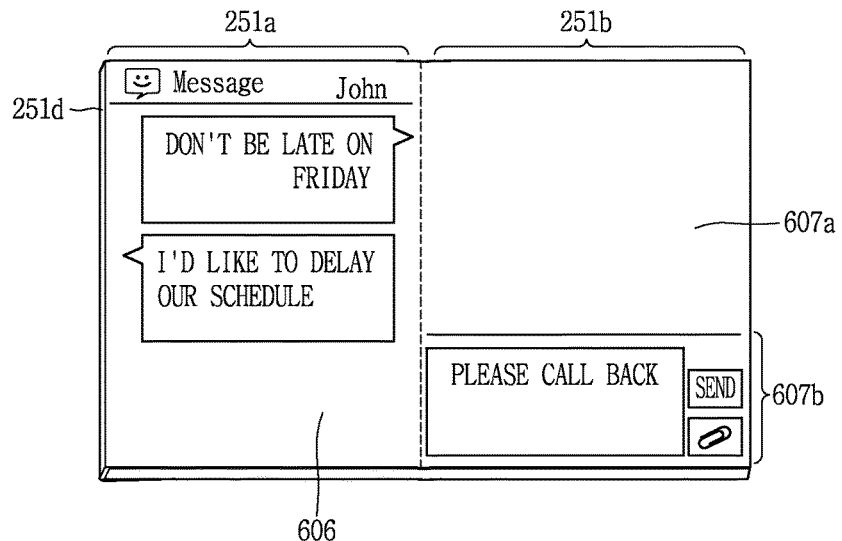
Figure 6B:
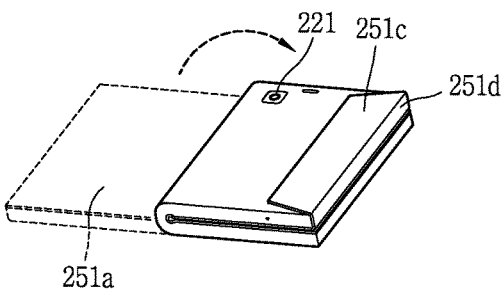
Figure 6B:
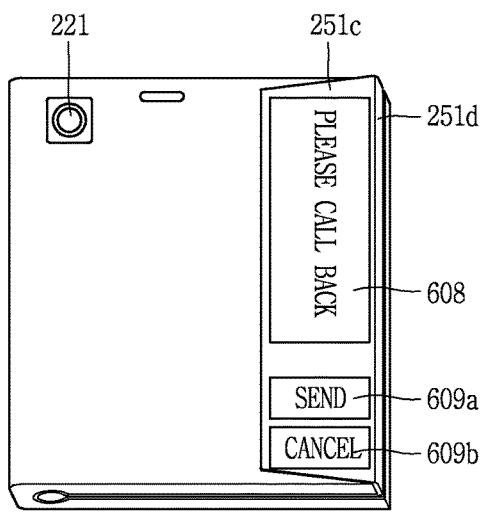

As shown in FIG. 6B(c), if an open state of the mobile terminal is converted into a closed state as the first inner display region 251a disposed on an inner surface is folded to cover the second inner display region 251b, a second image for sending a message 607b written in the open state, i.e., a sending icon 609a, a cancellation icon 609b, and a written message in a preview form 608 may be displayed on the outer display region 251c in the form of a preview. As shown, the preview icon 608 may be displayed at an upper end of the outer display region 251c, whereas the sending icon 609a and the cancellation icon 609b may be displayed at a lower end of the outer display region 251c.

If a user applies a touch input to the sending icon 609a, the written message 608 is sent to another party's mobile terminal. If a user applies a touch input to the cancellation icon 609*b*, a task may be completed when the written message 608 has not been sent. In this instance, the sending icon 609*a*, the cancellation icon 609*b*, and the preview icon 608 may disappear from the outer display region 251*c*.

When an open state of the mobile terminal is converted into a closed state, a different image may be output according to a region to which information is to be output, i.e., according to the outer display region 251*c* or the side display region 251*d*. That is, the first image output to the outer display region 251*c* may be different from the second image output to the side display region 251*d*. The reason is because the outer display region 251*c* is different from the side display region 251*d* in size and shape. For instance, the outer display region 251*c* may display a relatively larger amount of information, due to its larger size than the side display region 251*d*.

If a preset type of touch input is applied to the icon and thus a corresponding function is executed, the controller 180 can subsequently display, on an outer surface display, different information related to an execution screen which has been output in an open state. For instance, if a drag input is applied to the icon 604 shown in FIG. 6A(c) toward a preset direction (e.g., upward direction), the message 602*a* may be sent to another party's mobile terminal. Then icons of applications which were being executed in an open state, icons of applications registered to 'favorites (bookmark)', or an icon of a recently-wed application may be displayed on the side display region 251*d*.

If an open state of the mobile terminal is converted into a closed state as the first inner display region 251*a* disposed on an inner surface is folded to cover the second inner display region 251*b*, the controller 180 can further activate the side display region 251*d* as well as the outer display region 251*c*.

Figure 7A:
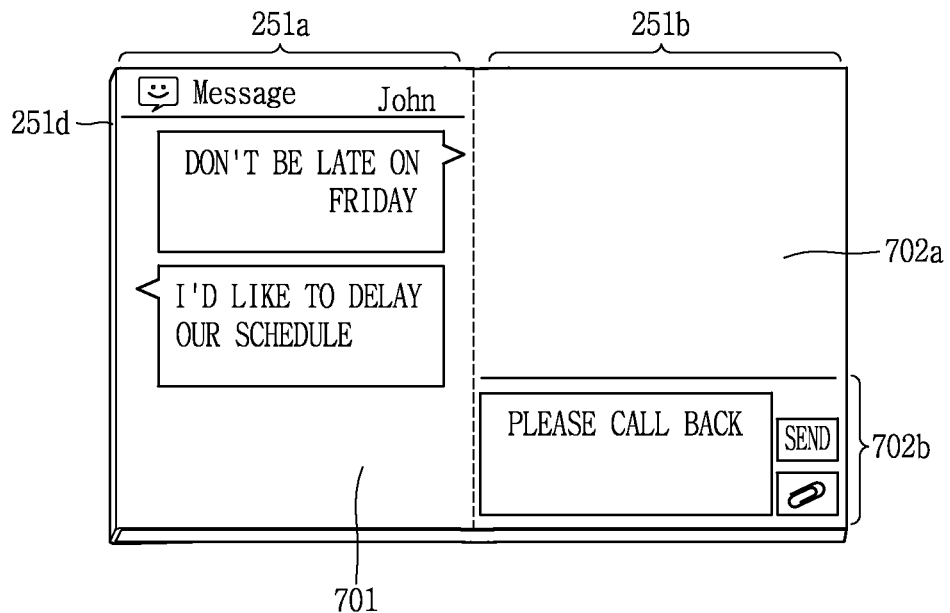
Figure 7A:
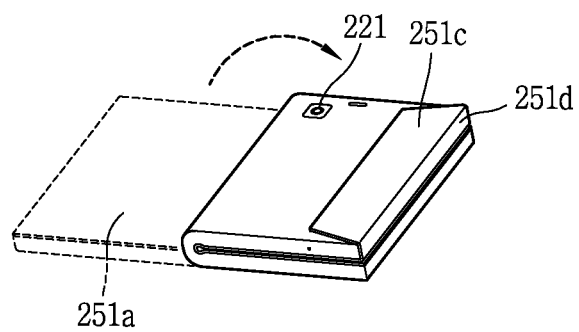
Figure 7A:
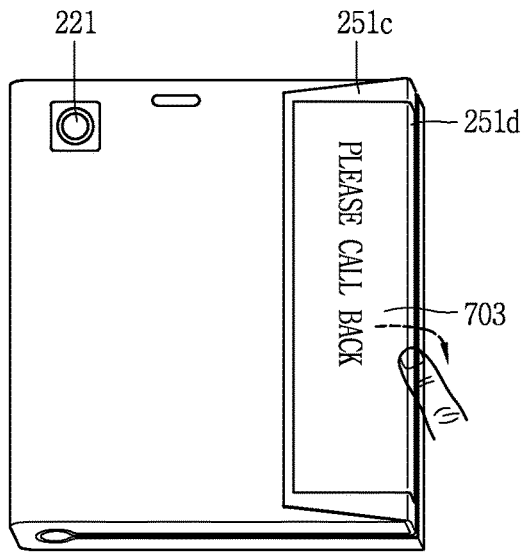
Figure 7A:
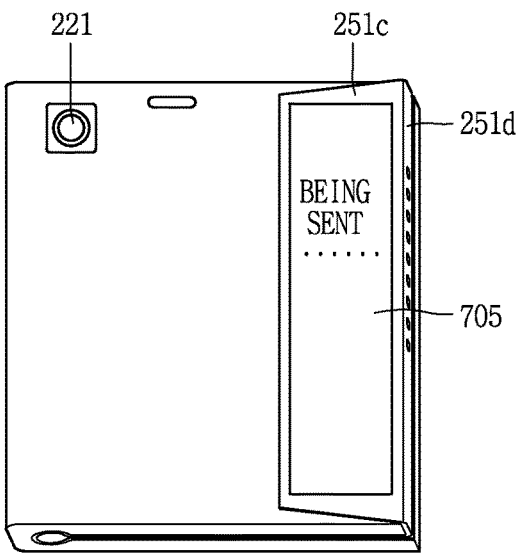

Once the side display region 251*d* is activated, the controller 180 can sense that a drag input applied to the outer display region 251*c* has been extended up to the side display region 251*d*, or has been released on the side display region 251*d*. For instance, as shown in FIG. 7A(c), when an image 703 including a message 702*b* not sent from an inner display region has been displayed on the outer display region 251*c*, if a drag input toward the side display region 251*d* from the outer display region 251*c* is applied to the image 703, the controller 180 can extend the image 703 up to the side display region 251*d*, with changing a size of the image 703 along a path of the drag input.

More specifically, an image, of which size is gradually changed along a path of the drag input, is generated on the outer display region 251*c* and the side display region 251*d*. In addition, predetermined information (e.g., Please call back') is displayed on the image. The image may be differently processed according to a point where the drag input is released. For instance, if the drag input is released on the outer display region 251*c*, the size of the image is not changed or the original image is restored, and no function is performed.

Further, if the drag input is released on the side display region 251*d*, a changed image may be maintained or fixed for a predetermined time or more (e.g., when sending is completed). According to the drag input, the information displayed on part of the outer display region 251*c* (e.g., Please call back') may be more extended, or may be changed into other content. Alternatively, an effect to unfold rolled paper, or an effect to pull an elastic body such as a rubber band may be provided to the image 703 according to the drag input.

Once the applied drag input is released, the controller sends the message 702*b* included in the image 703. That is, if the drag input is released, the message 702*b* is sent to another party's mobile terminal. The controller 180 can change the image 703 into an image 705 indicating that a function corresponding to the drag input (e.g., 'message sending function') is being executed.

An indicator bar (or progress bar) indicating that the message is being sent may be further displayed on the side display region 251*d*. As aforementioned, when the side display region 251*d* is formed to have a predetermined curvature, the controller 180 can display, on the side display region 251*d*, an indicator bar (or progress bar) indicating that a function corresponding to the drag input (e.g., 'message sending function') is being executed. In this instance, on the outer display region 251*c*, the controller 180 can continuously display the image 703 or may display other information (e.g., another party's phone number).

In this state, if a user applies a touch input to the indicator bar (progress bar) displayed on the side display region 251*d*, other information related to the indicator bar displayed on the side display region 251*d* (e.g., a preset image, a chat window, etc.) may be displayed on the outer display region 251*c*. The controller 180 can control a different function to be executed, according to a point where a drag input applied to an image is released.

More specifically, as shown in FIG. 7A(d), if a drag input applied to the image 703 including a written message is released on the side display region 251*d* after being extended up to the side display region 251*d*, the message being sent may not be cancelled. Further, if the drag input extended up to the side display region 251*d* is released on the outer display region 251*c*, the message being sent may be cancelled before it is completely sent. In this instance, an icon to cancel the sending may be popped up on the outer display region 251*c* or the side display region 251*d* until the sending is completed.

When the indicator bar indicating that the message 702*b* is being sent has been displayed on the side display region 251*d*, the controller 180 can perform a different control command according to a type of a touch input applied to the indicator bar. For instance, if a short touch input is applied to the indicator bar, an image related to another party's mobile terminal which is to receive a message is displayed on the outer display region 251*c* or the side display region 251*d*. Further, if a long touch input is applied to the indicator bar, an icon for cancelling message transmission may be displayed on the outer display region 251*c* or the side display region 251*d*. Upon application of a touch input for up-down moving the indicator bar, a scrolling for up-down moving information which has been output to the outer display region 251*c* may be performed.

In another embodiment, when the image 705 indicating that the message is being sent has been displayed on the outer display region 251*c*, if it is sensed that the side display region 251*d* has been positioned toward an upper side, the controller 180 can control the image 705 to be displayed on the side display region 251*d*. When the image displayed on the outer display region 251*c* is displayed on the side display region 251*d*, the image may be changed into another image (e.g., decrease of information amount).

Figure 7B:
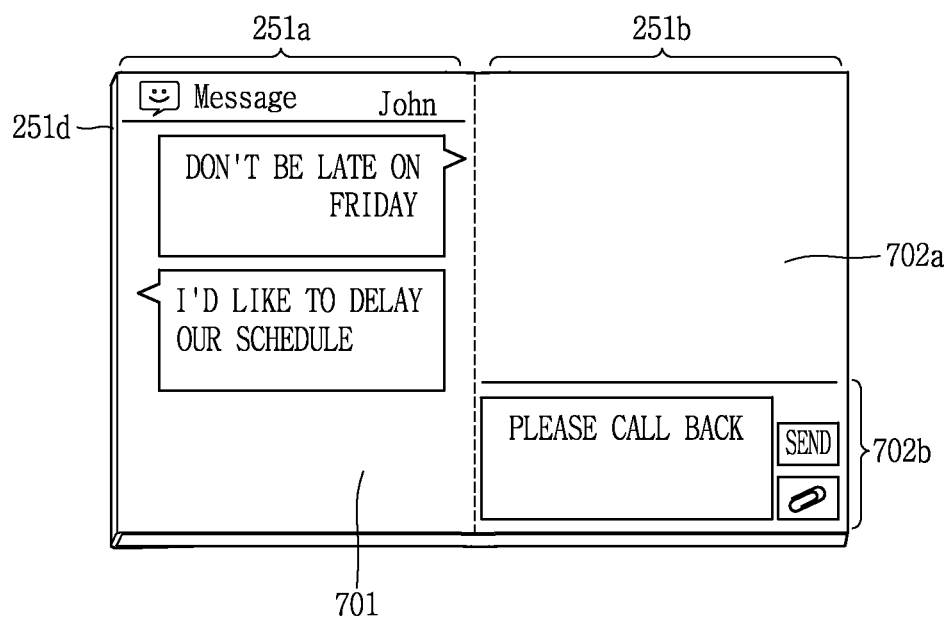
Figure 7B:
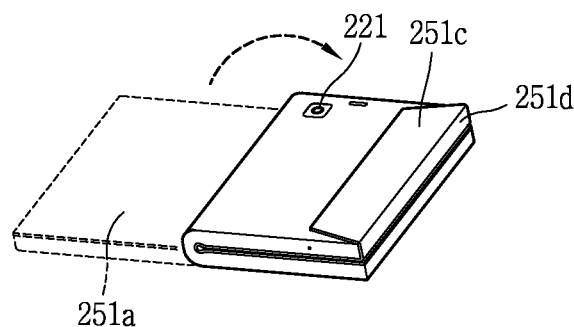
Figure 7B:
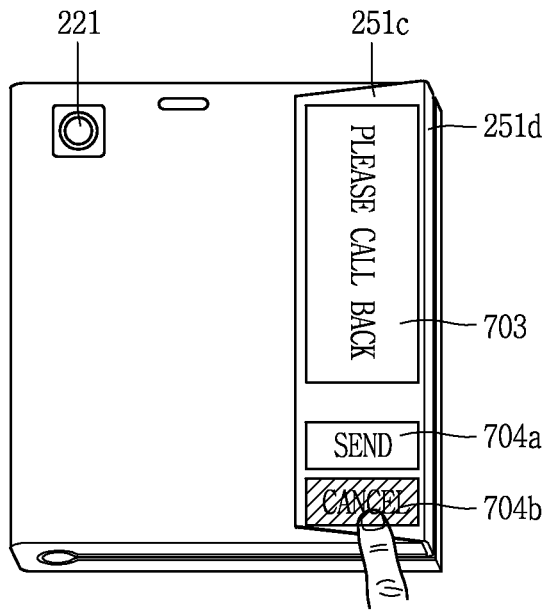
Figure 7B:
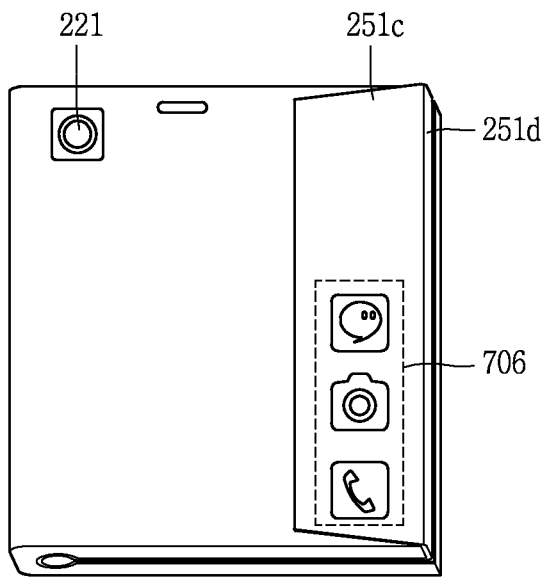
Figure 8A:
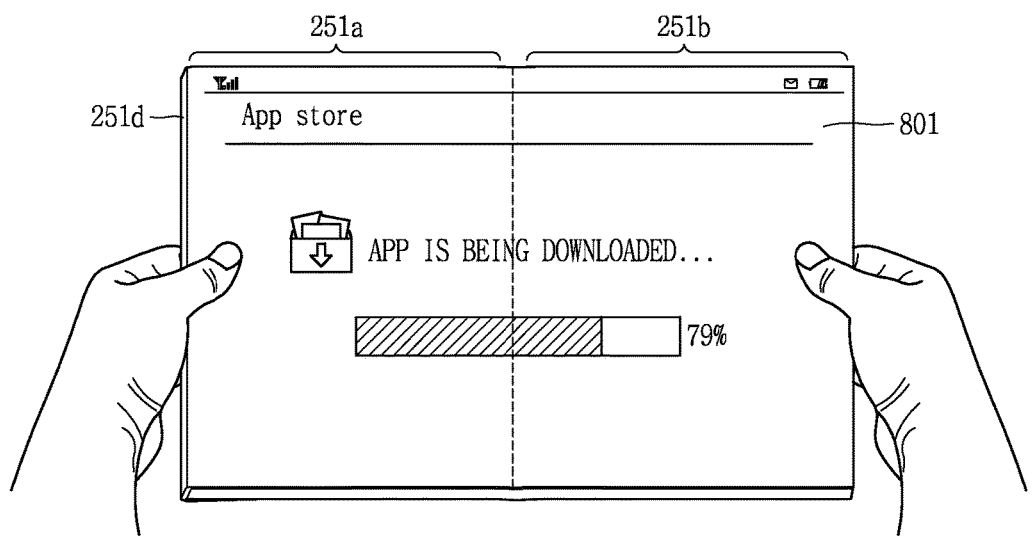
Figure 8B:
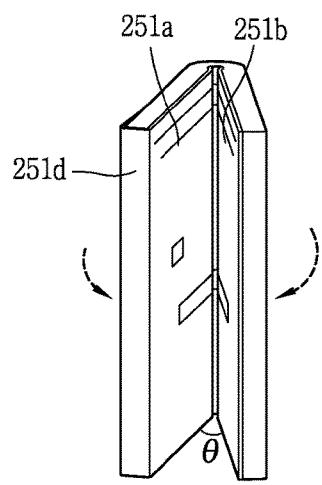
Figure 8C:
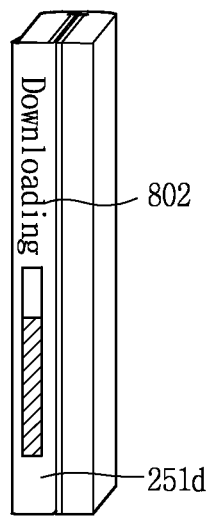
Figure 8D:
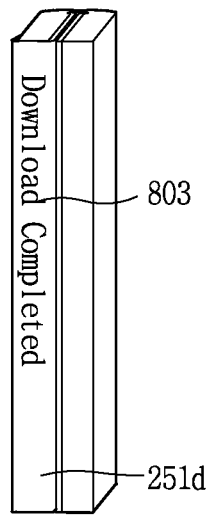

If message transmission is completed, or if message transmission is cancelled as shown in FIGS. 7B(c) and (d), icons 706 of applications which were being executed in an open state may be displayed on the outer display region

251c. A display order of the icons 705 may be preset, or may be an order that a corresponding application has been executed recently.

In the above embodiments, even when an inner display region has been covered, an output operation of the inner display region may be controlled using an outer display region.

Next, FIGS. 8(*a*) to 8(*d*) illustrate an embodiment to display an operation state of an inner display region using an outer display region, when the inner display region has been covered. The controller 180 can sense occurrence of a folding event, when at least one task is being executed on an execution screen corresponding to at least one application, in an open state. For instance, as shown in FIG. 8(*a*), when a specific application has been installed through a web server, or when an update function of a pre-installed application is being executed, the controller 180 can sense simultaneous folding of the first inner display region 251*a* disposed on a left inner surface, and the second inner display region 251*b* disposed on a right inner surface of the mobile terminal as shown in FIG. 8(*b*).

Once a folding event occurs, the controller 180 can display a first icon on one of the outer display region 251*c* disposed on an outer surface of the mobile terminal and the side display region 251*d* extended to an outer side surface, the first icon indicating that at least one task is being executed according to a closed type corresponding to the folding event.

The task may have any type. For instance, the task may include various types of non-completed tasks, e.g., sending a written message, capturing an image, downloading moving images, etc.

As shown in FIG. 8(*c*), the first inner display region 251*a* and the second inner display region 251*b* are simultaneously folded on each other. As shown in FIG. 8(*d*), an image 802 indicating that a specific application is being downloaded is displayed on the side display region 251*d* extended to an outer side surface of the mobile terminal.

Upon completion of the task, the controller changes the first icon displayed on the outer display region 251*c* or the side display region 251*d*, into a second icon indicating completion of the task. For instance, as shown in 8(*d*), an image corresponding to 'completion of application download' (e.g., 'download completed') may be displayed on the side display region 251*d* in a direction corresponding to a gradient of the mobile terminal.

When the image 802 indicating that a specific application is being downloaded has been displayed as shown in FIG. 8(*c*), if a preset type of touch input (e.g., double-shot touch input) is applied to the image 802, the controller 180 can stop downloading the specific application.

Figure 9A:
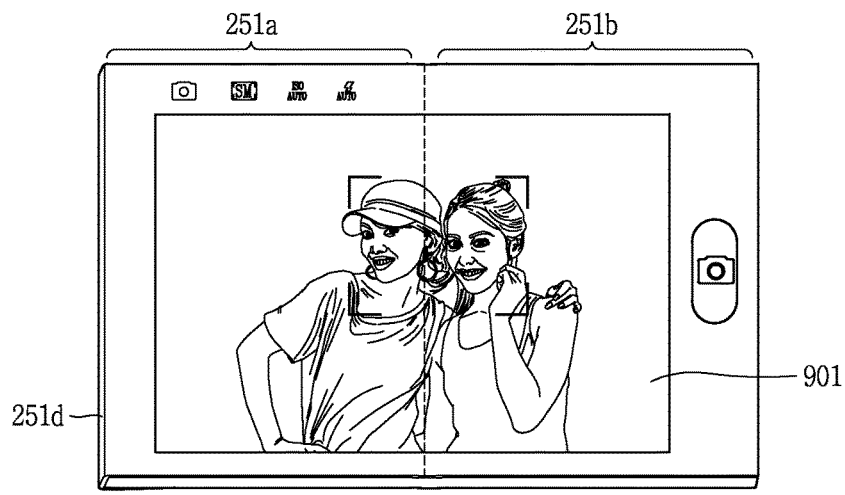
FIGS. 9A(a) to 9A(c) and 9B(a) to 9B(c) are conceptual views illustrating different embodiments to inform an operation state of an inner display region using an outer surface display.
Figure 9A:
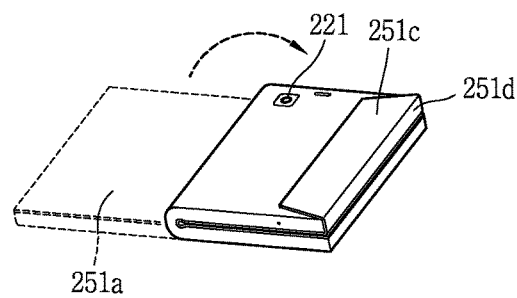
Figure 9A:
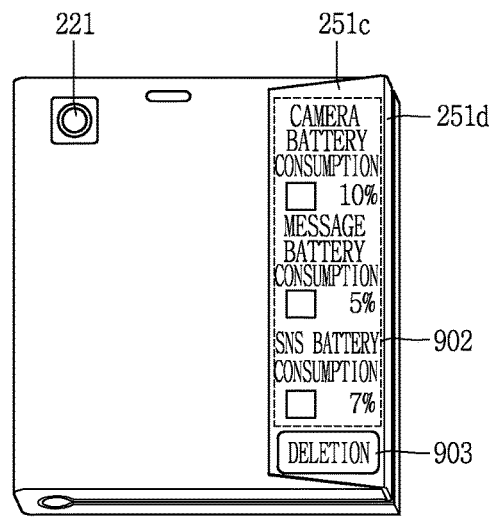
Figure 9B:
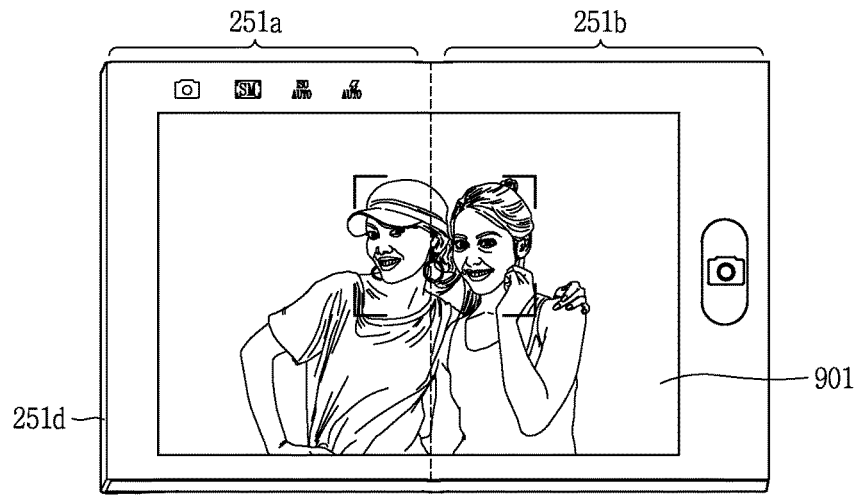
Figure 9B:
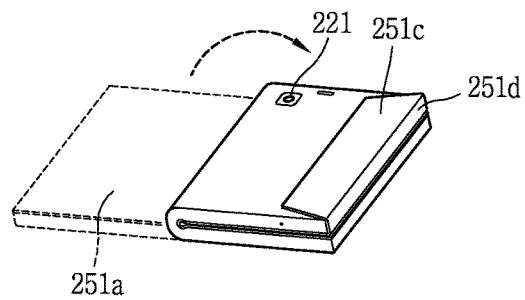
Figure 9B:
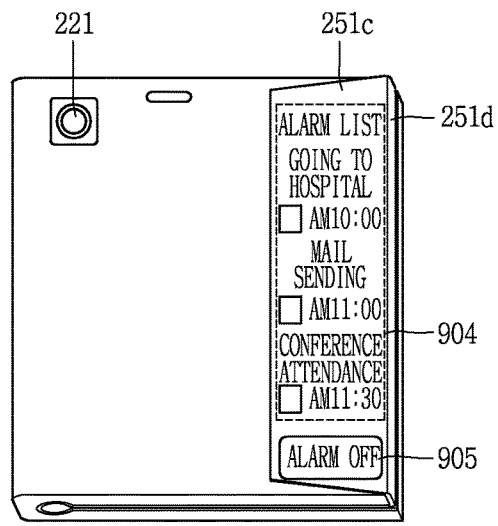

So far, a method of displaying related information or controlling an output operation when an open state of the mobile terminal is converted into a closed state, has been explained. FIGS. 9A and 9B are conceptual views illustrating different embodiments to inform an operation state of an inner display region, using an outer display when a preset time or a considerable time lapses after an open state of the mobile terminal has been converted into a closed state.

If an open state of the mobile terminal is converted into a closed state, the controller outputs information related to a screen which has been output in the open state, on an outer display or an outer display region, as aforementioned. In this state, if a preset time lapses, the outer display or the outer display region is converted into a deactivated state.

If a preset condition is satisfied while the closed state is maintained, the controller 180 can display, on the outer display region or the side display region, a state for controlling an operation of some applications executed on the inner display regions. The preset condition may be a state condition for changing an operation mode of the mobile terminal, or a time condition preset so that a specific function can be executed. For instance, the preset condition may be a function to restrict some operations of the mobile terminal according to a battery state, an alarm function to inform a specific schedule, etc.

FIGS. 9A(a) to 9A(c) are views illustrating that a state for executing an operation restriction mode of the mobile terminal has been displayed on the outer display according to a battery state of the mobile terminal. As shown in FIG. 9A(a), if an open state of the mobile terminal is convened into a closed state, while a camera function is performed by using first and second inner display regions, information related to the camera function is displayed on the outer display region 251*c* disposed on an outer surface of the mobile terminal. Then the information disappears when a predetermined time lapses. Thus, the outer display region 251*c* is re-converted into a deactivated state, or a touch sensor is activated for a predetermined time.

In this state, the controller 180 can check a battery state of the mobile terminal. That is, the controller 180 can check a state of a battery included in the power supply unit 190 at preset time intervals or real time. The battery state is related to a remaining amount of the battery, and the controller 180 can check whether a battery level is equal to or less than a reference value (e.g., the remaining amount of the battery is 10% or less than) or not. The reference value may be changed according to a user's selection, or may have a preset default value before it is changed by a user.

If the battery level is less than the reference level as a check result, the controller 180 can display visual information for activating an operation restriction mode, on the outer display region 251*c*, while the mobile terminal maintains the closed state. The operation restriction mode means that the controller controls at least one of visual information, tactile information and auditory information, for a minimized usage amount of the batter. Considering a case where a user is not viewing the mobile terminal, the controller 180 can inform a state of the mobile terminal by displaying on the outer display region 251*c*, or by vibration or sound.

When the battery level is equal to or less than the reference level, if the mobile terminal has been set so that the operation restriction mode can be automatically executed, the controller 180 can display, on the outer display region 251*c*, only an image indicating execution of the operation restriction mode.

When the battery level is equal to or less than the reference level, if the mobile terminal has been set so that an application selected by a user's input can be terminated, the controller 180 can display, on the outer display region 251*c*, visual information inquiring whether to terminate applications being executed, or visual information inquiring whether to enter a battery saving mode or not. For instance, when the battery level is less than the reference level, as shown in FIG. 9A(b), the controller 180 can display, on the outer display region 251*c*, each battery consumption amount of a camera application, a message application and an SNS application which are being executed in the mobile terminal, a selection icon 902 and a termination icon 903.

A display order of terminable applications may correspond to a recently-executed order. For instance, an icon which has been executed the most recently in an open state of the mobile terminal (e.g., camera application) may be firstly displayed. When there are a large number of terminable applications, information output to the outer display region 251c may be moved up and down according to a direction of a touch input applied to the outer display region 251c or the side display region 251d, and then an application to be terminated may be selected. Then if a short touch input is applied to the termination icon 903, the selected application is terminated. Further, if a long touch input is applied to the termination icon 903, all applications which were being executed on first and second inner display regions may be terminated at one time.

In addition, when the mobile terminal is laid on a bottom surface when the first inner display region 251a has been covered by the second inner display region 251b, i.e., when no display has been exposed to an outer front surface, an image or an icon indicating execution of an operation restriction mode may be displayed only on the side display region 251d. Once a touch input is applied to the selection icon 902 and the termination icon 903 (deletion icon) is selected, the corresponding icon is terminated while the mobile terminal maintains the closed state. Thus battery consumption can be reduced. Accordingly, a user needs not terminate the corresponding application after converting the first region and the second region into an 'ON' state by opening the mobile terminal. Visual information for inducing charging of the mobile terminal, or visual information informing a position of a charger may be temporarily displayed on the outer display region 251c or the side display region 251d.

When information related to an operation restriction mode of the mobile terminal has been displayed on the outer display region 251c or the side display region 251d, the mobile terminal starts to be charged. In this instance, information indicating the charging may be displayed on the outer display region 251c or the side display region 251d. When the battery level exceeds the reference level, the operation restriction mode may be released, and the released state may be displayed on the outer display region 251c or the side display region 251d in correspondence to an arranged state of the mobile terminal.

FIGS. 9B(a) to 9B(c) are views illustrating an embodiment to display a state on an outer surface display, the state related to an alarm function for informing a specific schedule or time preset to the mobile terminal. As shown in FIG. 9B(a), if an open state of the mobile terminal is converted into a closed state, while a camera function is performed by using first and second inner display regions, information related to the camera function is displayed on the outer display region 251c disposed on an outer surface of the mobile terminal. Then the information disappears when a predetermined time lapses. Thus the outer display region 251c is reconverted into a deactivated state, or a touch sensor is activated for a predetermined time.

In this state, the controller 180 can check time corresponding to an alarm function preset to the mobile terminal. That is, the controller 180 can compare a schedule set to a schedule application, or an alarm time set to an alarm application, with a current time, at preset time intervals or real time. Thus the controller 180 can inform a user of whether there remains a predetermined time before the preset schedule or alarm time, or the current time corresponds to the preset schedule or alarm time.

As shown in FIG. 9B(b), an alarm list including a plurality of schedules (e.g., going to hospital) may be displayed on the outer display region 251c, with preset alarm times. In order to prevent an alarm from ringing at a preset alarm time, a schedule selection icon 904 and an alarm off icon 905 may be displayed on the outer display region 251c.

FIGS. 10(a) to 10(d) are conceptual views illustrating a method of processing an event using an outer surface display, when the event has occurred in an open state. In the aforementioned open state of the mobile terminal, the controller 180 can sense that an event has occurred from at least one application.

The event may be a missed call, an application to be updated, an incoming message, charging the mobile terminal, turning on the mobile terminal, turning off the mobile terminal, an LCD awake key, an alarm, an incoming call, a missed notification, etc. As another example, when specific information is received through the wireless communication unit of the mobile terminal, it may be determined that an event has occurred from an application related to the specific information. As still another example, when a user's input item is included in a schedule management, it may be determined that an event has occurred from a schedule management application when the current date corresponds to the input item.

The controller 180 can output an icon indicating occurrence of an event, on a part of the first region (e.g., left upper end). A screen, which has been output before the occurrence of the event, is continuously output to parts rather than the one part of the first region. The controller 180 can output the occurred event in a different form according to a setting of the mobile terminal, e.g., by sound, vibration, LED change, and a combination thereof.

Figure 10A:
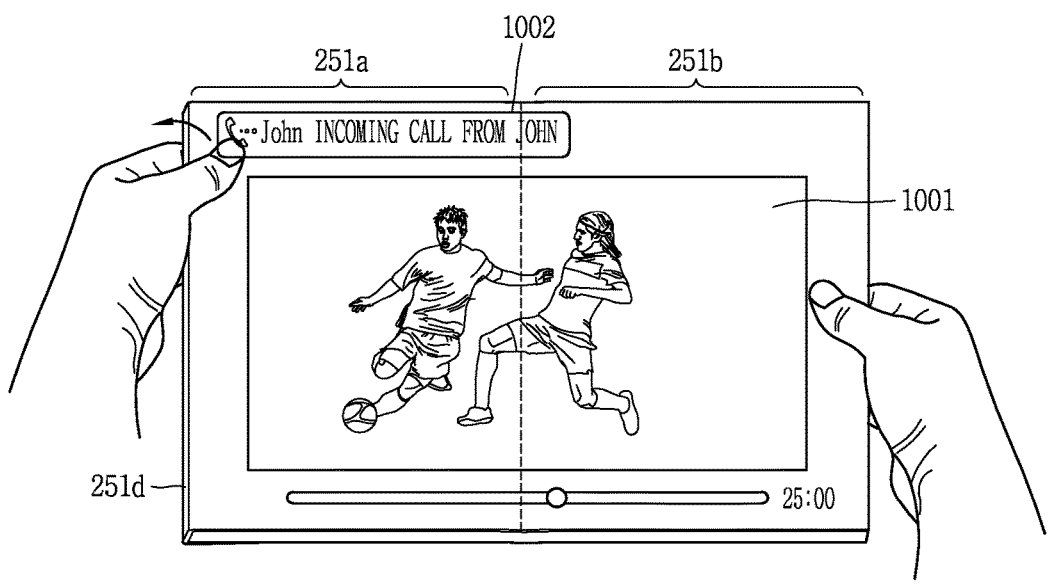
FIGS. 10(a) to 10(d) are conceptual views illustrating a method of processing an event which has occurred in an open state, using an outer surface display.
Figure 10B:
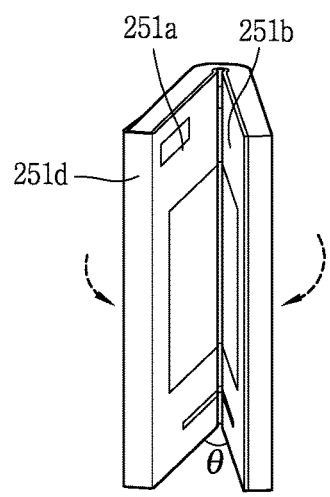
Figure 10C:
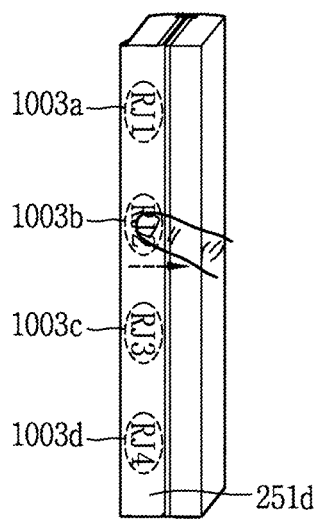
Figure 10D:
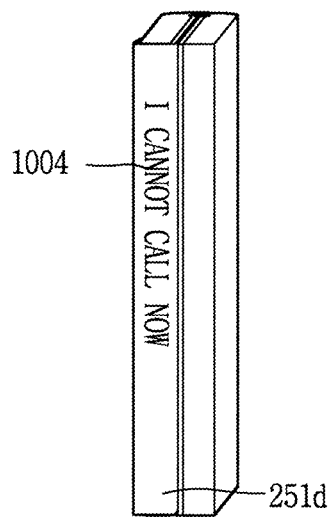
Figure 11A:
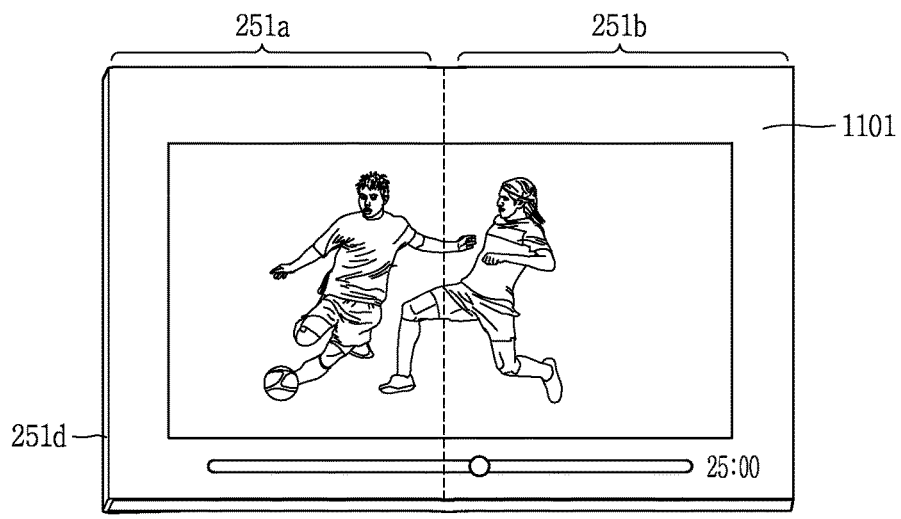
FIGS. 11(a) to 13B(b) are conceptual views illustrating a method of outputting information to an outer surface display.
Figure 11B:
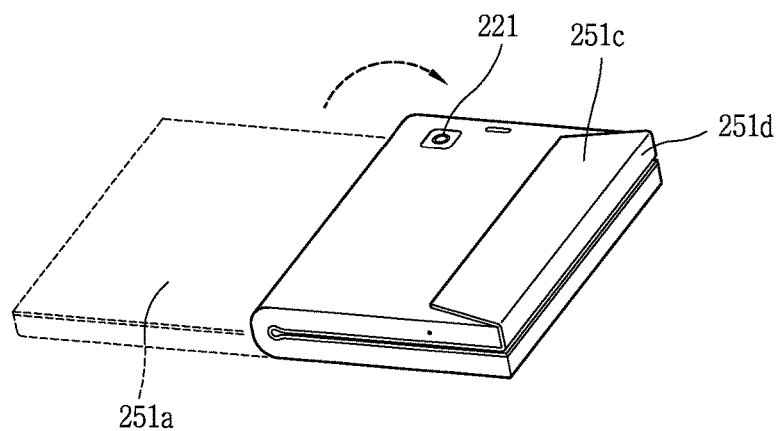
Figure 11C:
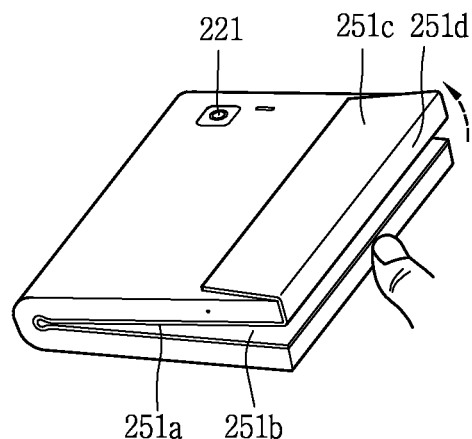
Figure 11D:
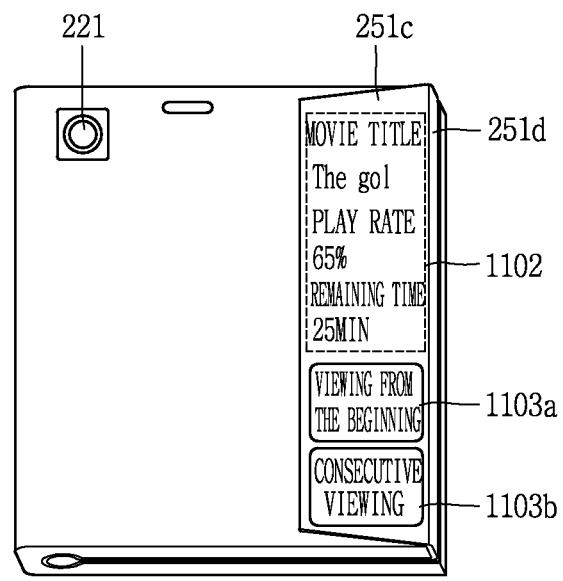

For instance, when a moving image play screen 1001 has been output to a first inner display region 251a and a second inner display region 251b disposed on an inner surface of the mobile terminal as shown in FIG. 10(a), if a call signal is received, information on the call signal is displayed on a part of the first inner display region 251a (e.g., left upper end). That is, an indicator 1002 indicating reception of the call signal is output. The indicator 1002 may be information on another party's mobile terminal which has sent a call signal, e.g., another party's name (or another party's phone number).

When an icon indicating occurrence of an event has been displayed on an inner display region of the display, the controller 180 can differently execute a function related to the event, according to a point where a touch input applied to the icon has been released. When the occurred event is output by sound, vibration, etc., the controller 180 can differently execute a function related to the occurred event, according to a point where a touch input applied to one side of the first inner display region 251a has been released.

For instance, if a touch is applied to the indicator 1002 displayed on the first inner display region 251a of FIG. 10(a), a function to respond to a call signal is performed. As another example, if a drag input (e.g., downward drag input) applied to the indicator 1002 is released within the first inner display region 251a, a function not to respond to (reject) a call signal is performed.

If a drag input toward the side display region 251d extended to an outer side surface (rear surface in FIG. 10(a)) from the first inner display region 251a is applied to the indicator 1002, other function related to an occurred event (e.g., a message sending function corresponding to a non-response to a call) is performed. That is, if a drag input applied to the indicator 1002 is extended up to the side display region 251d to thus be released, a message (e.g. 'I'll call you back.') may be sent to another party's mobile terminal which has sent a call signal.

When an icon indicating occurrence of an event has been output to the first inner display region 251a, if an open state of the mobile terminal is changed into a closed state, the controller outputs image objects to one of the outer display region 251*c* disposed on an outer surface, and the side display region 251*d* extended to an outer side surface, according to the aforementioned closed type. The image object may be a plurality of icons indicating executable functions related to an occurred event.

If a drag input is applied to one of the image objects output to one of the outer display region 251*c* and the side display region 251*d* toward a preset direction, the controller 180 can perform other function related to the event in correspondence to the selected image object. For instance, if a touch input has not been applied to the first inner display region 251*a* and the first inner display region 251*a* and the second inner display region 251*b* have been simultaneously folded to convert an open state of the mobile terminal into a closed state, a received call signal is rejected.

In addition, items 1003*a*, 1003*b*, 1003*c* and 1003*d* of messages which can be sent to another party's mobile terminal are displayed on FIG. 10(*c*). If a touch input applied to a specific item 1003*b* is dragged toward a preset direction (e.g., right direction), a corresponding message (e.g., 'I cannot call now.') is sent to another party's mobile terminal. While the message is being sent, a message content 1004 corresponding to the selected item 1003*b* is displayed on the side display region 251*d* as shown in FIG. 10(*d*). If the closed state of the mobile terminal is converted into an open state after the message transmission, the moving image play screen 1001 which has been stopped is output to the first inner display region 251*a* and the second inner display region 251*b*, or a temporarily-paused scene is output.

When a user views the moving image play screen 1001 without having responded to a received call signal, i.e., if an open state of the mobile terminal is converted into a closed state after the indicator 1002 indicating a call signal has disappeared, an icon indicating a missed call may be displayed on a display region corresponding to a closed type, i.e., the outer display region 251*c* or the side display region 251*d*.

FIGS. 11(*a*) to 13B(*b*) are conceptual views illustrating a method of outputting information, based on an external three or a touch input applied to an outer surface display, when a closed state of the mobile terminal has been maintained. As aforementioned, when information on a screen which has been output in an open state has been displayed on an outer display or an outer display region in a closed state, if a touch input is not applied to the region where the information has been displayed, for a preset time, the information is not displayed any longer (disappears). That is, the outer display and the outer display region are converted into a deactivated state.

In this state, the controller 180 can sense an opening event occurred in the mobile terminal. The opening event means that an external force for releasing a closed state of the mobile terminal has been applied to the mobile terminal. The opening event may be sensed through a magnetism change of magnets facing each other on regions of the first and second inner display regions 251*a* and 251*b*, or facing each other on regions of frames or covers, while an open state of the mobile terminal is converted into a closed state, or while a closed state is converted into an open state. Alternatively, the opening event may be sensed by recognizing a moving distance of a hinge portion.

For this, the mobile terminal according to an embodiment of the present invention may be provided with a plurality of magnets facing each other on regions of the first and second inner display regions 251*a* and 251*b*, or facing each other on regions of frames or covers. The sensing unit 140 may sense a magnetism change of the magnets through a predetermined sensor, the magnets moving in accordance with movement of the first and second inner display regions or the frames or covers.

In another embodiment, upon detection of a sound occurring when the magnets are separated from each other (i.e, clicking sound) as well as such change of magnetism, the controller 180 can determine that the aforementioned opening event has occurred. For instance, if a magnetism change of the magnets is sensed in a closed state by the sensing unit 140, the controller 180 can determine that an opening event has occurred. In this instance, the controller 180 can activate one of an outer display region 251*c* disposed on an outer surface, and a side display region 251*d* extended to an outer side surface, based on an open type corresponding to the opening event.

The open type corresponding to the opening event may include a first open type to simultaneously open a first inner display region 251*a* and a second inner display region 251*b* by holding part of frames of the first inner display region 251*a* and the second inner display region 251*b*, when the side display region 251*d* has been exposed to an upper side; a second open type to unfold the first inner display region 2514 like a book by holding part of the frame of the first inner display region 251*a*, when the outer display region 251*c* has been exposed to an upper side; and a third open type to unfold the second inner display region 251*b* like a book by holding part of the frame of the second inner display region 251*b*, when none of the first and second inner display regions, the outer display region and the side display region has been exposed to an upper side. The open type may be determined by combining at least one of a gyro sensor, a geomagnetic sensor, an acceleration sensor, etc., by the sensing unit 140.

If the open type corresponds to the first open type, the fourth region is activated. If the open type corresponds to the second open type, the third region is activated. If the open type corresponds to the third open type, the fourth region is activated or no display is activated. In addition, the first and second inner display regions or at least part of the frames or covers corresponding to the first and second inner display regions may be formed of a flexible material which can be bent by a user's external force input so as to release the closed state. Once edges of the first and second inner display regions or the frames or covers corresponding to the first and second inner display regions are bent by an external force, magnetism changes of the magnets may be sequentially generated according to corresponding positions.

If occurrence of an opening event is sensed in a closed state, the controller 160 can convert one of the outer display region 251*c* and the side display region 251*d* into an activated state. Then the controller 180 can display other information related to a screen which has been output in an open state. More specifically, if an opening event occurs in a closed state (i.e., a first state where the second inner display region 251*b* is covered by the first inner display region 251*a*), the controller displays said other information on the outer display region 251*c*. For instance, as shown in FIGS. 11(*b*) and (*c*), if an opening event occurs in a closed state, a moving image play screen 1101 which has been output on the first and second inner display regions 251*a* and 251*b* in an open state (refer to FIG. 11(*a*)) is output to the outer display (i.e., the outer display region 251*c*). More specifically, notification information 1102 indicating a title corresponding to the moving image play screen 1101, a played degree, a remaining play time, etc., an icon 1103*a* for viewing the paused moving image play screen 1101 from the beginning, and an icon 1103b for sequentially viewing the paused moving image play screen 1101 from the paused part, may be displayed on the outer display region 251c.

More specifically, if an open state of the mobile terminal is converted into a closed state according to the aforementioned folding event, and if the closed state is re-converted into the open state when a touch input has been applied to an information-displayed region, the controller re-outputs an execution screen which has been output to at least one of the first region and the second region. Then the controller 180 can control the re-output execution screen to be changed in accordance with a function corresponding to a touch input.

For instance, if a closed state of the mobile terminal is converted into an open state when a touch input has been applied to the sequential-viewing icon 1103b, or if an opening event occurs within a predetermined time (e.g., within several seconds) after the touch input, a function, to sequentially view the moving image play screen 1101 from a part paused when a folding event has occurred, is executed on the first inner display region 251a and the second inner display region 251b.

If a considerable time (e.g., more than several hours, or more than one day) has lapsed, or if an open state has been convened into a closed state during a multi-tasking, icons of applications corresponding to the multi-tasking or icons of applications registered to 'favorites'' may be displayed on a display region corresponding to an open type of the mobile terminal.

Figure 12A:
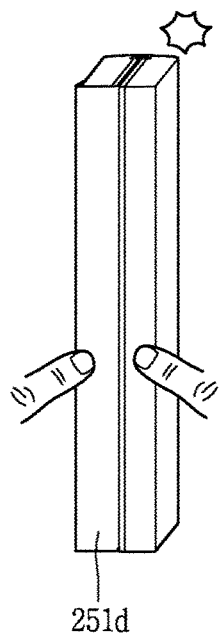
Figure 12A:
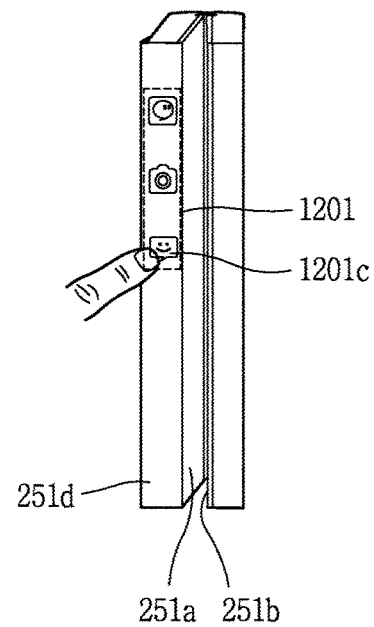
Figure 12A:
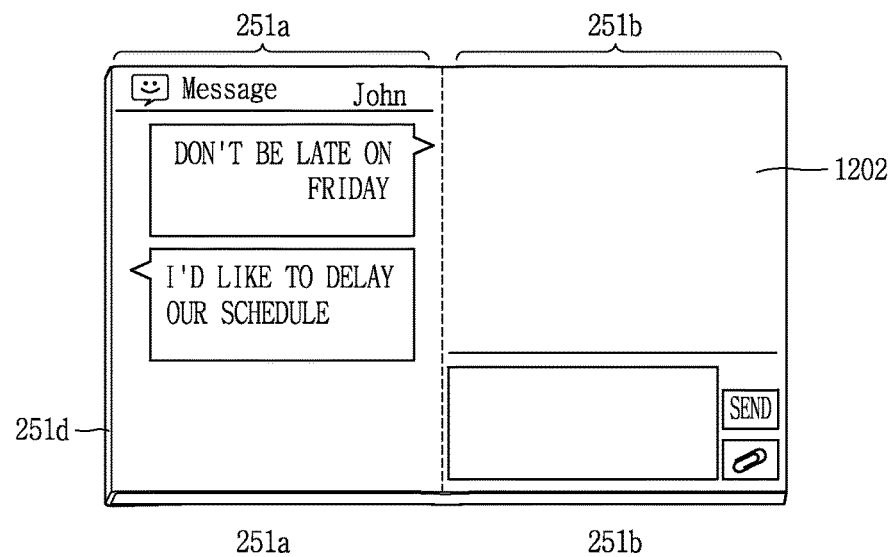
Figure 12A:
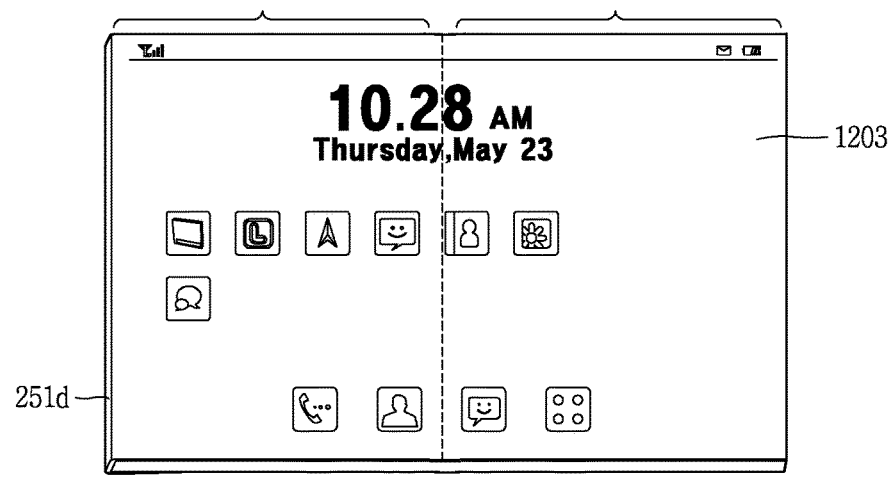

For instance, as shown in FIG. 12A(a), if an opening event occurs in a closed state where the first inner display region 251a and the second inner display region 251b face each other and the side display region 251d is exposed to an upper side, icons 1201 of applications corresponding to a multi-tasking which has been executed in an open state may be displayed on the side display region 251d in a vertical direction.

If an opening event occurs when a touch input (e.g., long touch input) has been applied to one 1201c of the icons 1201, or within a predetermined time (e.g., within several seconds) after the touch input, the mobile terminal is converted into an open state. Then an execution screen corresponding to the touched icon 1201c (i.e., a chat window 1202 which was being executed while a folding event occurs in the mobile terminal) is re-displayed on at least one of the first and second inner display regions 251a and 251b.

If the mobile terminal is converted into an open state when none of the icons 1201 has been selected, an idle screen 2103 or a recently-output execution screen may be displayed on at least one of the first and second inner display regions 251a and 251b, as shown in FIG. 12A(b").

In another embodiment, a user's non-desired one of the icons 1201 may be selected in order to prevent other execution screen from being output to the first and second inner display regions 251a and 251 b. More specifically, if an opening event occurs when a touch input applied to the side display region 251d has been maintained, the controller does not display the icons 1201 on the side display region 251d with ignoring the touch. In this state, the mobile terminal may be converted into an open state. For intentional selection of one of the icons 1201, a user may apply a touch input to the side display region 251d, and then may perform a touch-up operation so that the icons 1201 can be displayed on the side display region 251d.

Figure 12B:
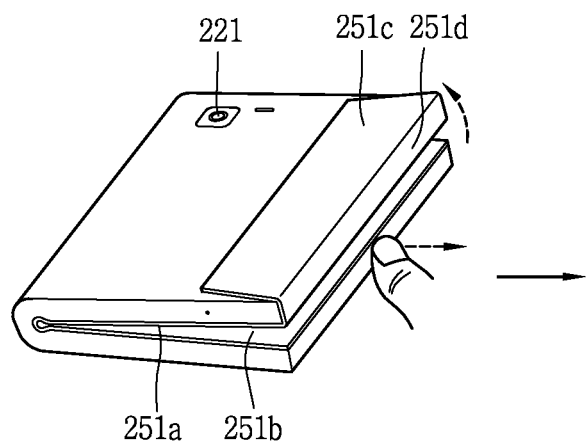
Figure 12B:
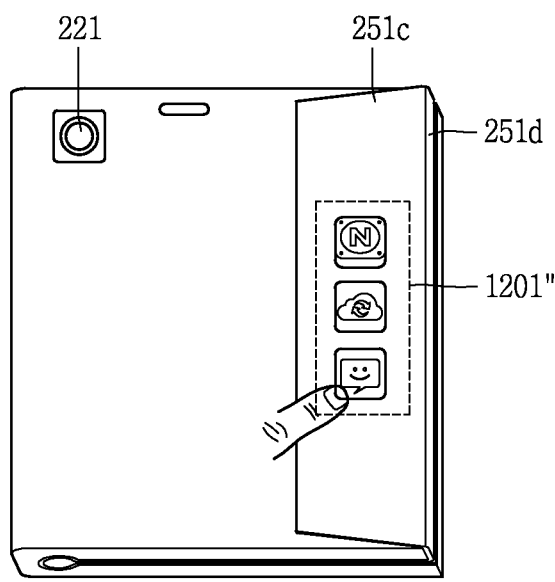
Figure 12B:
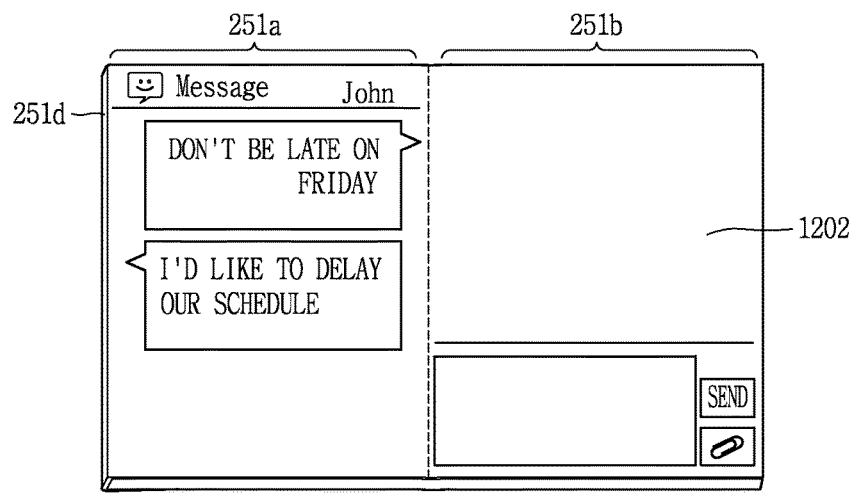
Figure 12B:
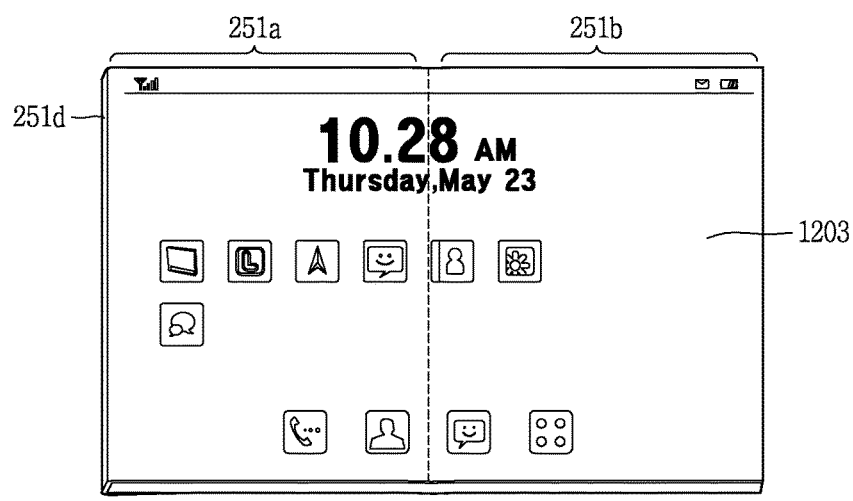

When the outer display region 251c or the side display region 251d is converted into an activated state and predetermined information has been displayed thereon as an opening event has occurred at the mobile terminal, the controller controls the information to be displayed based a point where a touch corresponding to the opening event has been applied. For instance, as shown in FIG. 12B(a), if an opening event occurs as a user unfolds the first inner display region 251a like a book with holding part of a frame of the first inner display region 251a, in a closed state where the outer display region 251c has been exposed to an upper side, icons 1201 of applications which have been frequently-used recently are displayed on part of the outer display region 251c, the part where a touch corresponding to the opening event has been applied. That is, the icons 1201" are displayed on part of the outer display region 251c (refer to FIG. 12B(a)) where an initial touch input has been applied in order to open the mobile terminal.

If a preset type of touch input (e.g., a long touch input, a swipe, a drag input extended up to the side display region 251d, or one or more touch inputs (e.g., 'TOCK-TOCK' or 'KNOCK KNOCK' to be explained later) subsequent to an initial touch input applied to open the mobile terminal) is applied to one of the displayed icons 1201", an execution screen of the selected icon is displayed as shown in FIG. 12B(c).

Further, if a user unfolds the mobile terminal without selecting any of the displayed icons 1201", an idle screen 2103 or a recent execution screen is displayed on at least one of the first and second inner display regions 251a and 251 b.

Each of the outer display region 251c and the side display region 251.d includes a touch sensor, and is activated as a touch input is applied thereto. In the present invention, if a touch input is applied to at least one of the outer display region 251c and the side display region 251d in a closed state, the corresponding region may be converted into an activated state. Then icons of applications which have been frequently used recently may be displayed on the corresponding region.

Figure 13A:
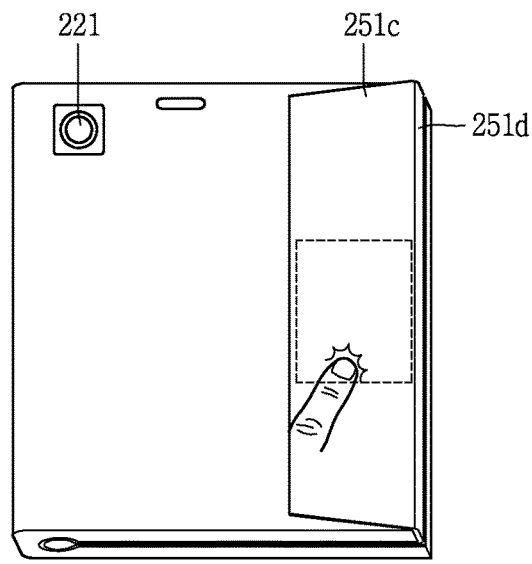
Figure 13A:
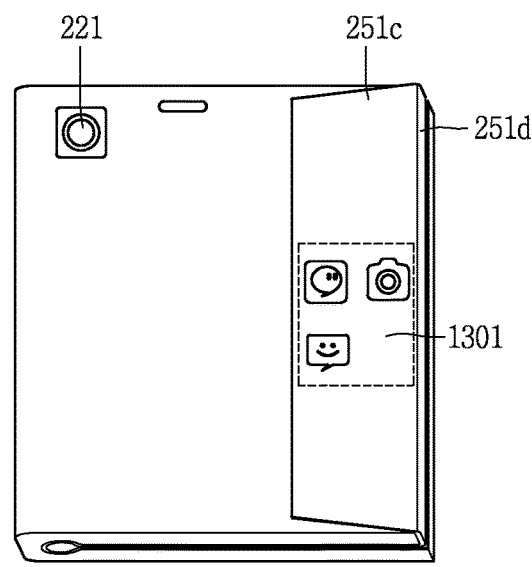
Figure 13B:
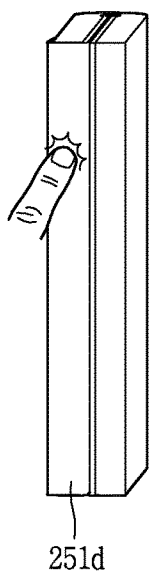
Figure 13B:
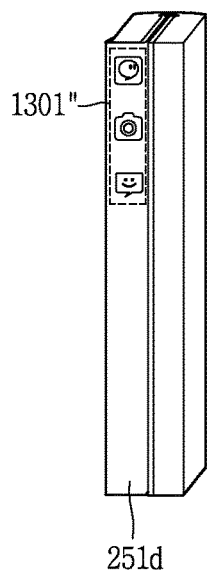

Icons 1301 of FIG. 13A(b), which are implemented when an opening event occurs as a user unfolds the first inner display region 251a like a book with holding part of a frame of the first inner display region 251a, in a closed state where the outer display region 251c has been exposed to an upper side, are displayed based on part where an initial touch input has been applied in order to open the mobile terminal. Likewise, icons 1301" of FIG. 13B(b), which are implemented when an opening event occurs as a user unfolds the first inner display region 251a and the second inner display region 251b like a book with holding parts of frames of the first inner display region 251a and the second inner display region 251b, in a closed state where the side display region 251d has been exposed to an upper side, are displayed based on part where an initial touch input has been applied in order to open the mobile terminal if a 'TOCK-TOCK'touch input or a consecutive touch input is applied after an initial touch input, the icons 1301 or the icons 1301" may be displayed on a front surface of the outer display region 251c or the side display region 251d, in a widely-distributed manner.

If an open state of the mobile terminal is converted into a closed state immediately or after a predetermined time has lapsed, the controller 180 can convert the mobile terminal into a locked state according to a pre-setting, i.e, when input of a control command with respect to an application is blocked. In this state, if a closed state of the mobile terminal is re-converted into an open state, a user should input a pattern for releasing the locked state.

Figure 14A:
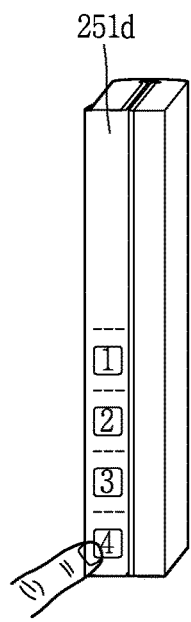
FIGS. 14A(a) to 17B(c) are conceptual views illustrating a method of releasing a locked state of a mobile terminal using an outer surface display.
Figure 14A:
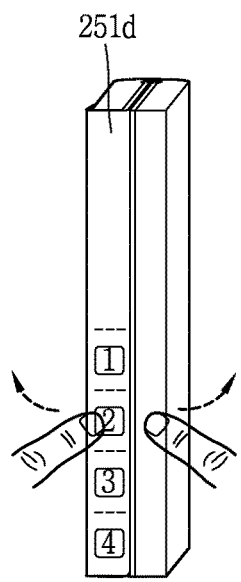
Figure 14A:
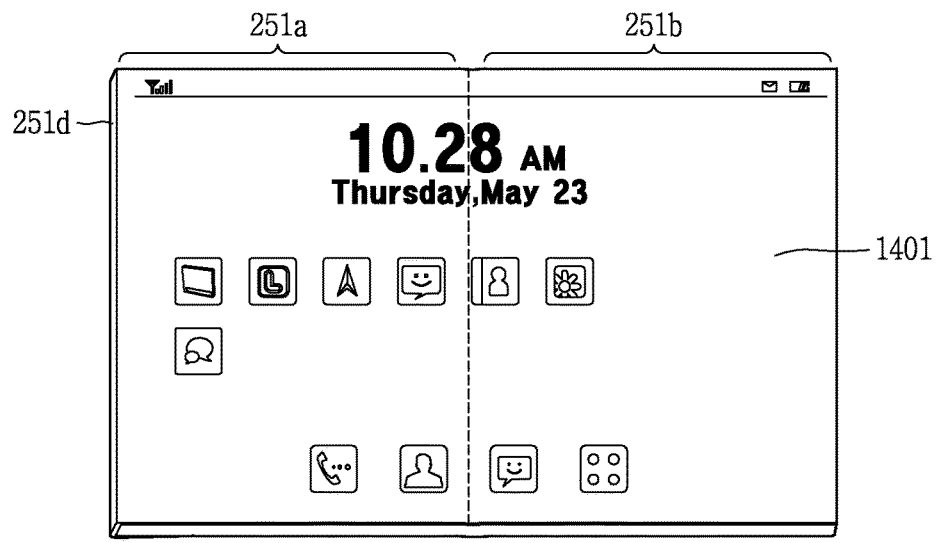
Figure 14B:
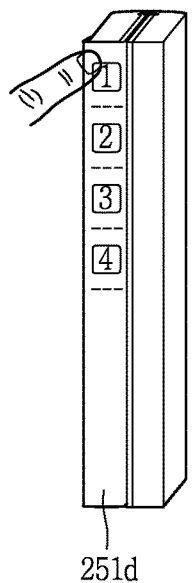
Figure 14B:
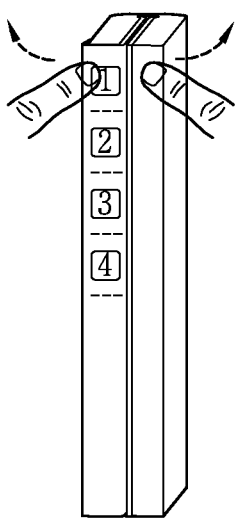
Figure 14B:
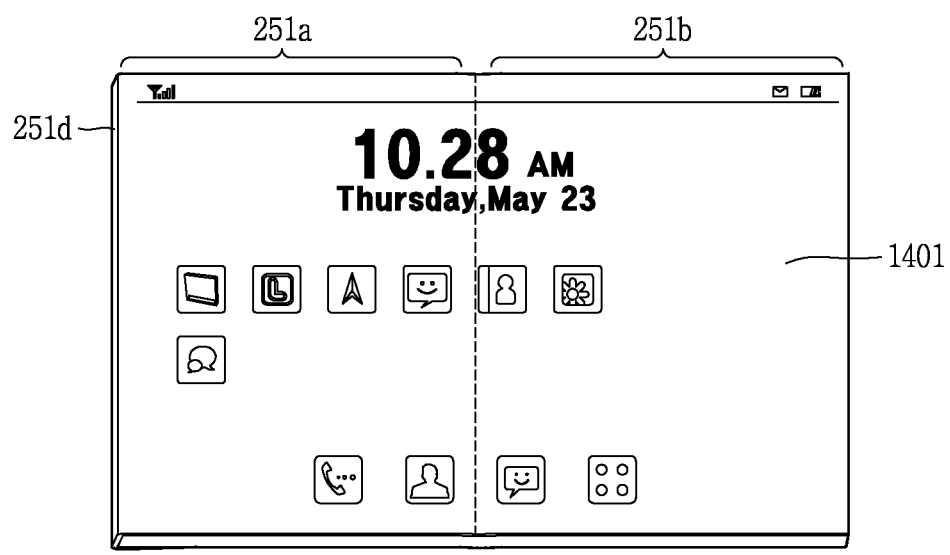

FIGS. 14A(a) to 17B(c) are views illustrating embodiments to release a locked state using an outer display or an outer display region, before the mobile terminal is converted into an open state. The locked state of the mobile terminal means when reception of a user's control command is blocked. If a preset password is input by a specific person, the locked state is converted into a released state. Under such locked state, if the display unit 151 has been activated, a lock screen for inputting a preset password is displayed.

Figure 15A:
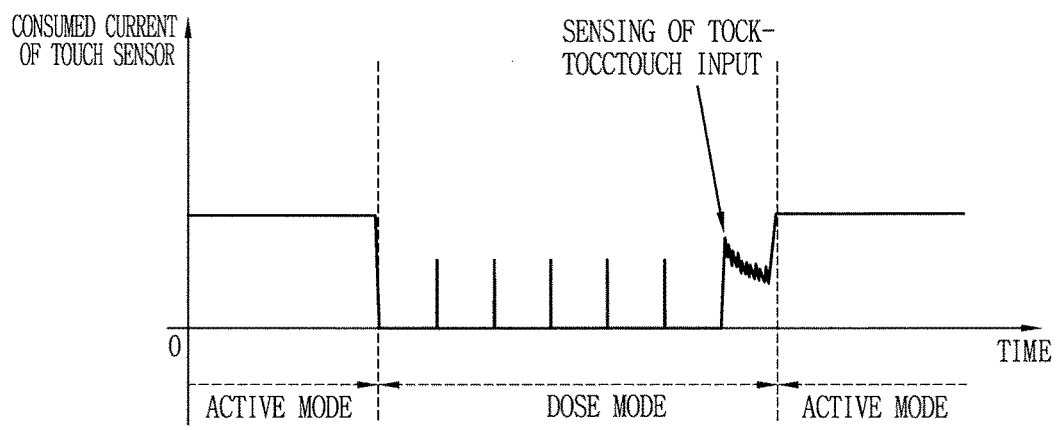
Figure 15B:
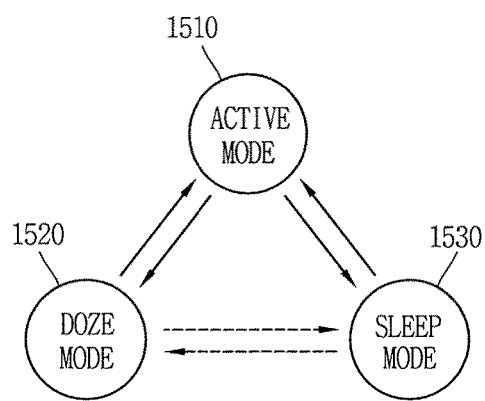

FIGS. 14A(a) to 14A(c) are views illustrating embodiments to release a locked state by applying a plurality of touch inputs having a preset pattern, to the display unit. FIGS. 15A and 15B are views illustrating operation modes of a touch sensor for reducing power consumption.

FIGS. 14A(a) to 14A(c) and 14B(a) to 14B(c) are views illustrating a method of generating an opening event by applying an external force so that a first inner display region 251a and a second inner display region 251b can be widened from each other, when a side display region 251d has been exposed to an upper side. Further, FIGS. 14A(a) to 14A(c) and 14B(a) to 14B(c) illustrate a method of releasing a locked state before the mobile terminal is converted into an open state by applying a plurality of taps to the side display region 251d.

The controller 180 can sense a plurality of touch inputs applied to the fourth region which is in a deactivated state, in a closed state where the first region and the second region face each other and the fourth region is exposed to an upper side.

In this instance, virtual regions for a plurality of touch inputs are displayed on the side display region 251d, and the virtual regions are generated based on a point on the fourth region where an initial touch input for a plurality of touch inputs has been applied. The virtual regions may be generated in the form of a bar long in a horizontal direction, or a bar long in a vertical direction.

For instance, as shown in FIG. 14A(a), if an initial touch input for opening the mobile terminal is applied to a lower side of the side display region 251d, virtual regions 1, 2, 3 and 4 are long-formed in a vertical direction, based on a lower end of the side display region 251d. As shown in FIG. 14A(b), if an initial touch input for opening the mobile terminal is applied to an upper side of the side display region 251d, virtual regions 1, 2, 3 and 4 are long-formed in a vertical direction, based on an upper end of the side display region 251d. Under such configuration, a user can easily apply a plurality of touch inputs to the virtual regions using a single hand, without changing his or her current posture.

In addition, if an initial touch input for opening the mobile terminal is applied to the side display region 251d when the side display region 251d is exposed to an upper side in a horizontally long-arranged state, the virtual regions may be long-formed in a horizontal direction.

Alternatively, an entire area of the side display region 251d, which includes an initial touch input for opening the mobile terminal, may be divided into a plurality of regions (e.g., regions on a quadrant). Still alternatively, a partial area of the side display region 251d, adjacent to an initial touch input for opening the mobile terminal, may be divided into a plurality of regions (e.g., regions on a quadrant).

In a deactivated state of the display unit 151, a touch sensor of the mobile terminal may become periodically activated. The deactivated state of the display unit 151 means an 'off' state of an illumination provided in the mobile terminal. That is, in a deactivated state of the display unit 151, neither information nor graphic image is output to the display unit 151. Further, an activated state of the display unit 151 means an 'on' state of an illumination provided in the mobile terminal so as to illuminate the display unit 151. That is, in an activated state of the display unit 151, neither information nor graphic image is output to the display unit 151.

Screen information on an execution screen, an idle screen or a lock screen corresponding to one or more functions may be output to the display unit 151, or spontaneous light-emission of a cell may be performed together with an illumination provided in the mobile terminal.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense taps applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be '0' or a value very close to '0'.

Referring to FIG. 15A, whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

Referring to FIG. 15A, if the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset period of the touch sensor is shorter, a sensing speed with respect to taps applied onto the display unit 151 is higher. However, in this instance, a power consumption amount of the touch sensor may be increased. Further, when the preset period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 is high enough not, to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

Referring to FIG. 15A, in a doze mode where the display unit 151 is in a deactivated state and the touch sensor is periodically activated, if a 'TOCK-TOCK' touch input is sensed by the touch sensor, the controller 180 can convert the doze mode into an activate mode where the display unit and the touch sensor are activated.

In the mobile terminal 200 according to an embodiment of the present invention, since a 'TOCK-TOCK' touch input is sensed by the touch sensor, taps applied to the display unit 151 can be precisely sensed. Further, in the mobile terminal 200 according to an embodiment of the present invention, since the touch sensor is periodically activated, power efficiency in usage can be enhanced.

FIG. 15B is a view illustrating operation modes of the display unit and the touch sensor, in the mobile terminal 200 according to an embodiment of the present invention. Referring to FIG. 15B, the operation modes of the mobile terminal 200 according to an embodiment of the present invention may include an activate mode 1510, a doze mode 1520 and a sleep mode 1530, according to an operation state of the display unit 151 and the touch sensor.

The active mode 1510 means an activated state of both the display unit 151 and the touch sensor. That is, the active mode 1510 may mean when an illumination of the display unit 151 is turned on, the touch sensor is activated so that a user's input to icons or graphic objects output to the display unit 151 can be applied, and power is consecutively consumed.

The sleep mode 1530 means a deactivated state of both the display unit 151 and the touch sensor. That is, the sleep mode 1530 may mean when an illumination of the display unit 151 is turned off, and no function is executable even if a touch is applied to the display unit 151.

The doze mode 1520 may mean when the touch sensor is periodically activated in a deactivated state of the display unit 151. The doze mode 1520 may be when a 'TOCK-TOCK' or 'KNOCK-KNOCK' touch input can be applied in a deactivated state of the display unit 151.

The touch sensor may sense taps applied to the display unit 151 in the doze mode 1520 and the active mode 1510, in different manners. Further, settings related to an operation of the touch sensor may be differently implemented in the doze mode 1520 and the active mode 1510.

For instance, a threshold value for recognizing a tap may be differently set. A sensitivity of the touch sensor to a touch input may be higher in the active mode 1510 than in the doze mode 1520. The reason is because the doze mode is a mode for sensing a 'TOCK-TOCK' touch input while reducing power consumption, and the active mode is a mode for precisely sensing a user's input.

The controller 180 can convert the active mode 1510 into the sleep mode 1530 or the doze mode 1520, according to a setting or a condition of the mobile terminal. That is, the doze mode 1520 may be executed instead, of the sleep mode 1530, or the sleep mode 1530 may be executed instead of the doze mode 1520. For instance, when the touch sensor has been set to recognize a 'TOCK-TOCK' touch input, the doze mode 1520 may be executed. Further, when the touch sensor has been set not to recognize a 'TOCK-TOCK' touch input, the sleep mode. 1530 may be executed. Such settings may be changed by a user.

The terminal body may be provided with a button (e.g., a home button or a power button) for switching the active mode 1510 and the sleep mode 1530 to each other, or switching the active mode 1510 and the doze mode 1520 to each other. Once the button is pressed by a user, the controller 180 can change an operation state of the mobile terminal.

When an event such as a call reception or a message reception occurs in the sleep mode 1530 or the doze mode 1520, the controller 180 can execute the active mode 1510. On the contrary, a user's input has not been applied for a preset time in the active mode 1510, the controller 180 can execute the sleep mode 1530 or the doze mode 1520.

If a plurality of touch inputs are sensed based on an initial touch-applied point on the side display region 251d which is in a deactivated state, the controller 180 can determine whether the plurality of touch inputs match a preset pattern. Then the controller 180 can convert a locked state of the mobile terminal into a released state, according to a determination result. The plurality of touch inputs may mean touch inputs sequentially applied to at least one region in a preset order. The at least one region corresponds to the preset pattern, among virtual regions generated based on an initial touch-applied point. Alternatively, the plurality of touch inputs may mean touch inputs sequentially applied to at least one region in a preset order. The at least one region corresponds to the preset pattern, among virtual regions including an initial touch-applied point.

More specifically, the controller analyzes a motion pattern formed by sequentially connecting a plurality of sensed touch points to each other. Then the controller determines whether the analyzed motion pattern corresponds to one of a plurality of release commands preset to release a locked state. The controller 180 can ignore a touch input corresponding to an opening event, among a plurality of touch inputs applied to the side display region 251d.

That is, among touch inputs applied to generated virtual regions, a touch input applied to open the mobile terminal is not a release command for releasing a locked state. Thus, the controller generates a control command for cancelling the touch input. For instance, as shown in FIG. 14A(b), when touch inputs are applied to generated virtual regions in order of '3→4→1→2' and then a user opens the mobile terminal while mainlining a touch input applied to the second region '2', the controller 180 can ignore the touch input applied to the second region '2'. Alternatively, the controller 180 can ignore a touch input which was sensed before occurrence of an opening event and which has been maintained for the opening event.

If a plurality of touch inputs match a preset pattern, a locked state of the mobile terminal is converted into a released state. Under this state, if the mobile terminal is converted into an open state, the controller displays a screen corresponding to the released state (e.g., a home screen page as shown in 14A(c)), or a recently-executed screen, on at least one of the first and second inner display regions 251a and 251 b.

If a plurality of touch inputs applied to virtual regions do not match a preset pattern, a locked state of the mobile terminal is maintained. In this instance, icons of applications executable in the locked state may be displayed on the side display region 251d. Under this state, if the mobile terminal is converted into an open state, the controller 180 can display a lock screen corresponding to the locked state, or an execution screen of applications corresponding to icons selected from icons displayed on the side display region 251d, on at least one of the first and second inner display regions 251a and 251b.

In another embodiment, in a closed state where the second inner display region 251b has been covered by the first inner display region 251a and the outer display region 251c has been exposed to an upper side, the controller 180 can sense a plurality of touch inputs applied to the outer display region 251c.

In this instance, virtual regions for a plurality of touch inputs are displayed on the outer display region 251c, and the virtual regions are generated based on an initial touch-applied point on the outer display region 251c. The virtual regions may be implemented so that a quadrant can be generated regardless of an arranged state of the mobile terminal.

Figure 14C:
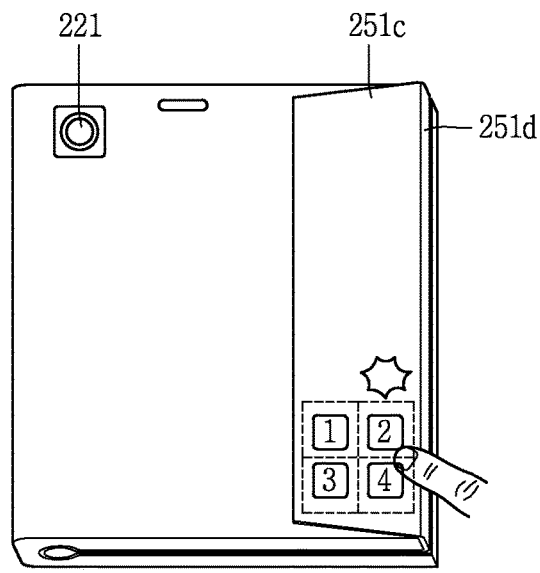
Figure 14C:
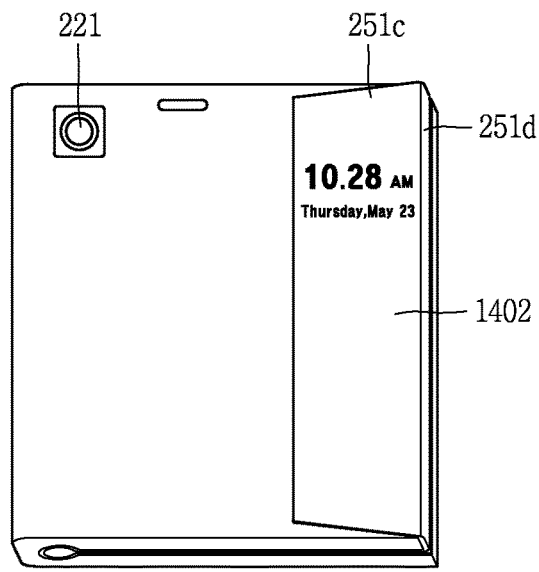
Figure 14C:
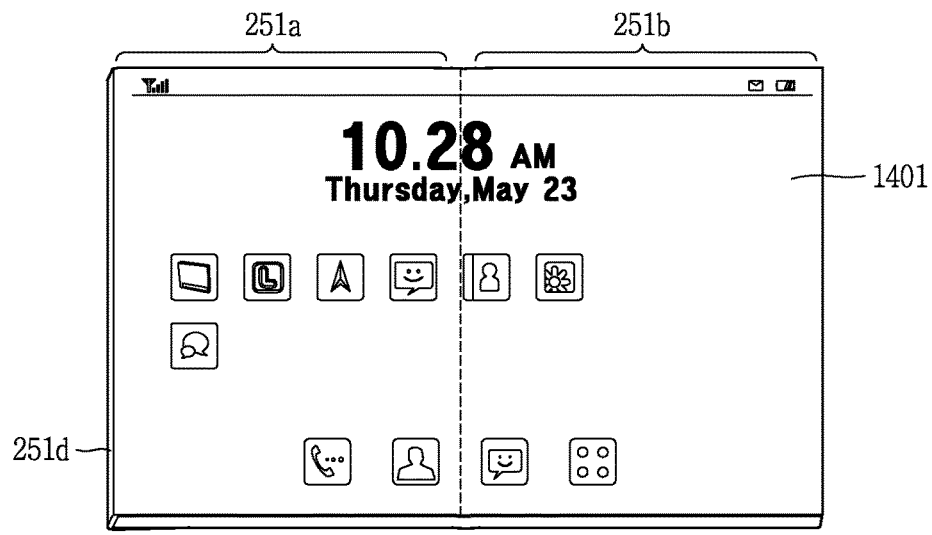
Figure 14D:
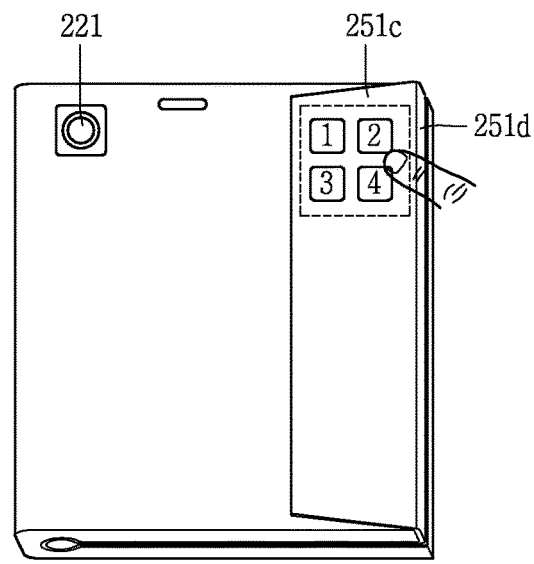
Figure 14D:
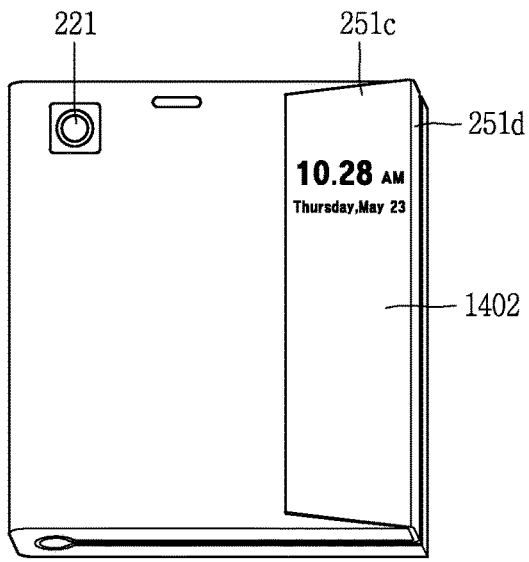
Figure 14D:
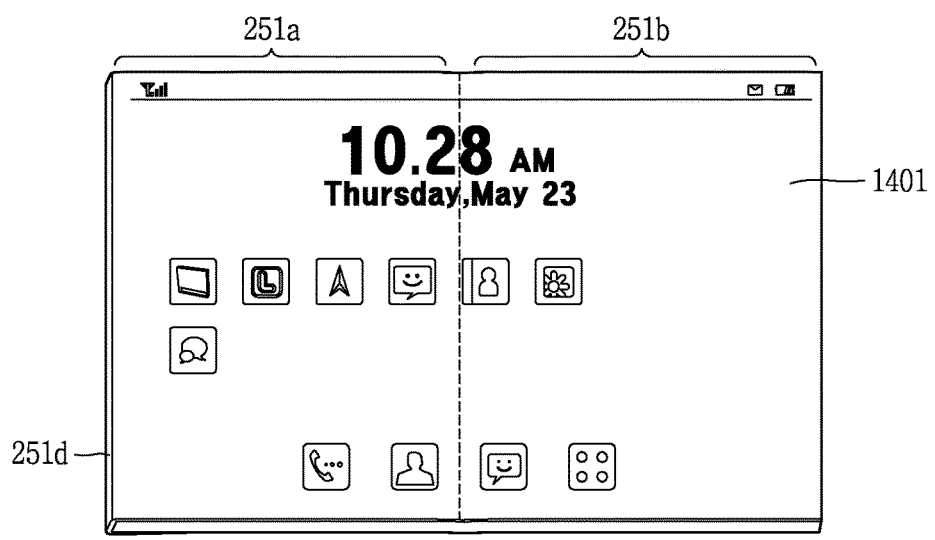

For instance, as shown in FIG. 14C(a), when an initial touch for opening the mobile terminal has been applied to a lower side of the outer display region 251c, virtual regions 1, 2, 3 and 4 on a quadrant are generated in a horizontal direction-preferred manner, based on a lower end of the outer display region 251c. As shown in FIG. 14D(a), when an initial touch for opening the mobile terminal has been applied to an upper side of the outer display region 251c, virtual regions 1, 2, 3 and 4 on a quadrant are generated in a horizontal direction-preferred manner, based on an upper end of the outer display region 251c.

Such generation principle is equally applied to a case where an initial touch for opening the mobile terminal has been applied to a left side or a right side of the outer display region 251c. In addition, when an initial touch for opening the mobile terminal has been applied to the outer display region 251c, when the side display region 251d is on a bottom surface, the virtual regions 1, 2, 3 and 4 may be long-formed in a horizontal direction. Under such configuration, a user can easily apply a plurality of touch inputs to the virtual regions using a single hand, without changing his or her current posture.

In another embodiment, the controller 180 can divide an entire area of the side display region 251d, which includes an initial touch input for opening the mobile terminal, into a plurality of regions (e.g., regions on a quadrant). Alternatively, the controller 180 can divide a partial area of the side display region 251d, adjacent to an initial touch input for opening the mobile terminal, into a plurality of regions (e.g., regions on a quadrant). Then the controller 180 can recognize a plurality of touch inputs including an initial touch input and applied onto the divided regions, or may recognize a plurality of touch inputs excluding an initial touch input and subsequently applied onto the divided regions.

In a deactivated state of the display unit 151, the touch sensor of the mobile terminal may become periodically activated. The deactivated state of the display unit 151 means an 'off' state of an illumination provided in the mobile terminal. That is, in a deactivated state of the display unit 151, neither information nor graphic image is output to the display unit 151. Further, an activated state of the display unit 151 means an 'on' state of an illumination provided in the mobile terminal so as to illuminate the display unit 151. That is, in an activated state of the display unit 151, neither information nor graphic image is output to the display unit 151. Screen information on an execution screen, an idle screen or a lock screen corresponding to one or more functions may be output to the display unit 151.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be a time period of 0 or very close to 0.

Referring to FIG. 15A, whether the touch sensor is in an activated state or a deactivated state may be determined based on a power consumption amount of the touch sensor. For instance, if a power consumption amount of the touch sensor is equal to or less than a preset value based on '0', it may be determined, that the touch sensor is in a deactivated state. Further, if a power consumption amount of the touch sensor exceeds the preset value based on '0', it may be determined that the touch sensor is in an activated state.

Referring to FIG. 15A, if the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset activation period (an activation period) of the touch sensor is shorter, a sensing speed with respect to taps applied onto the display unit 151 is higher. However, in this instance, a power consumption amount of the touch sensor may be increased. Further, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

Referring to FIG. 15A, in a doze mode where the display unit 151 is in a deactivated state and the touch sensor is periodically activated, if a 'TOCK-TOCK' or 'KNOCK-KNOCK' touch input is sensed by the touch sensor, the controller 180 can convert the doze mode into an activate mode where the display unit and the touch sensor are activated.

In the mobile terminal 200 according to an embodiment of the present invention, since a 'TOCK-TOCK' touch input is sensed by the touch sensor, one or more taps applied to the display unit 151 can be precisely sensed. Further, in the mobile terminal 200 according to an embodiment of the present invention, since the touch sensor is periodically activated, power efficiency in usage can be enhanced.

FIG. 15B is a view illustrating operation modes of the display unit and the touch sensor, in the mobile terminal 200 according to an embodiment of the present invention. Referring to FIG. 15B, the operation modes of the mobile terminal 200 according to an embodiment of the present invention may include an activate mode 1510, a doze mode 1520 and a sleep mode 1530, according to an operation state of the display unit 151 and the touch sensor.

The active mode 1510 means an activated state of both the display unit 151 and the touch sensor. That is, the active mode 1510 may mean when an illumination of the display unit 151 is turned on, the touch sensor is activated so that a user's input to icons or graphic objects output to the display unit 151 can be applied, and power is consecutively consumed.

The sleep mode 1530 means a deactivated state of both the display unit 151 and the touch sensor. That is, the sleep mode 1530 may mean when an illumination of the display unit 151 is turned off, and no function is executable even if a touch is applied to the display unit 151.

The doze mode 1520 may mean when the touch sensor is periodically activated in a deactivated state of the display unit 151. The doze mode 1520 may be when a 'TOCK-TOCK' touch input can be applied in a deactivated state of the display unit 151.

The touch sensor may sense taps applied to the display unit 151 in the doze mode 1520 and the active mode 1510, in different manners. Further, settings related to an operation of the touch sensor may be differently implemented in the doze mode 1520 and the active mode 1510.

For instance, a threshold value for recognizing a tap may be differently set. A sensitivity of the touch sensor to a touch input may be higher in the active mode 1510 than in the doze mode 1520. The reason is because the doze mode is a mode for sensing a 'TOCK-TOCK' touch input while reducing power consumption, and the active mode is a mode for precisely sensing a user's input.

The controller 180 can convert the active mode 1510 into the sleep mode 1530 or the doze mode 1520, according to a setting or a condition of the mobile terminal. That is, the doze mode 1520 may be executed instead of the sleep mode 1530, or the sleep mode 1530 may be executed instead of the doze mode 1520. For instance, when the touch sensor has been set to recognize a 'TOCK-TOCK' or 'KNOCK-KNOCK' touch input, the doze mode 1520 may be executed. Further, when the touch sensor has been set not to recognize a 'TOCK-TOCK' touch input, the sleep mode 1530 may be executed. Such settings may be changed by a user.

The terminal body may be provided with a button (e.g., a home button or a power button) for switching the active mode 1510 and the sleep mode 1530 to each other, or switching the active mode 1510 and the doze mode 1520 to each other. Once the button is pressed by a user, the controller 180 can change an operation state of the mobile terminal.

When an event such as a call reception or a message reception occurs in the sleep mode 1530 or the doze mode 1520, the controller 180 can execute the active mode 1510. On the contrary, a user's input has not been applied for a preset time in the active mode 1510, the controller 180 can execute the sleep mode 1530 or the doze mode 1520.

If a plurality of touch inputs are sensed based on an initial touch-applied point on the outer display region 251c which is in a deactivated state, the controller 180 can determine whether the plurality of touch inputs match a preset pattern. Then the controller 180 can convert a locked state of the mobile terminal into a released state, according to a determination result. The plurality of touch inputs may mean touch inputs sequentially applied to at least one region in a preset order. The at least one region corresponds to the preset pattern, among virtual regions generated based on an initial touch-applied point. Alternatively, the plurality of touch inputs may mean touch inputs sequentially applied to at least one region in a preset order. The at least one region corresponds to the preset pattern, among virtual regions including an initial touch-applied point.

More specifically, the controller analyzes a motion pattern formed by sequentially connecting a plurality of sensed touch points to each other. Then the controller determines whether the analyzed motion pattern corresponds to one of a plurality of release commands preset to release a locked state. Once a plurality of touch inputs are applied to virtual regions, the controller 180 can convert the outer display region 251c which is in a deactivated state into an activated state. As a result, a preset initial screen (e.g., clock screen) may be displayed on part on the outer display region 251c (e.g., upper part) as shown in FIG. 14C(b) or 14D(b).

The controller 180 can ignore a touch input corresponding to an opening event, among a plurality of touch inputs applied to the outer display region 251c. That is, among touch inputs applied to generated virtual regions, a touch input applied to open the mobile terminal is not a release command for releasing a locked state. Thus, the controller generates a control command for cancelling the touch input. For instance, as shown in FIG. 14C(a), when touch inputs are applied to generated virtual regions in order of '3→4→1→2' and then a user opens the mobile terminal while mainlining a touch input applied to the second region '2', the controller 180 can ignore the touch input applied to the second region '2'. Alternatively, the controller 180 can ignore a touch input which was sensed before occurrence of an opening event and which has been maintained for the opening event.

If a plurality of touch inputs match a preset pattern, a locked state of the mobile terminal is converted into a released state. Under this state, if the mobile terminal is converted into an open state, the controller displays a screen corresponding to the released state (e.g., a home screen page as shown in FIG. 14C(c) or 14D(c)), or a recently-executed screen, on at least one of the first and second inner display regions 251a and 251b.

If a plurality of touch inputs applied to virtual regions do not match a preset pattern, a locked state of the mobile terminal is maintained. In this instance, icons of applications executable in the locked state may be displayed on the outer display region 251c. Under this state, if the mobile terminal is converted into an open state, the controller 180 can display a lock screen corresponding to the locked state, or an execution screen of applications corresponding to icons selected from icons displayed on the outer display region 251c, on at least one of the first and second inner display regions 251a and 251b.

In another embodiment, the controller 180 can divide an entire area of the outer display region 251c, which includes an initial touch input for opening the mobile terminal, into a plurality of regions (e.g., regions on a quadrant). Alternatively, the controller 180 can divide a partial area of the outer display region 251c, adjacent to an initial touch input for opening the mobile terminal, into a plurality of regions (e.g. regions on a quadrant). Then the controller 180 can recognize a plurality of touch inputs including an initial touch input and applied onto the divided regions, or may recognize a plurality of touch inputs excluding an initial touch input and subsequently applied onto the divided regions.

Once a plurality of touch inputs match a preset pattern, the controller 180 can convert a locked state of the mobile terminal into a released state. Then the controller 180 can display icons of an application corresponding to the released state, on a display exposed to an upper side, i.e., the outer display region 251c or the side display region 251d.

Figure 16A:
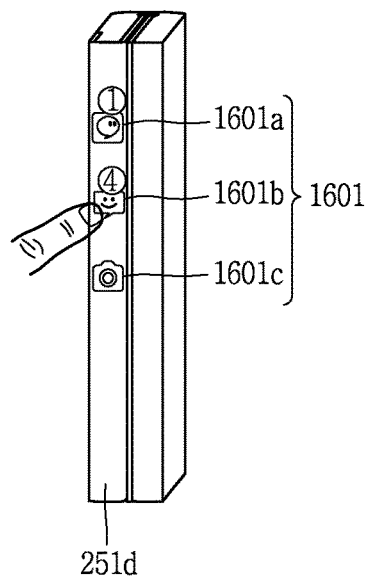

For instance, referring to FIG. 16(a), when a locked state has been released, icons 160 of a plurality of applications corresponding to the released state are displayed on the side display region 251d. Information on the number of received events (e.g., the number of incoming messages), as well as images indicating corresponding applications, may be displayed on icons 1601.

In this state, the controller 180 can determine whether an open state of the mobile terminal corresponding to an opening event is a first open type where only the first inner display region 251a has been unfolded, a second open type where only the second inner display region 251b has been unfolded, or a third open type where both of the first inner display region 251a and the second inner display region 251b have been unfolded. Such determination may be performed using at least one of a gyro sensor, a geomagnetic sensor, an acceleration sensor, etc., or by recognizing a moving distance of a hinge portion.

More specifically, in the second open type where only the second inner display region 251b has been unfolded while the side display region 251d is exposed to an upper side, the controller 180 can output, to the second inner display region 251b, an execution screen of one of applications corresponding to a released state of the mobile terminal. For instance, as shown in FIG. 16(c), an execution screen 1603 of a message application corresponding to a selected icon 1601b, i.e., a recently-output dialogue screen (chat screen) or a dialogue screen corresponding to a recent message, is output to the second inner display region 251b. In this instance, a mark indicating a selected state (e.g., shadow effect) displayed on the selected icon 1601b may be maintained.

Figure 16B:
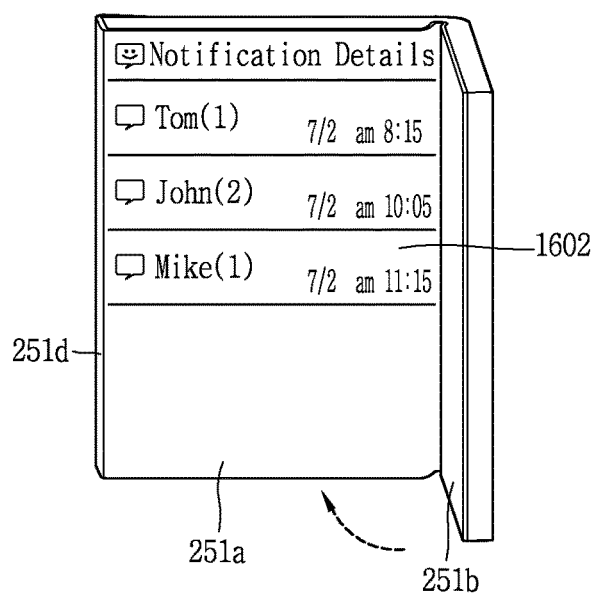
Figure 16C:
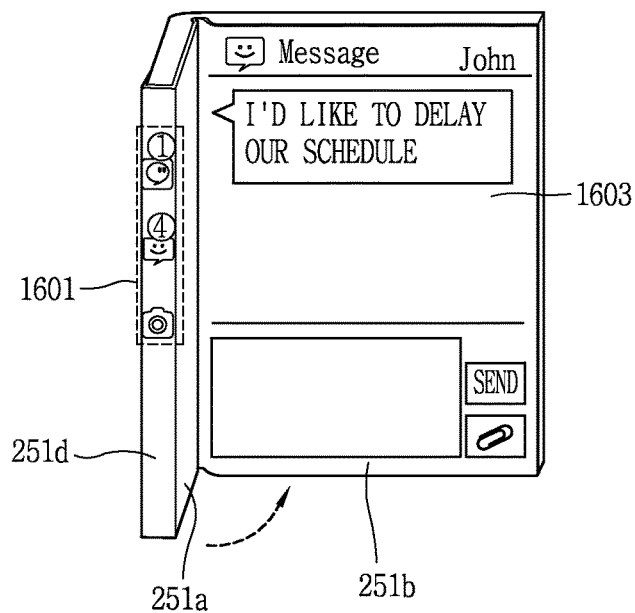

In the first open type where only the first inner display region 251a has been unfolded with the side display region 251d and the first inner display region 251a inclined toward a bottom surface, the controller 180 can output screen information 1602 indicating events generated from applications corresponding to a released state of the mobile terminal (e.g., a notification bar shown in FIG. 16(b)), to the first inner display region 251a.

The notification bar includes details related to an event generated from an application corresponding to the selected icon 1601b among the icons 1601 displayed on the side display region 251d, e.g., a name of another party who has sent a message, a message arrival time, etc.

In the third open type where both the first inner display region 251a and the second inner display region 251b have been unfolded, the controller 180 can output screen information indicating the event to one of the first inner display region 251a and the second inner display region 251b, and may output an execution screen of one of applications corresponding to the released state to another thereof.

Figure 17A:
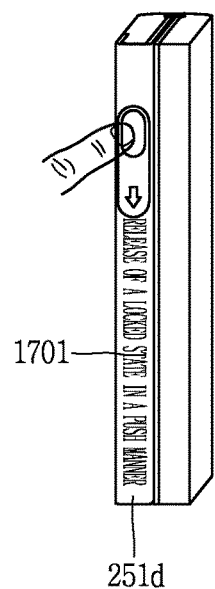
Figure 17A:
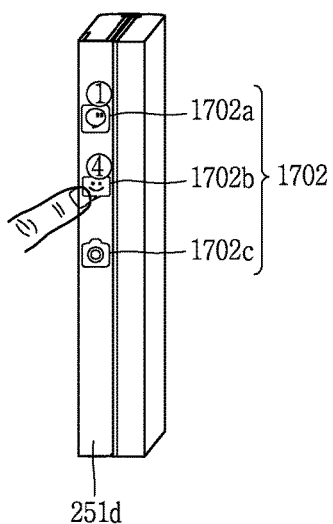
Figure 17A:
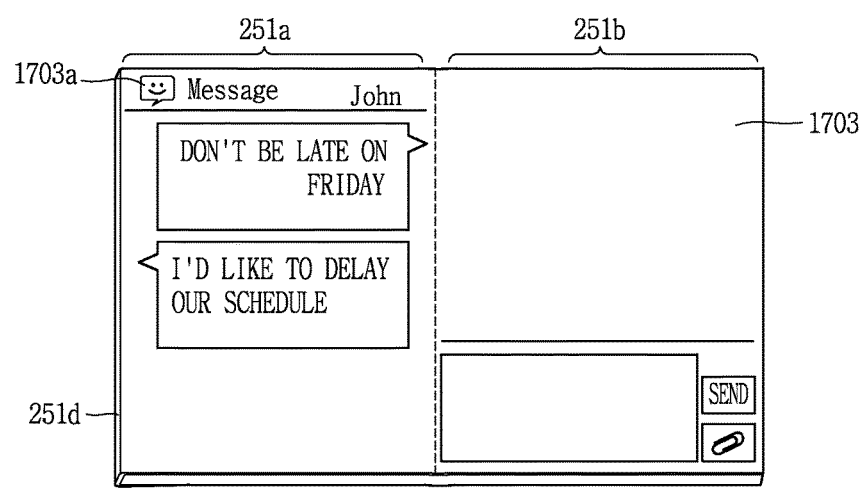

FIGS. 17A(a) to 17A(c) and 17B(a) to 17B(c) are views illustrating an embodiment to apply different types of touch inputs to the display unit, or to release a locked state using a fingerprint recognition sensor. If a user generates an opening event for opening the mobile terminal with holding (initially touching) the side display region 251d in a closed state, a fingerprint recognition sensor of the side display region 251d may be activated. In this state, if a consecutive touch (e.g., within several seconds after a first touch has been ended) is applied to the side display region 251d, or if the first touch is maintained in the activated state of the fingerprint recognition sensor, a fingerprint recognition function is executed. In the former case, a fingerprint of a finger corresponding to the consecutive touch is recognized. In the latter case, a fingerprint of a finger corresponding to the first touch is recognized. Even when the mobile terminal is re-closed before the fingerprint recognition function is completed, the activated state of the fingerprint recognition function is maintained for several seconds. That is, the activated state of the fingerprint recognition function is maintained with considering that the opening event has occurred for the purpose of activating the fingerprint recognition function, not for the purpose of opening the mobile terminal.

Referring to FIGS. 17A(a) to 17A(c), if a touch input is applied to the side display region 25 exposed to an upper side in a closed state, the side display region 251d is activated through the touch sensor, and a lock screen for releasing a locked state (e.g., image object 1701 indicating release of a locked state in a push manner) is displayed on the side display region 251d. If a user swipes the image object 1701 toward a preset direction (e, g, pushing toward a direction of an arrow), a locked state is released, and icons 1702a, 1702b, 1702c and 1702d of applications corresponding to the released state are displayed. As another example of the lock screen, a pattern input region, a password input region, etc. for releasing a locked state may be output.

If the mobile terminal is converted into an open state, when a touch input has been applied to one of the displayed icons 1601, an execution screen of an application corresponding to the touch-applied icon is output to at least one of the first and second inner display regions 251a and 251b. That is, once the mobile terminal is completely unfolded, a selected icon 1703a and an execution screen of an application (i.e., a chat screen 1703) are displayed on the first and second inner display regions 251a and 251b as shown in FIG. 17A(c).

Figure 17B:
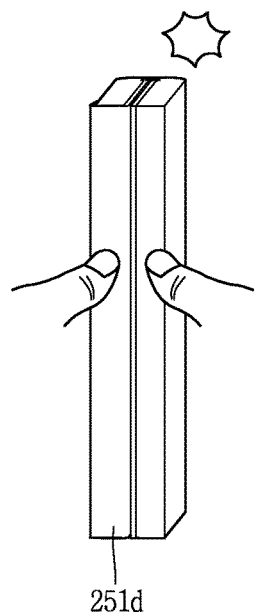
Figure 17B:
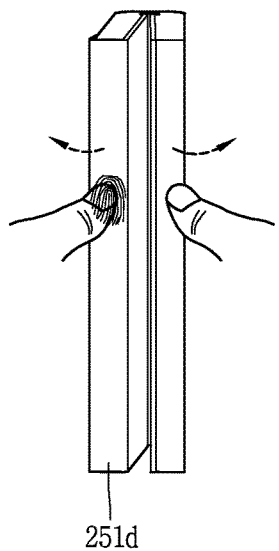
Figure 17B:
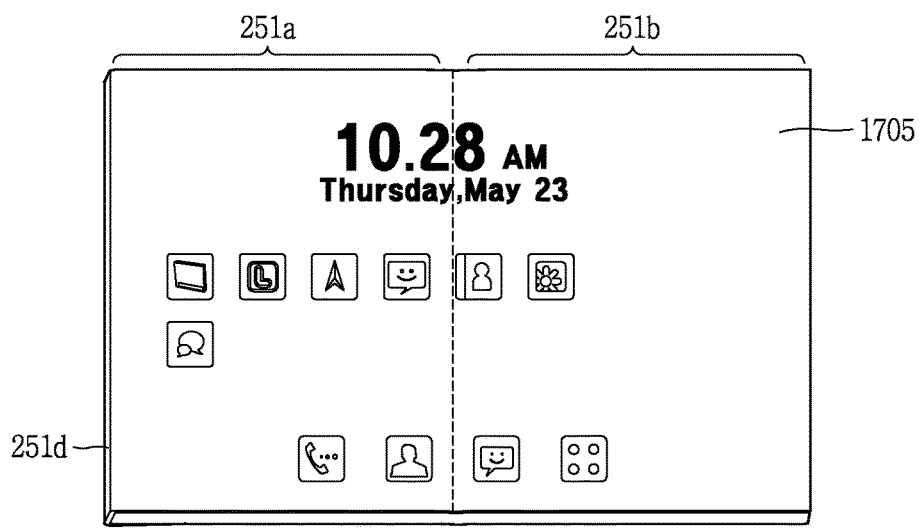

Referring to FIGS. 17B(a) to 17(c), a fingerprint recognition sensor may be provided at the outer display region 251c and/or the side display region 251d of the display unit. The fingerprint recognition sensor is configured to perform authentication using a fingerprint indicating a user's own characteristic. A locked state may be released using such fingerprint recognition sensor. For authentication of a user, feature information on a fingerprint is extracted through a touch input, and then the feature information is compared and matched with feature information pre-registered in the mobile terminal.

When a user is about to unfold the mobile terminal with holding the side display region 251d in a closed state, the controller converts the side display region 251d into an activated state. If a magnetism change corresponding to an opening event is sensed, or if a moving distance of a hinge portion is recognized, the fingerprint recognition sensor of the side display region 251d is activated. More specifically, if an opening event occurs in the second closed state where the first region and the second region face each other and the fourth region is exposed to an upper side, the controller performs a user authentication by activating the fingerprint recognition sensor of the fourth region.

Then, the controller converts the locked state of the mobile terminal into a released state, based on a result of the user authentication. For instance, if a user is determined as an authorized person as a result of the user authentication, a home screen page 1705 which is in a released state is output to the first and second inner display regions 251a and 251b of the unfolded mobile terminal as shown in FIG. 17B(c). As another example, if a user is determined as a non-authorized person as a result of the user authentication, a lock screen corresponding to a locked state, or icons of applications executable in a locked state may be output to the first and second inner display regions 251a and 251b of the unfolded mobile terminal. In this instance, a notification message such as 'You are not an authorized person' or 'The mobile terminal is in a locked state due to failure of authentication' may be displayed on the side display region 251d (outer display region) or the first and second inner display regions 251a and 251b. Alternatively, a corresponding voice guidance may be output.

When a user is about to unfold the mobile terminal with holding a frame of the first inner display region 251a, in the first closed state where the first inner display region 251a is folded to cover the second inner display region 251b and the outer display region 251c is exposed to an upper side, the controller 180 can activate the outer display region 251c according to a touch input, and may perform user authentication by activating the fingerprint recognition sensor of the outer display region 251c. The controller 180 can convert a locked state of the mobile terminal into a released state, based on a fingerprint recognition result on the outer display region 251c.

If an opening event occurs in a closed state, information which has been displayed on the third region or the fourth region may be changed into other information while the closed state is converted into an open state. That is, the controller 180 can control different information to be displayed on the third region or the fourth region, according to an open degree corresponding to an opening event.

More specifically, if the mobile terminal is open with an angle less than a preset value after an opening event has occurred, the controller 180 can display first information on the third region or the fourth region. Further, if the mobile terminal is open with an angle more than the preset value even if the mobile terminal has not been converted into an open state, the controller 180 can change the first information displayed on the third region or the fourth region, into second information. The second information disappears when the mobile terminal is converted into an open state, and the first and second inner display regions are converted into an activated state.

Figure 18A:
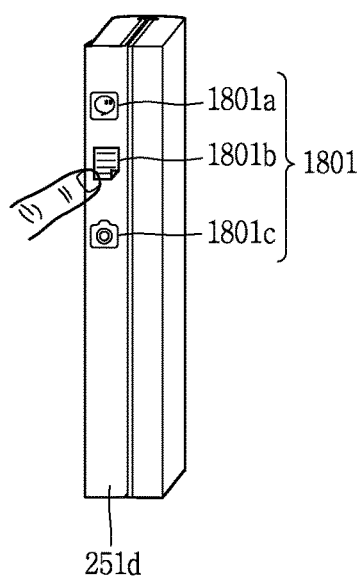
FIGS. 18(a) to 19(c) are conceptual views illustrating a method of controlling output from an inner display region, using an outer display in a closed state.
Figure 18B:
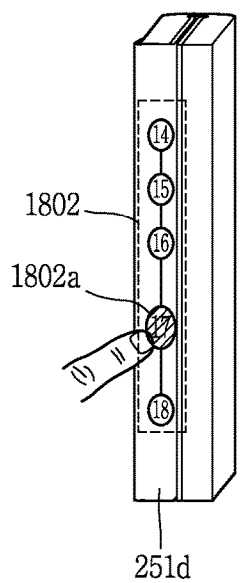
Figure 18C:
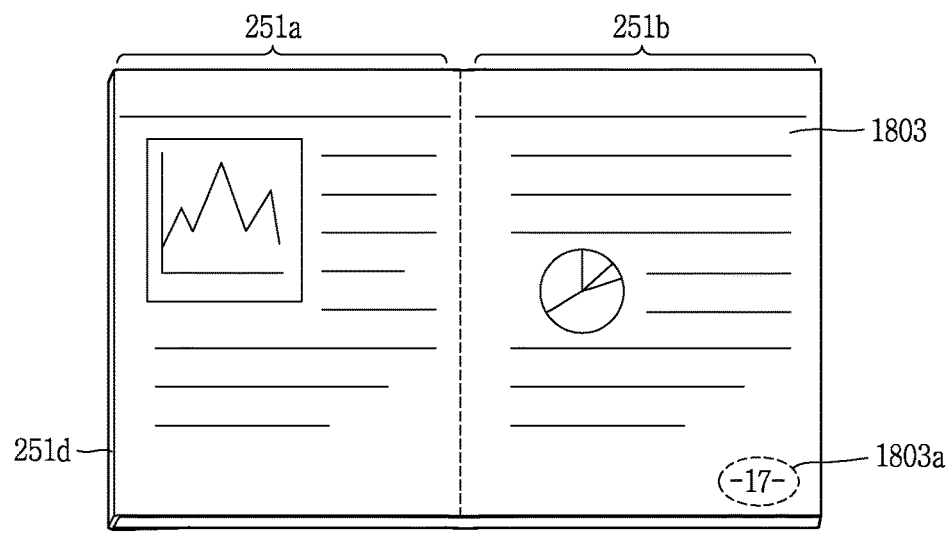

FIGS. 18(a) to 18(c) and 19(a) to 19(c) are conceptual views illustrating a method of controlling output of first and second inner display regions using an outer display in a closed state. As shown in FIGS. 18(a) to 18(c), if a side display region 251d is activated in a second closed state where the side display region 251d is exposed to an upper side and a first inner display region 251a and a second inner display region 251b face each other, icons 1801a, 1801b and 1801c of applications which were being executed on the first and second inner display regions 251a and 251b are displayed on the side display region 251.d. When a touch input applied to one 1801b of the icons 1801a, 1801b and 1801c has been maintained, if an angle between the first inner display region 251a and the second inner display region 251b becomes a reference value ('θ') or more than, additional information on an application corresponding to the selected icon 1801b, i.e., an image 1802 of selectable web pages are displayed.

The image 1802 may be displayed such that a small page number is displayed at an upper side whereas a large page number is displayed at a lower side. A user may select a desired web page number by up-down moving a touch input applied to the image 1802. For instance, if the mobile terminal is completely unfolded when a touch input has been applied to an image 1802a indicating a page No. 17, a screen 1803 showing a page No. 17 of a web page corresponding to a selected icon 1801b is displayed on one of the first and second inner display regions 251a and 251b.

As another example of additional information on an application corresponding to the selected icon 1801b, there may be selectable sorted items such as dialogue screens of a message application, and folders of a gallery application.

Figure 19A:
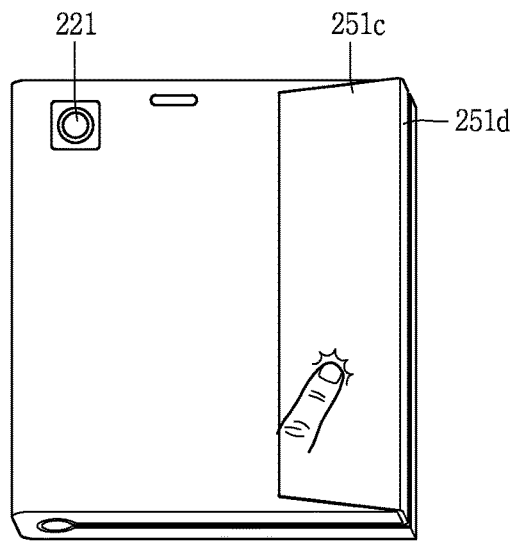
Figure 19B:
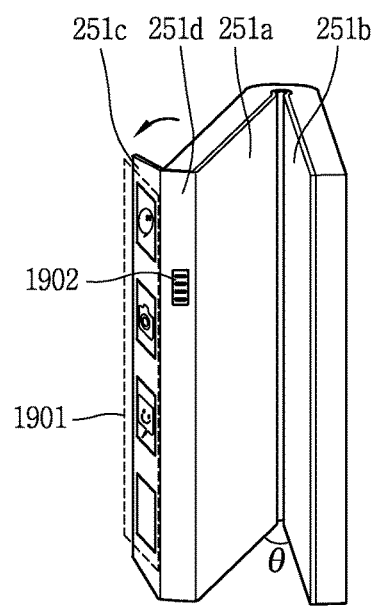
Figure 19C:
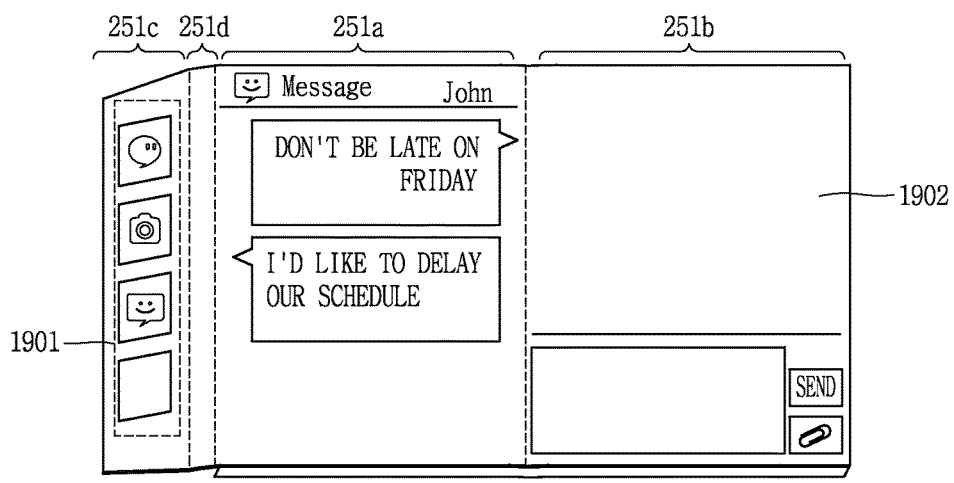

In another embodiment, as shown in FIGS. 19(a) to 19(c), if a touch event is detected from the outer display region 251c in a first closed state where the outer display region 251c is exposed to an upper side and the second inner display region 251b is covered by the first inner display region 251a, the controller performs a user authentication by activating a fingerprint recognition sensor. And the controller converts a locked state of the mobile terminal into a released state based on a result of the user authentication. Then the controller displays icons 1901 of executable applications corresponding to the released state, on the outer display region 251c.

Under this state, if the first closed state is converted into a second closed state where the side display region 251d is exposed to an upper side and the first inner display region 251a and the second inner display region 251b face each other, the controller displays information on the execution screen on the outer display region 251c. When the outer display region 251c is unfolded by a predetermined angle, the controller generates a scroll bar on the side display region 251d, the scroll bar for up-down moving information output to the outer display region 251c.

For instance, as shown in FIG. 19(b), if the outer display region 251c is unfolded so as to rotate counterclockwise and an angle between the first inner display region 251a and the second inner display region 251b is less than a reference value ('θ'), a scroll bar for up-down moving icons displayed on the outer display region 251c is displayed on the side display region 251d. A user can up-down move information output to the outer display region 251c by up-down moving the scroll bar.

If the mobile terminal is completely unfolded as a user selects the icon output to the outer display region 251c using the scroll bar displayed on the side display region 251d, an execution screen of an application corresponding to the selected icon, i.e., a chat (message dialogue) screen 1902 is re-output to at least one of the first inner display region 251a and the second inner display region 251b.

As shown in FIG. 19(c), when both the outer display region 251c and the side display region 251d have been output in an open state, the displayed state of the icons on the outer display region 251c may be maintained, and the scroll bar which has been displayed on the side display region 251d may disappear so that the third region 251c can be distinguished from the first and second inner display regions 251a and 251b. Alternatively, the screen output to the first and second inner display regions 251a and 251 b may be extended up to the side display region 251d.

In addition, if the unfolded outer display region 251c is re-folded to the original state, when the scroll bar has been displayed on the side display region 251d, other information (e.g., icons which have been output to the outer display region 251c) may be displayed on the side display region 251d.

Figure 20A:
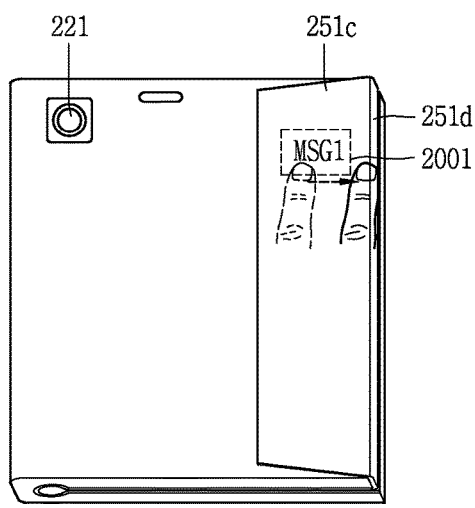
FIGS. 20A(a) to 20C(c") are conceptual views illustrating a method of processing an event which has occurred in a closed state, using an outer surface display.
Figure 20A:
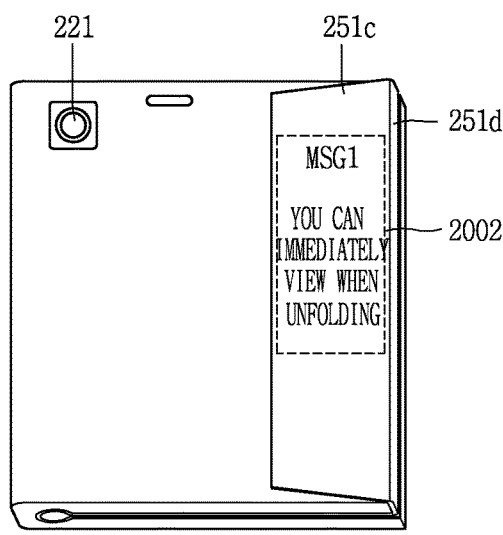
Figure 20A:
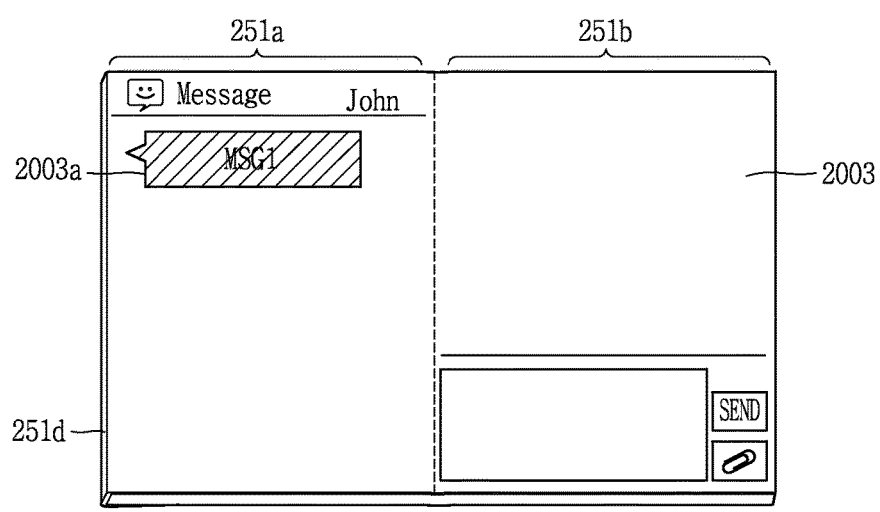

FIGS. 20A(a) to 20C(e) are conceptual views illustrating a method of processing an event generated in a closed state of the mobile terminal, using an outer display region. As aforementioned, if a touch input is not applied to images displayed on the outer display region 251c or the side display region 251d for a preset time, after the mobile terminal has been converted into a closed state from an open state, the displayed images disappear.

In the closed state, the controller 180 can sense occurrence of an event from at least one application. The event may be a missed call, an application to be updated, an incoming message, charging the mobile terminal, turning on the mobile terminal, turning off the mobile terminal, an LCD awake key, an alarm, an incoming call, a missed notification, etc. As another example, when specific information is received through the wireless communication unit of the mobile terminal, it may be determined that an event has occurred from an application related to the specific information.

As still another example, when a user's input item is included in a schedule management, it may be determined that an event has occurred from a schedule management application when the current date corresponds to the input item. For instance, when a message is received in a closed state where the outer display region 251c is exposed to an upper side as shown in FIG. 20A, a message notification icon 2001 indicating a message arrival is displayed on part (e.g, upper part) of the outer display region 251c.

Once the notification icon indicating occurrence of an event is displayed on the outer display region 251c or the side display region 251d, the controller controls a different function so as to be performed according to a drag direction of a touch input applied to the notification icon. More specifically, as shown in FIG. 20A(b), if a touch input applied to the notification icon 2001 has been extended up to the side display region 251d and then is released from the side display region 251d, a received message is stored.

A notification 2002, indicating that a message having a storage function can be immediately viewed when the mobile terminal is unfolded, is displayed on the outer display region 251c. If the message having a storage function is plural in number, events may be displayed in occurrence order, or an event related to screen information the most recently-output to the first and second inner display regions may be displayed with a highest order. Alternatively, if the message having a storage function is plural in number, occurred events may be displayed in a laminated manner, or in the form of a chrome tap.

In this state, if the mobile terminal is converted into an open state, a dialogue screen 2003 for a message having a storage function is immediately displayed on at least one of the first and second inner display regions 251a and 251b. A message 2003a having a storage function is displayed so as to be positioned at a central part of the screen. When executing a storage function with respect to a first message without executing a storage function with respect to a next message, if the mobile terminal is converted into an open state, a dialogue screen corresponding to the first message is displayed on at least one of the first and second inner display regions 251a and 251b. Under such configuration, the controller 180 can control an output operation so that an event which a user wishes to firstly view later can be displayed when the mobile terminal is open.

Figure 20B:
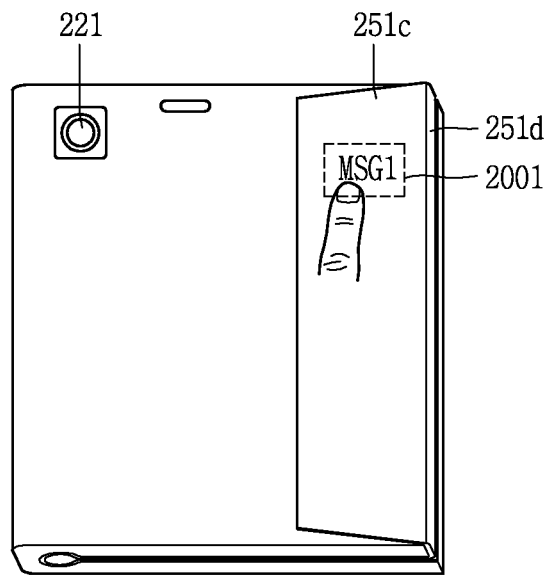
Figure 20B:
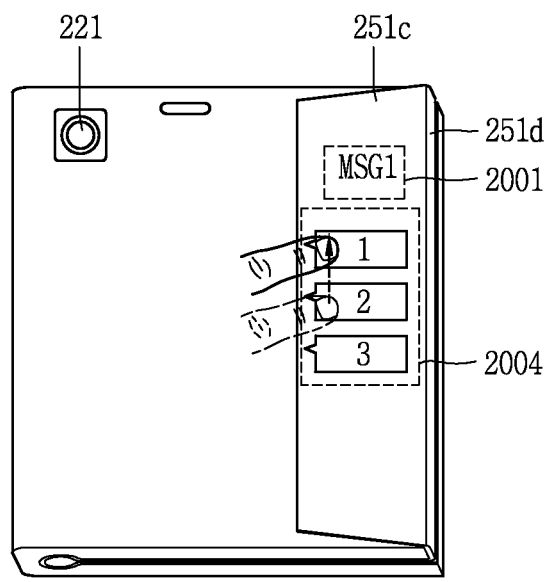
Figure 20B:
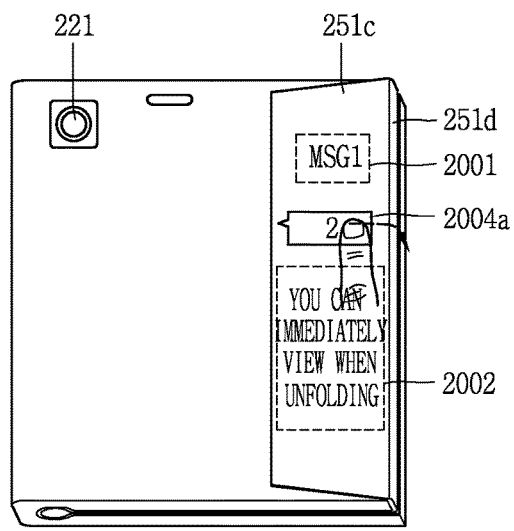
Figure 20B:
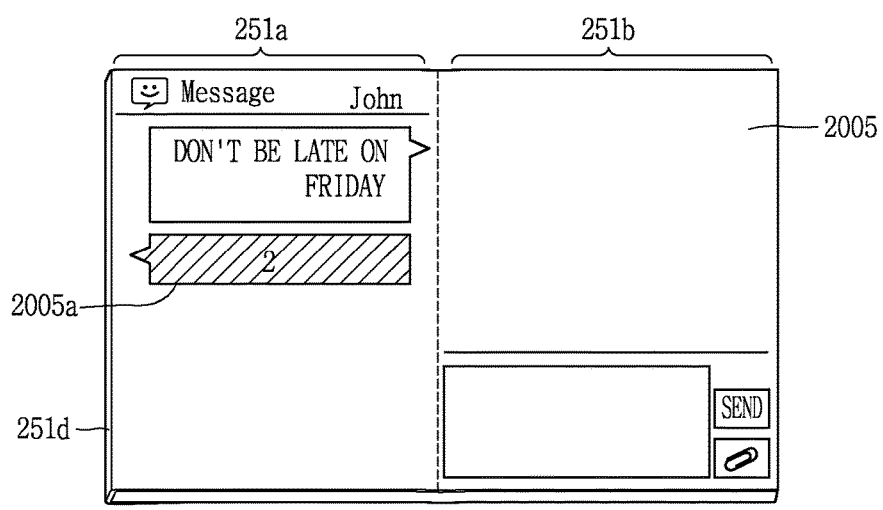

As another example, as shown in FIG. 20B(b), if a preset touch input (e.g., long touch input) is applied to an notification icon 2001 output to the outer display region 251c in a closed state, detailed items 2004 corresponding to a plurality of events are unfolded within the outer display region 251c. A user may check detailed items of an event by up-down applying a flicking touch input within the detailed items 2004.

When a specific item 2004a among the detailed items 2004 has been touched, if the specific item 2004a is dragged up to the side display region 251d to thus be released on the side display region 251d, an event storage function similar to that of FIG. 20A is executed. As shown in FIGS. 20B(c) and (d), an execution screen 2005 is output so that a selected specific item 2005a (e.g., a specific message when a plurality of messages have arrived from the same person) can be positioned at a central part of the first and second inner display regions when the mobile terminal is open. The selected specific message 2004a may be provided with a mark indicating storage or 'importance'. Such configuration is differentiated from the event storage function of FIG. 20A.

Figure 20C:
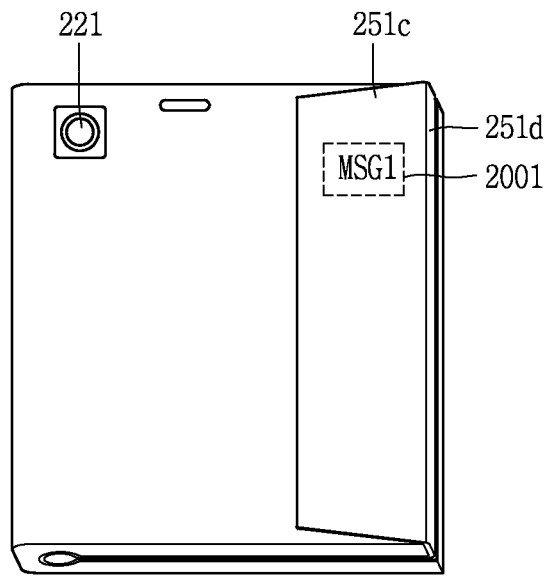
Figure 20C:
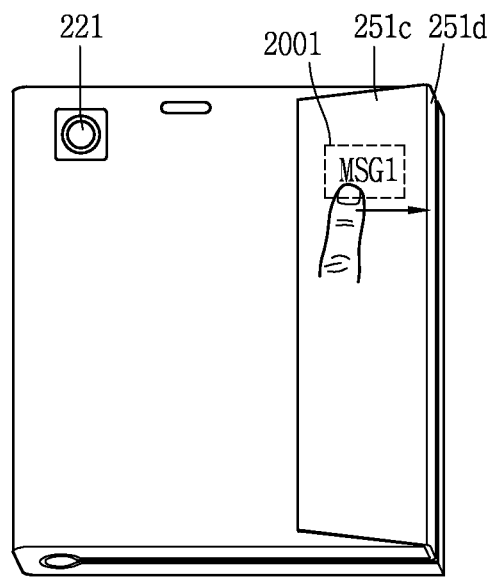
Figure 20C:
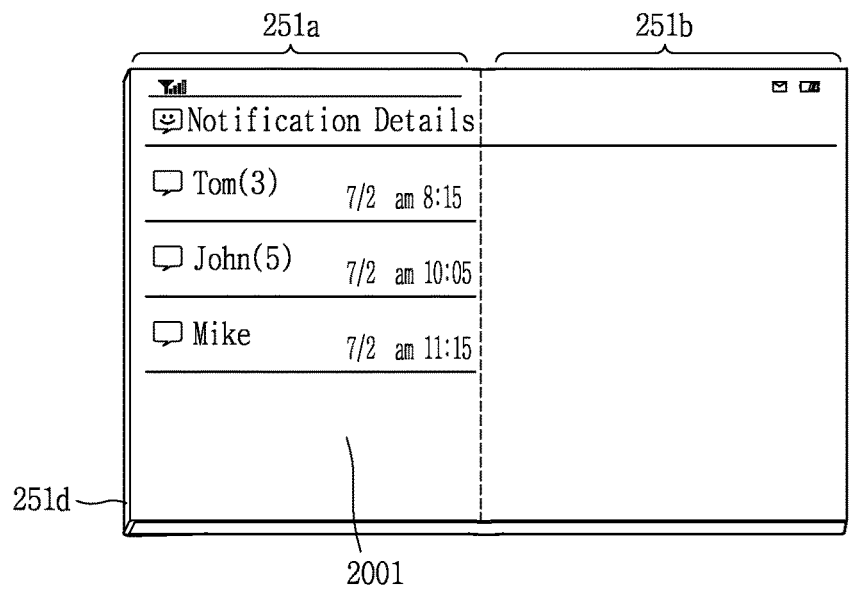
Figure 20C:
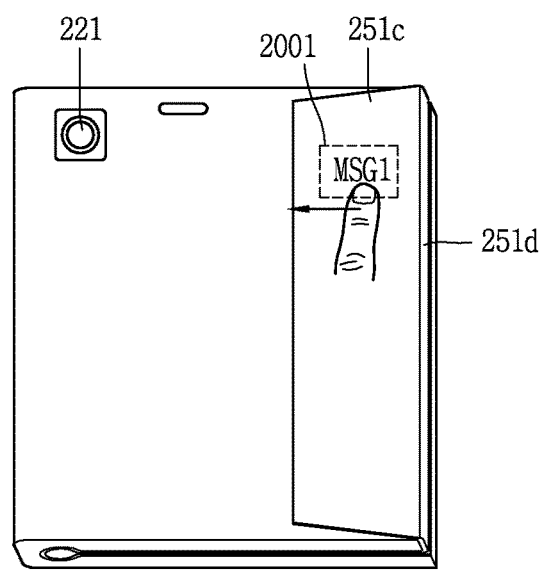

As another example, as shown in FIG. 20C(b), when a touch input applied to the event notification icon 2001 output to the outer display region 251c in a closed state is extended up to the side display region 251d to thus be released on the side display region 251d, a storage function with respect to a corresponding event is executed. In this state, if the mobile terminal is open, a list of events having a storage function is output to the first and second inner display regions 251a and 251b, as shown in FIG. 20C(c).

When a touch input applied to the event notification icon 2001 is released after having been extended to an opposite direction to the side display region 251d (i.e., after having been dragged to a left direction out of the outer display region 251c), it is determined that a user has checked the events. As a result, as shown in FIG. 20C(e"), the event notification icon 2001 displayed on the outer display region 251c disappears.

As another example, if a double tap is applied to the event notification icon 2001 or the outer display region 251c when the event notification icon 2001 has been displayed, all notification icons accumulated up to now disappear at a time. In this state, if the mobile terminal is open, an execution screen of an application recently-executed regardless of an event, or a home screen page is output to the first and second inner display regions 251a and 251b.

Figure 21B:
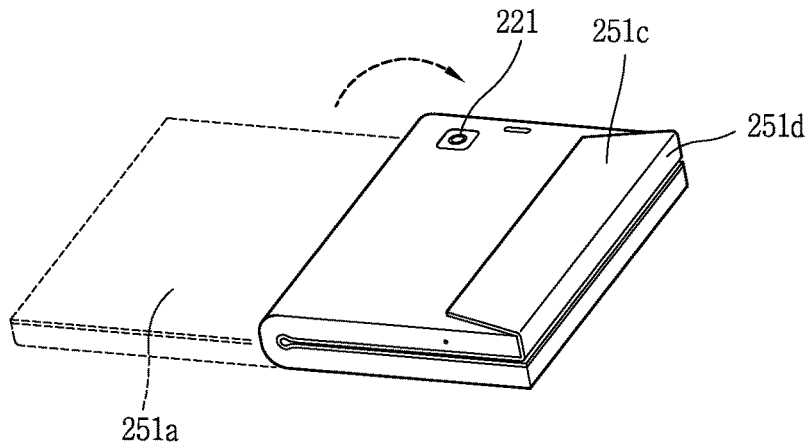
FIGS. 21(a), 21(b), 21(b"), and 21(c) are conceptual views illustrating a method of differently executing operation modes of a camera according to an open state and a closed state.

FIGS. 21(a) to 12(b") are conceptual view illustrating a method of differently executing an operation mode of a camera as one of an open state and a closed state of the mobile terminal is converted into another. For this, a camera 221 may be provided at an upper end of a frame region to which an outer display region 251c has been output, i.e., a left side rather than the outer display region 251c (refer to FIG. 2A).

If a camera application is executed in an open state, a first preview screen corresponding to a first capturing mode is output to at least one of first and second inner display regions 251a and 251b. The first preview screen may be an image displayed on a rear surface of the mobile terminal. For instance, as shown in FIG. 21(a), once the camera 221 is driven, an object image 2101 seen from an opposite side to the inner display regions is output to the first and second inner display regions 251a and 251b.

Figure 21C:
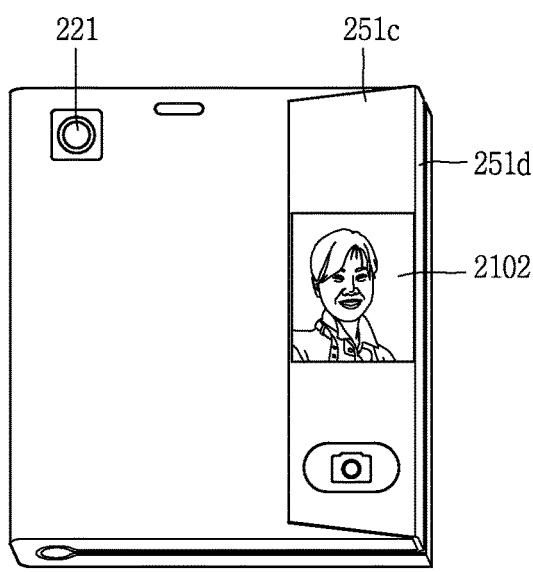

As the aforementioned folding event occurs, if the open state is converted into a first closed state where the first inner display region 251a covers the second inner display region 251b, the controller 180 can convert the first capturing mode which was implemented in the open state, into a second capturing mode. Thus, as shown in FIG. 21(c), a second image corresponding to the second capturing mode (i.e., 'self capturing mode'), i.e., an object image 2102 seen from a front surface of the outer display region 251c is output to the outer display region 251c disposed on an outer surface of the mobile terminal.

In addition, an icon corresponding to conversion of a capturing mode, and a capturing start key may be further displayed on the outer display region 251c. In addition, if the mobile terminal is converted into an open state, after the second capturing mode has been executed, a screen corresponding to an edition mode with respect to the second image captured in the second capturing mode, or a message inquiring whether to perform an edition operation or not, may be output to at least one of the first and second inner display regions 251*a* and 251*h*.

While the camera operates in the first capturing mode or the second capturing mode, if the closed state of the mobile terminal is converted into when the side display region 251*d* is exposed to an upper side and the first inner display region 251*a* and the second inner display region 251*b* face each other, execution icons 2103 for sharing at least one of a first captured image and/or a second captured image is displayed on the side display region 251*d*. If one of the execution icons 2103 is selected, a captured image may be sent to another party's mobile terminal or may be uploaded to a cloud server, while the closed state is maintained. Thus, the captured image can be shared.

Figure 22B:
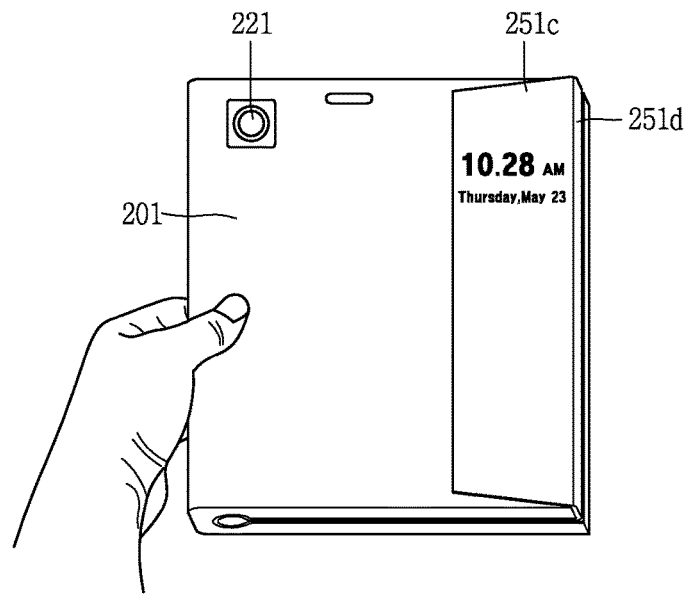
Figure 22C:
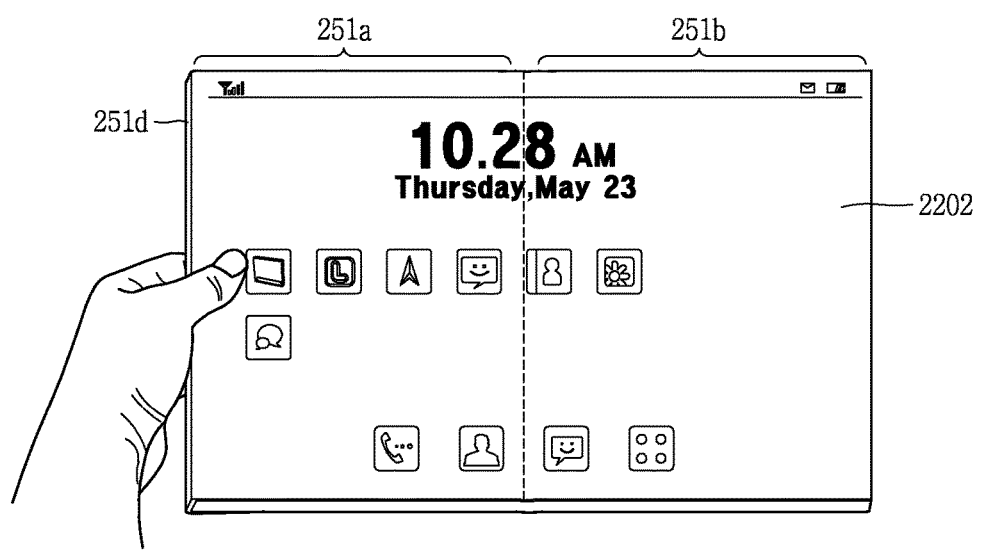

FIGS. 22(*a*) to 22(*c*) are conceptual views illustrating a method of maintaining, in a closed state, a released state of the mobile terminal in an open state. As shown in FIG. 22(*a*), when a preset pattern is input to a lock screen 2201 output to an open state, a locked state is converted into a released state. In this state, the controller 180 can sense that the open state of the mobile terminal has been converted into a closed state.

If a preset time lapses while the closed state is maintained, the controller 180 can re-convert the released state into the locked state. Thus, leakage of personal information stored in the mobile terminal occurring when a third party opens the mobile terminal, can be prevented. If a touch input applied to the mobile terminal for conversion into a closed state is maintained even in the closed state, the controller 180 can maintain the released state executed in the open state. For this, as shown in FIG. 22(*b*), a touch sensor may be also provided at a region 201 rather than the third region.

When a user holds the mobile terminal after a closing operation, if the user re-opens the mobile terminal as shown in FIG. 22(*c*), a home screen page 2202, which is in a released state for rapid operation controls, may be output to the first inner display region 251*a* and the second inner display region 251*b*. In this instance, an operation to move a touch point where the touch input has been applied within a preset time (e.g., within one second) (e.g., an operation to perform a touch-up operation for a short time in order to open the mobile terminal) for conversion into an open state or a closed state, may be ignored.

Figure 23A:
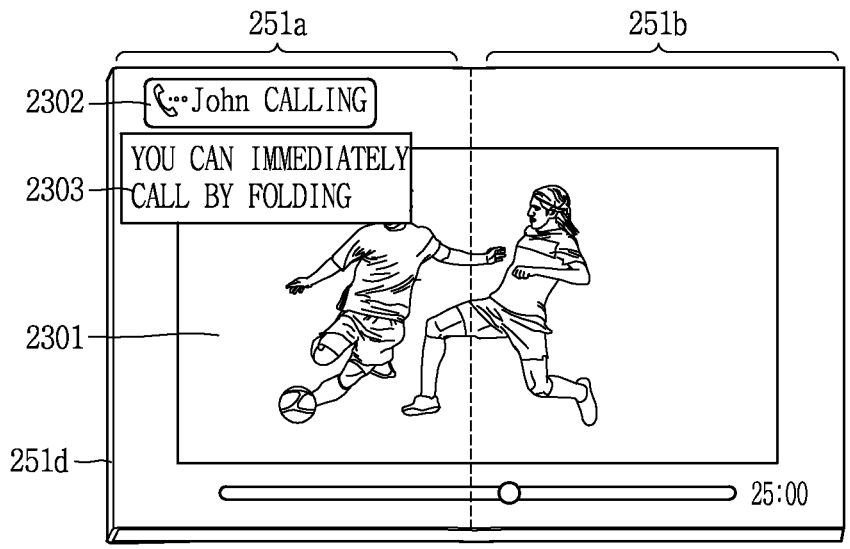
FIGS. 23A(a) to 23A(d) and 23B(a) to 23B(c") are conceptual views illustrating a method of outputting guide information for performing a different function according to a folding operation or an unfolding operation.
Figure 23A:
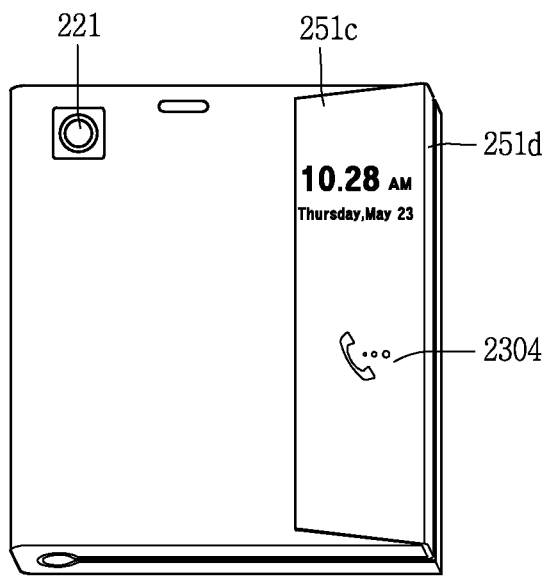
Figure 23A:
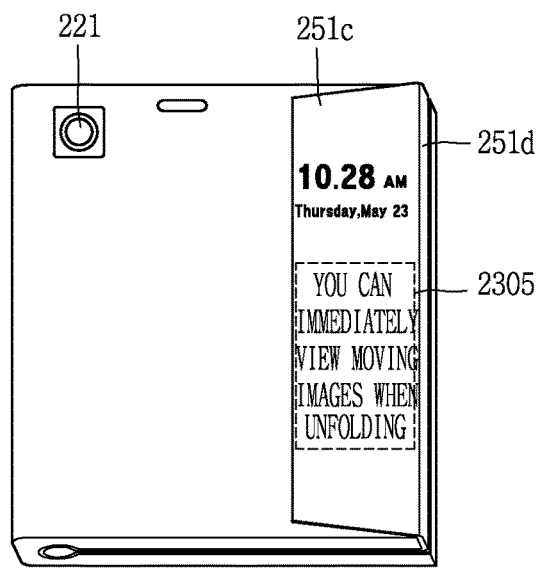
Figure 23A:
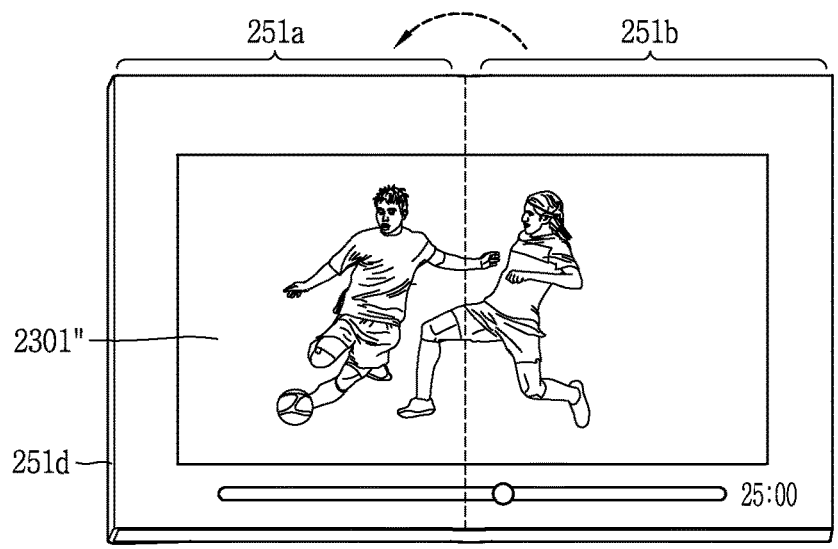

FIGS. 23A(a) to 23(*d*) and 23B(a) to 23B(c") are conceptual views illustrating a method of outputting guide information for performing a different function according to a folding operation or an unfolding operation. As shown in FIG. 23A(a) when a moving image play screen 2301 has been output in an open state, if an event (e.g., call signal) occurs from at least one application, an icon 2302 indicating an incoming call and guide information 2303 for inducing conversion into a closed state (e.g., 'You can directly call after folding') in response to the incoming call are output to part of a first region.

If a user moves the mobile terminal toward his or her ear after folding the mobile terminal so that the first inner display region 251*a* and a second inner display region 251*b* can contact each other, a call signal is immediately directed through a sensor of the sensing unit 140. In this instance, play of the moving image play screen 2301 is temporarily paused. If a call signal is ended in the closed state, guide information 2305 for inducing conversion into an open state (e.g., 'You can immediately appreciate moving images after unfolding.') is output to an outer display region 251*c* or a side display region 251*d*, as shown in FIG. 23A(c). If the mobile terminal is converted into an open state, the moving image play screen 2301 which has been temporarily paused is re-output to the first and second inner display regions 251*a* and 251*b* (refer to 2301"), and moving images are automatically played or a temporarily-paused scene is continuously output.

Figure 23B:
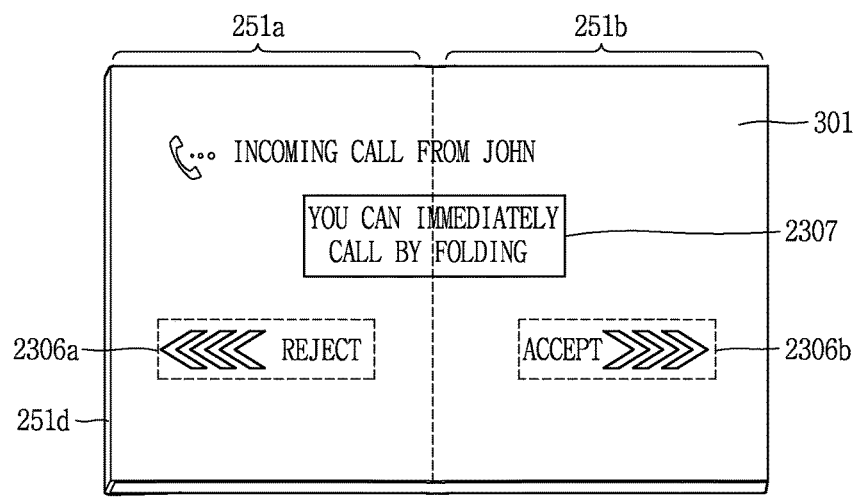
Figure 23B:
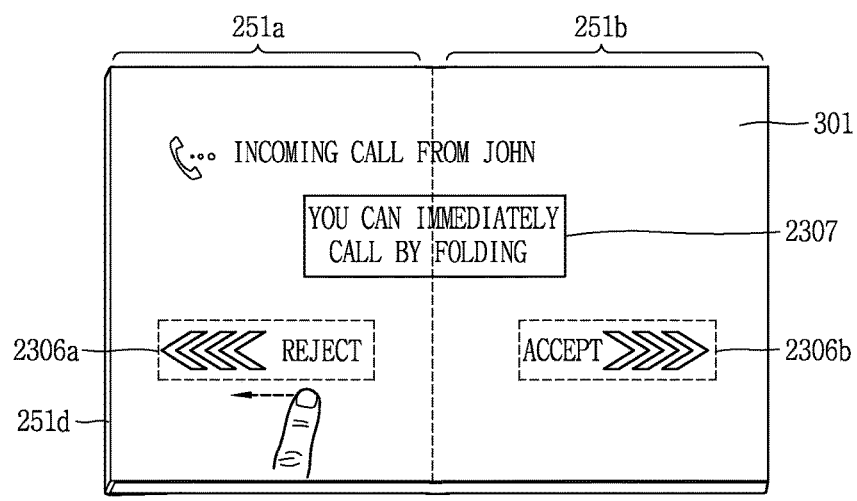
Figure 23B:
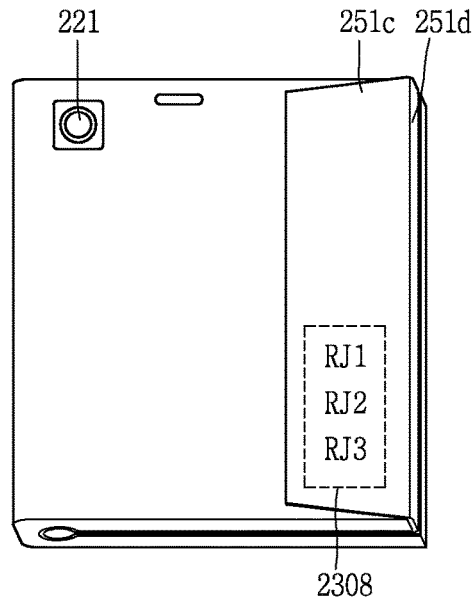
Figure 23B:
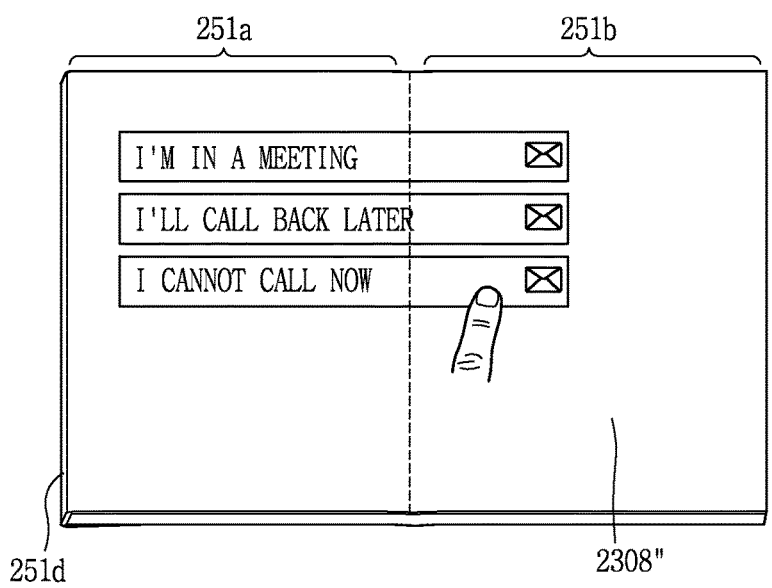

As another example, as shown in FIGS. 23B(a) and (b), if a user selects a rejection icon 2306*a* (call disconnection icon) with respect to an incoming call, and then folds the mobile terminal according to guide information 2307 for inducing conversion into a closed state, icons 2308 for sending rejection messages are displayed on the outer display region 251*c*. If the mobile terminal maintains an open state, the icons 2308 are displayed on the first and second inner display regions 251*a* and 251*b* in the form of message sending icons 2308".

Figure 24A:
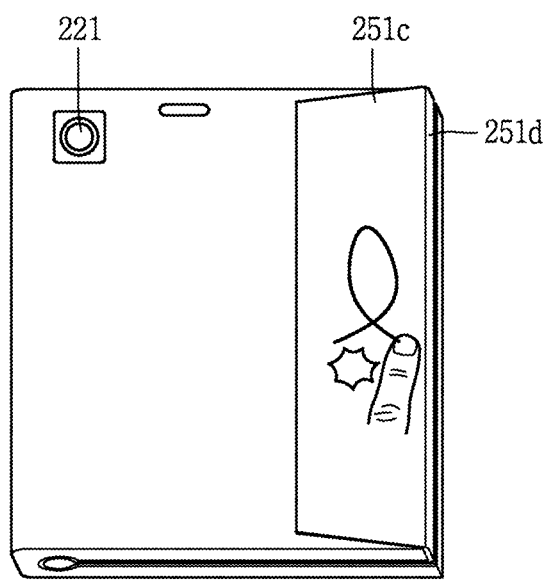
FIGS. 24(a) and 24(b) are conceptual views illustrating a method of sending an urgent message using an outer surface display.
Figure 24B:
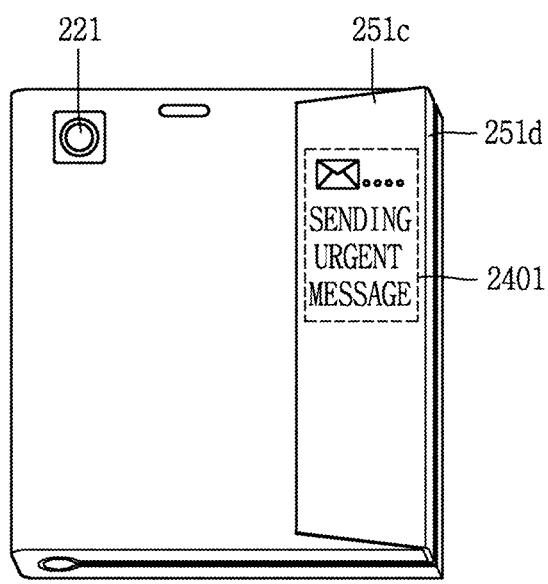

FIGS. 24(*a*) and 24(*b*) are conceptual views illustrating a method of transmitting an urgent message using an outer surface display. For this, another party's mobile terminal to which an urgent message is to be sent may be pre-registered through a user input. In a closed state where a second inner display region 251*b* is covered by a first inner display region 251*a*, if a preset touch line (e.g., alphabet 'e') or a gesture is applied to an outer display region 251*c* as shown in FIG. 24(*b*), an urgent message is sent to another pre-registered mobile terminal. That is, a user may inform his or her acquaintance of an urgent situation, without opening the mobile terminal. While the urgent message is being sent, an icon 2401 indicating that the urgent message is being sent may be displayed on the outer display region 251*c* or a side display region 251*d*.

Figure 25A:
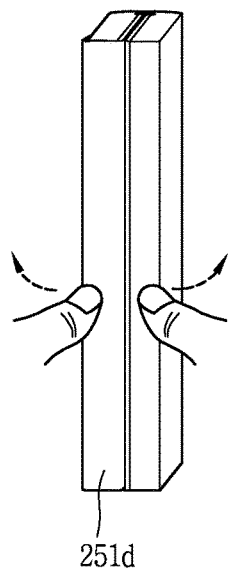
FIGS. 25(a) to 25(c) are conceptual views illustrating an operation to convert a closed state into an open state.
Figure 25B:
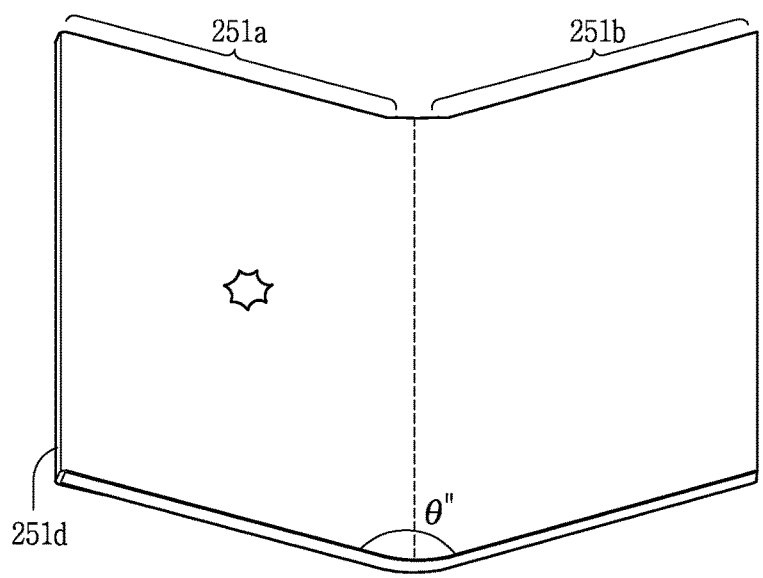
Figure 25C:
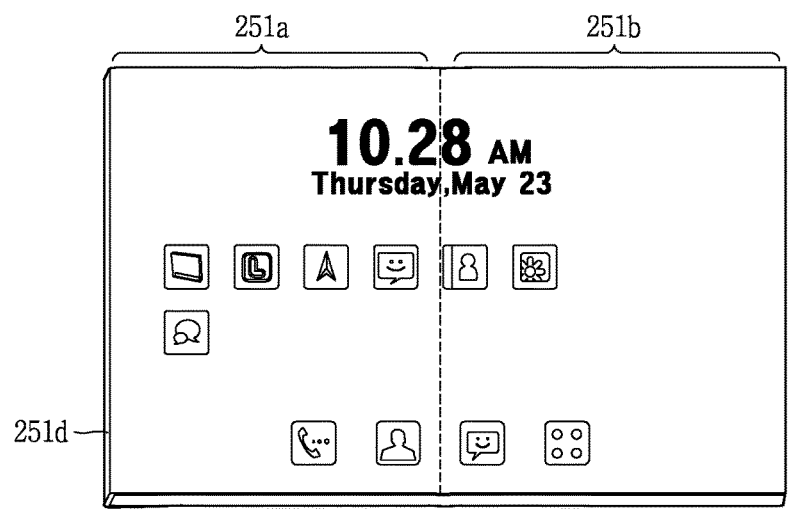

FIGS. 25(*a*) to 25(*c*) are views illustrating an operation to convert a closed state into an open state. As shown in FIG. 25(*a*), an opening event occurs according to a user's gesture to open the mobile terminal with holding a first inner display region 251*a* and a second inner display region 251*b*. If an angle between the first inner display region 251*a* and the second inner display region 251*b* becomes equal to or larger than a reference value (θ") for performing an automatic opening operation (e.g., 165°), the first inner display region 251*a* and the second inner display region 251*b* are automatically unfolded in the form of an extended open screen, by receiving an elastic force.

In the open state, if the angle between the first inner display region 251*a* and the second inner display region 251*b* becomes equal to or smaller than a reference value for performing an automatic closing operation (e.g., 15°), the mobile terminal is automatically in a closed state as the first inner display region 251*a* and the second inner display region 251*b* receive an elastic force.

Figure 26A:
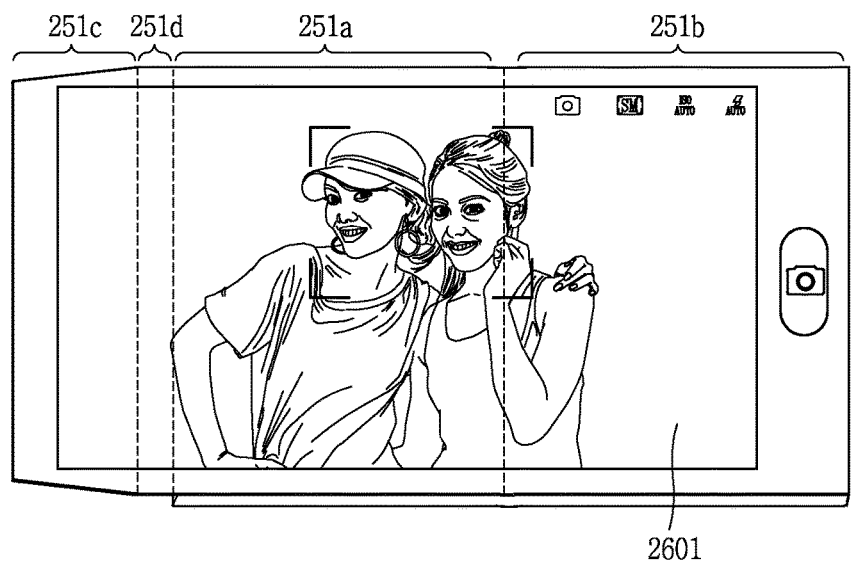
FIGS. 26A(a) to 27(c) are conceptual views illustrating a method of executing different functions by folding or unfolding a display unit.
Figure 26A:
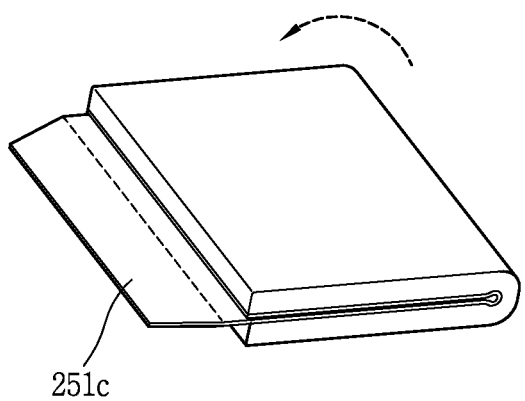
Figure 26A:
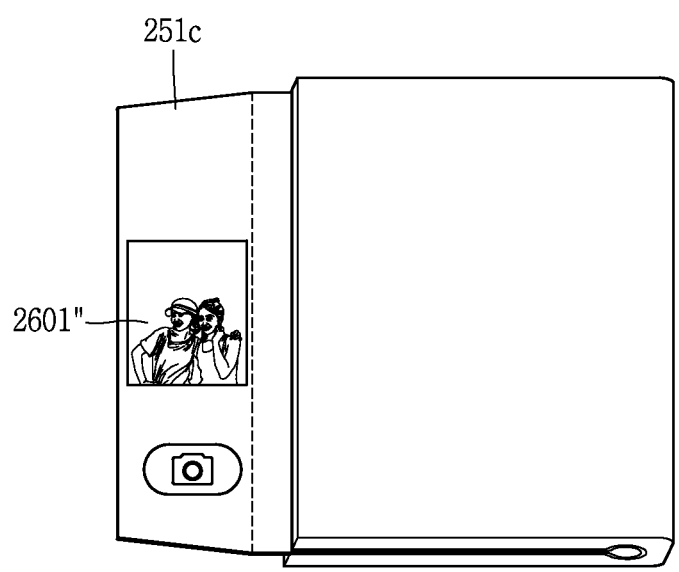

FIGS. 26A(a) to 27(*c*) are conceptual views illustrating a method of executing a different function by folding or unfolding the display unit. In this embodiment, an open state of the mobile terminal indicates that an outer display region 251*c* and a side display region 251*d* as well as a first inner display region 251*a* and a second inner display region 251*h* have been unfolded ("extended open state").

Referring to FIG. 26A(a), if the camera operates when all of the first inner display region 251*a*, the second inner display region 251*b*, the outer display region 251.*c* and the side display region 251*d* have been unfolded, a preview screen 2601 is output to an entire region of the display unit 215. In this state, if the mobile terminal is converted into a closed state where the second inner display region 251*b* covers the first inner display region 251*a*, the preview screen 2601 is automatically contracted to be displayed on the outer display region 251*c* and the side display region 251*d* as shown in FIG. 26A(c) ('screen contraction function').

Figure 26B:
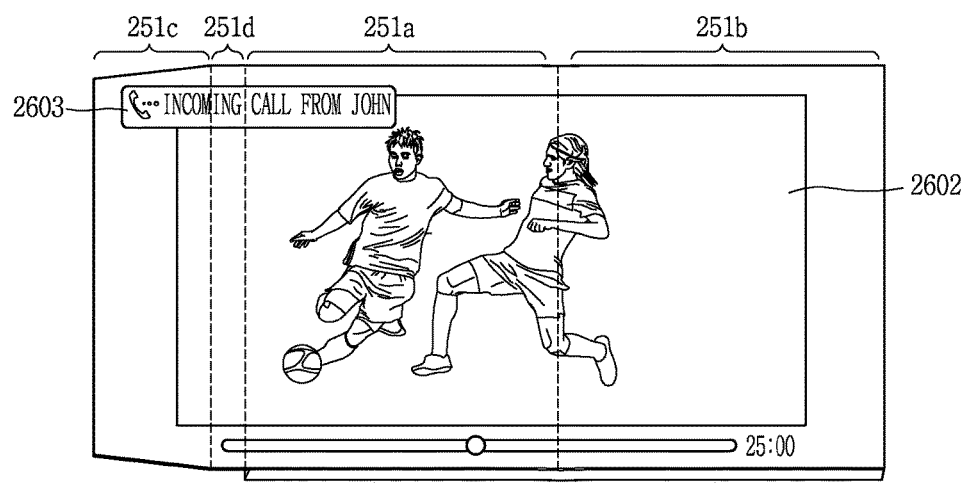
Figure 26B:
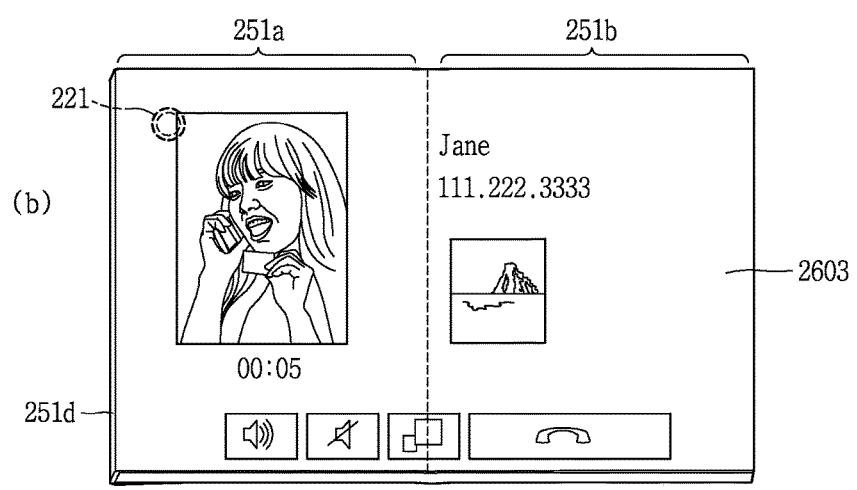
Figure 26B:
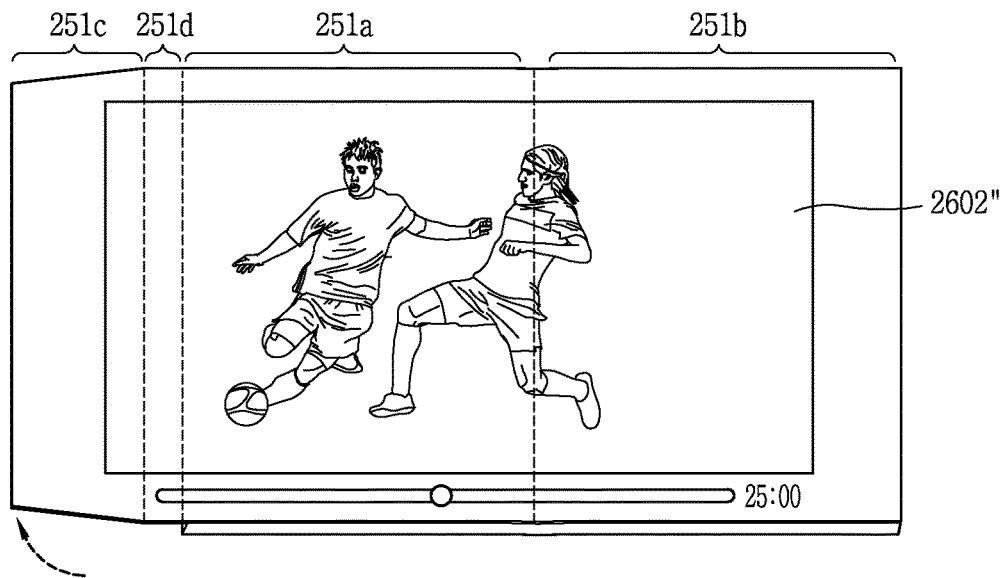

As another example, referring to FIG. 26B(a), when a call signal is received when a moving image display screen 2602 has been output to an entire region of the display unit. 215, if the outer display region 251c and the side display region 251d are folded to a preset direction (rear direction or clockwise direction), the received call is connected and the moving image display screen 2602 is temporarily paused ('play pausing function'). In this instance, an image 2603 viewed through a rear of the mobile terminal as shown in FIG. 26B(b) may be sent to another party's mobile terminal. If the folded outer display region 251c and side display region 251d are unfolded after the call is ended, the temporarily-paused play screen 2602 is replayed as shown in FIG. 26B(c) ('replay execution function').

Figure 27A:
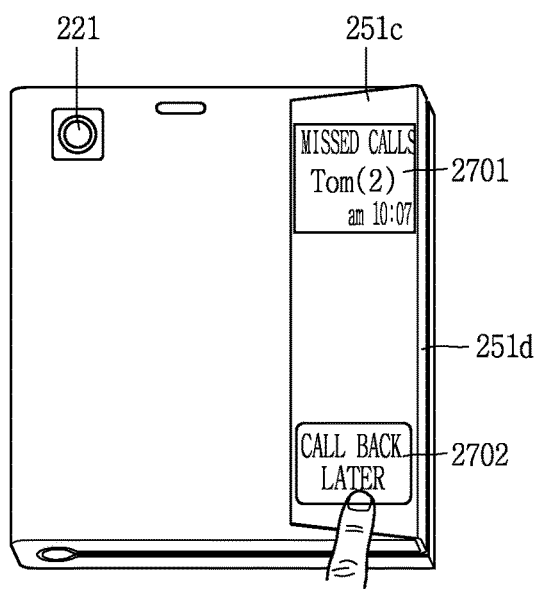
Figure 27B:
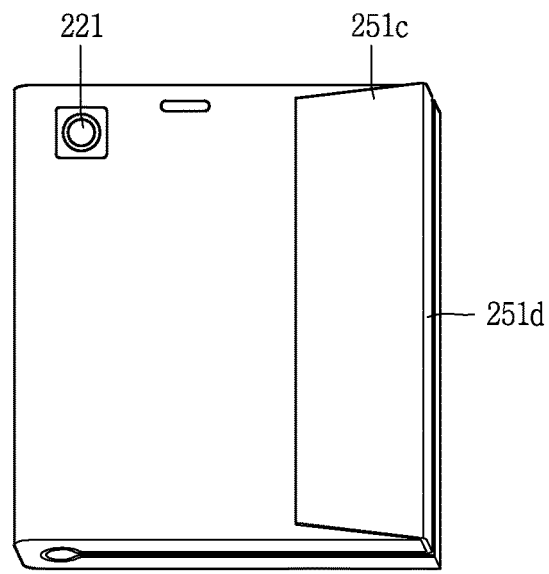
Figure 27C:
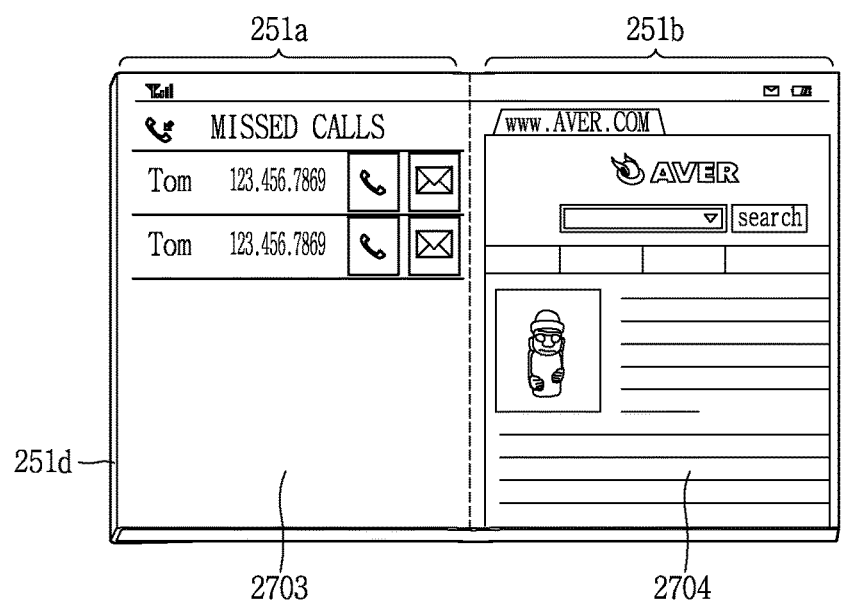

As still another example, referring to FIG. 27, when a notification icon 2701 indicating a missed call has been displayed on the outer display region 251c and a touch is applied to a call-back button 2702, the notification icon 2701 displayed on the outer display region 251c disappears. Then if the mobile terminal is unfolded for an open state, a screen 2703 for informing a first missed call and performing a call is displayed on the first and second inner display regions as shown in FIG. 27(c) ('event check function').

Figure 28A:
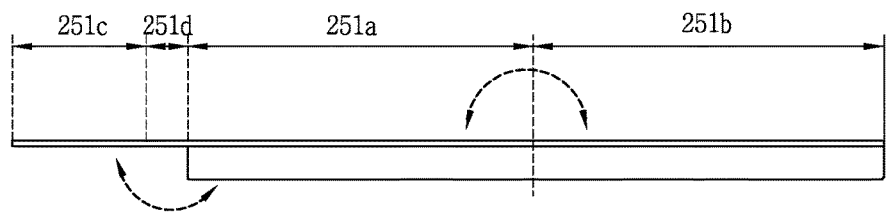
FIGS. 28(a) to 28(c) are conceptual views illustrating a foldable or unfoldable range of a display unit.
Figure 28B:
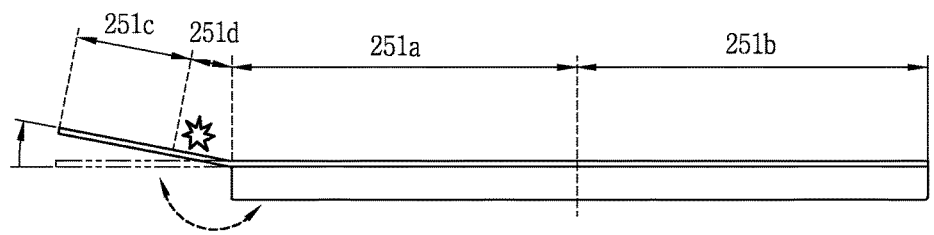
Figure 28C:
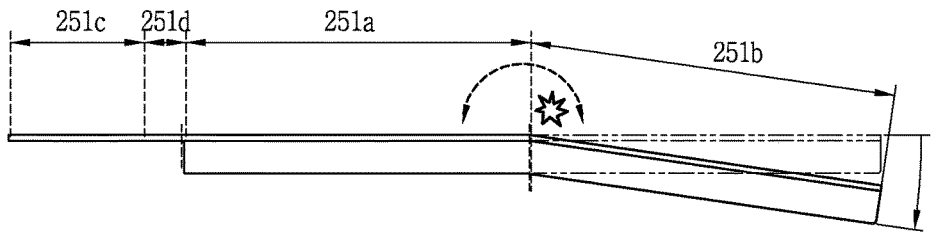

FIGS. 28(a) to 28(c) are conceptual views illustrating a method of indicating a foldable or unfoldable range of the display unit. As shown in FIGS. 28(a) to 28(c), the display unit 251 is configured to be foldable or =foldable within a predetermined range toward a preset direction, between a first inner display region 251a and a second inner display region 251b, between an outer display region 251c and a side display region 251d, and between the first inner display region 251a and the side display region 251d. That is, a foldable angle and direction of the display unit 251 may be preset according to characteristics of the flexible display.

In this instance, if the display unit 251 is folded or unfolded toward a direction rather than a preset direction or out of a preset range, the controller 180 can output an alarm by vibration or sound, by driving a motor disposed close to a folding event-occurred position. For instance, when a portion between the first inner display region 251a and the side display region 251d is folded in a direction rather than a preset direction (e.g., folded in an upward or clockwise direction) as shown in FIG. 28(b), or when a portion between the first inner display region 251a and the second inner display region 251b is folded in a direction rather than a preset direction (e.g., folded in a downward or clockwise direction) as shown in FIG. 28(c), if the folded angle exceeds a reference value (e.g., 180° or 210°), the controller 180 can output a vibration and/or an alarm. If a user is not viewing the screen, the controller 180 can output a vibration and/or an alarm by moving to another position where the vibration and/or the alarm is not output.

Figure 29A:
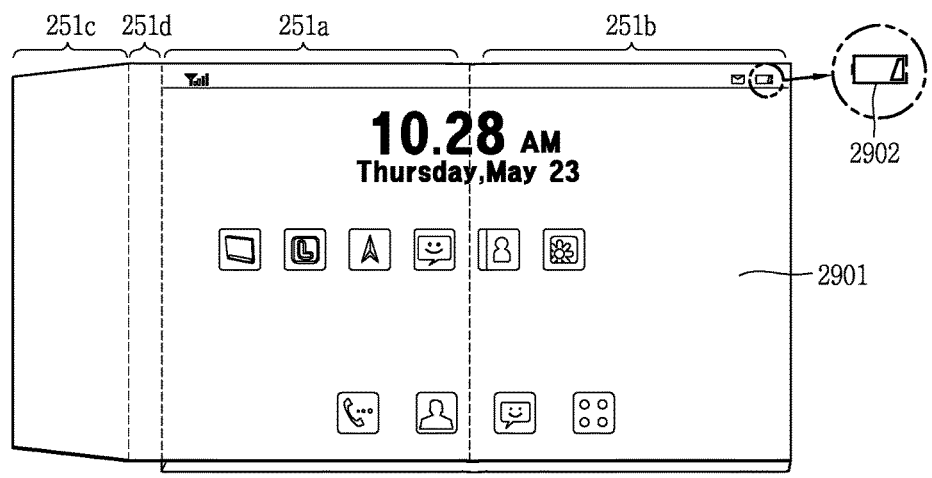
FIGS. 29(a) to 29(c) are conceptual views illustrating a method of controlling output when a battery amount is insufficient in a completely unfolded state of a display unit.
Figure 29B:
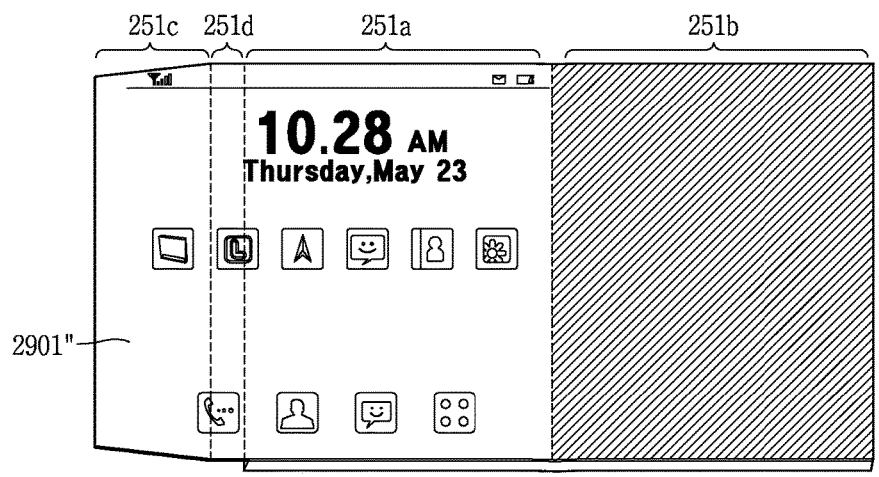
Figure 29C:
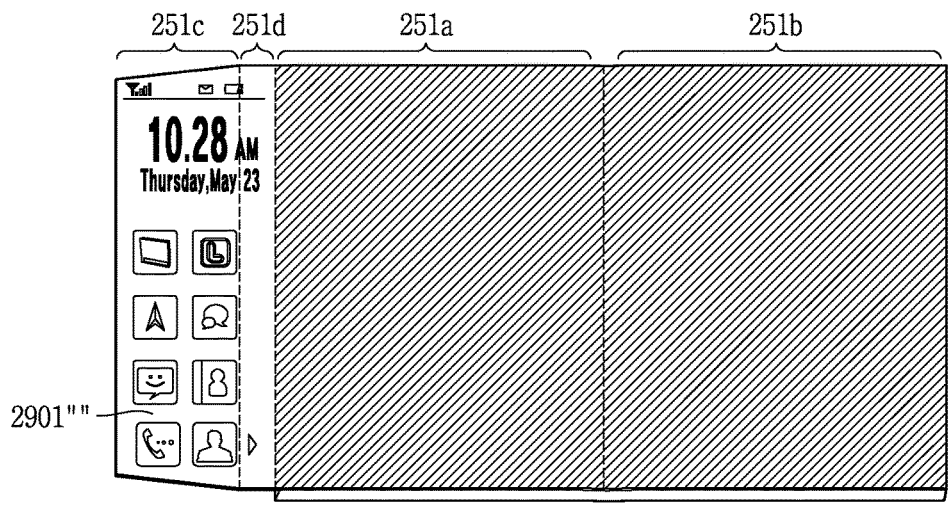

FIGS. 29(a) to 29(c) are conceptual views illustrating a method of controlling an output when the amount of a battery is insufficient when the display unit has been completely unfolded. As aforementioned, when the display unit 251 operates in an 'extended open state' in an open state of the mobile terminal, a consumption amount of a battery is increased. Thus, if a battery level is equal to or less than a predetermined value (e.g., 10%) as a check result on the battery, the controller 180 can convert part of the display unit 251 into a 'black-and-white mode' or may activate only a display being currently viewed by a user.

For instance, when an image 2902 indicating a current state of the battery has been displayed on part of the display unit in an open state, if a battery level is equal to or less than a predetermined value, the controller 180 can convert one region of the display unit (e.g., a second inner display region 251b) into a 'black-and-white mode' as shown in FIG. 29(b). In this state, if the battery is more consumed without being charged, the controller 180 can convert display regions 251a and 251b which are not currently viewed by a user, into a deactivated state. In this state, the controller 180 can firstly convert a display region having a large size into a deactivated state. A screen which has been previously output may be displayed on display regions 251c and 251d which are still in an activated state, in the form of a resized screen 2901''''.

Figure 30A:
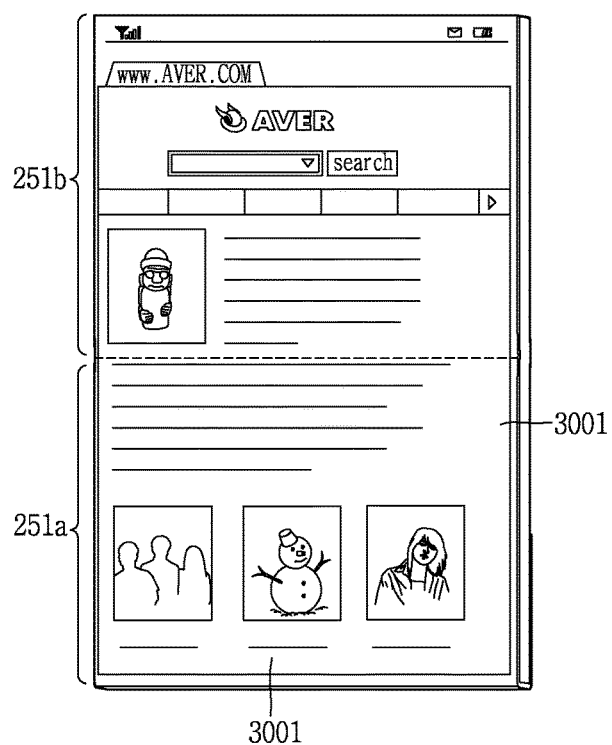
FIGS. 30A(a) to 30D(c) are conceptual views illustrating various embodiments to output a different screen by rotating, folding or unfolding a display unit which is in a completely unfolded state.
Figure 30A:
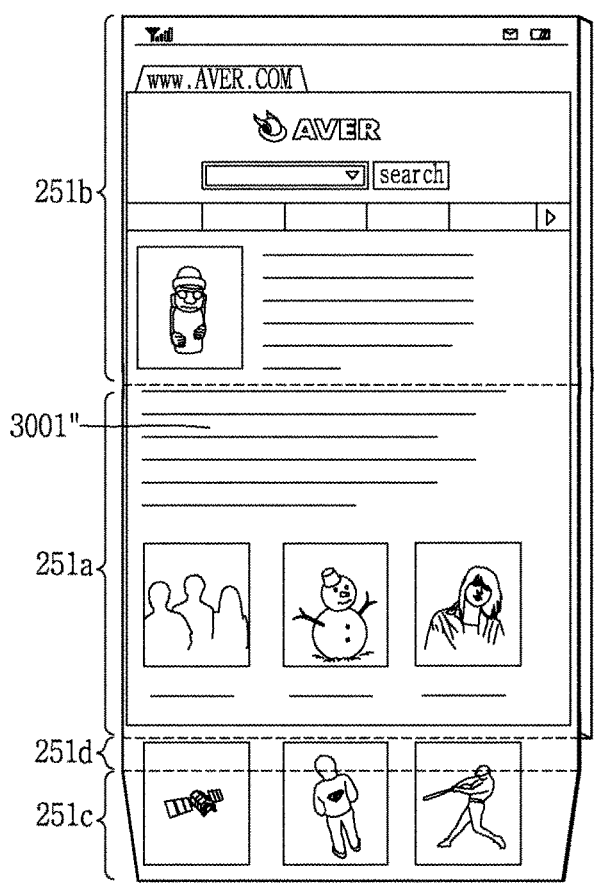

FIGS. 30A(a) to 30D(c) are conceptual views illustrating various embodiments to output a different screen by rotating, folding or unfolding the display unit 251 which is in a completely unfolded state. An open state of the mobile terminal indicates an exposed state of an inner surface of the mobile terminal, i.e., when a plurality of display regions disposed on an inner surface of the mobile terminal are exposed to an upper side by being partially or wholly unfolded based on a hinge portion. For instance, as shown in FIG. 3(a), when the first inner display region 251a and the second inner display region 251b are exposed to an upper side by being completely unfolded from each other may be referred to as an 'open state'. The open state may include an 'extended open state' where the outer display region 251c and the side display region 251d as well as the first inner display region 251a and the second inner display region 25113 are completely unfolded to thus be exposed to an upper side.

Referring to FIGS. 30A(a) to 30A(d), if a user inclines the mobile terminal which is in an open state toward a vertical direction, a web page screen 3001 is displayed on a first inner display region 251a and a second inner display region 251b in a vertical viewing mode. In this state, if other display regions 251c and 251d folded toward a rear surface are unfolded, screen information differentiated from the first and second inner display regions 251a and 251b (e.g., icons 3002 of frequently-executed applications) are displayed on the outer display region 251c and the side display region 251d, as shown in FIG. 30A(e). In this state, if a user performs a gesture to make his or her palm be toward a lower direction, the displayed icons 3002 disappear, and the web page screen 3001 which has been output to the first and second inner display regions 251a and 251 b is changed into a screen 3001'' extended up to the outer display region 251c and the side display region 251d.

Figure 30B:
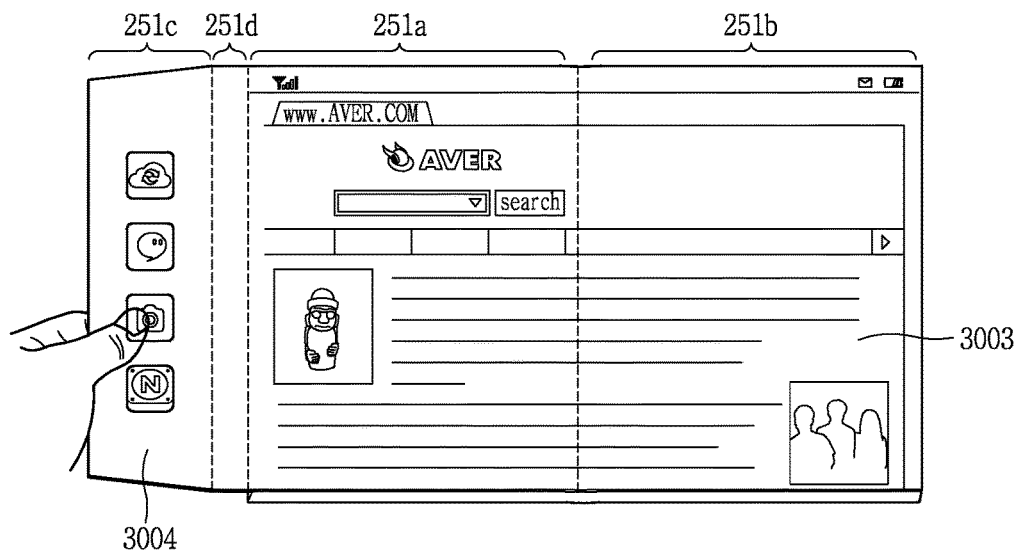
Figure 30B:
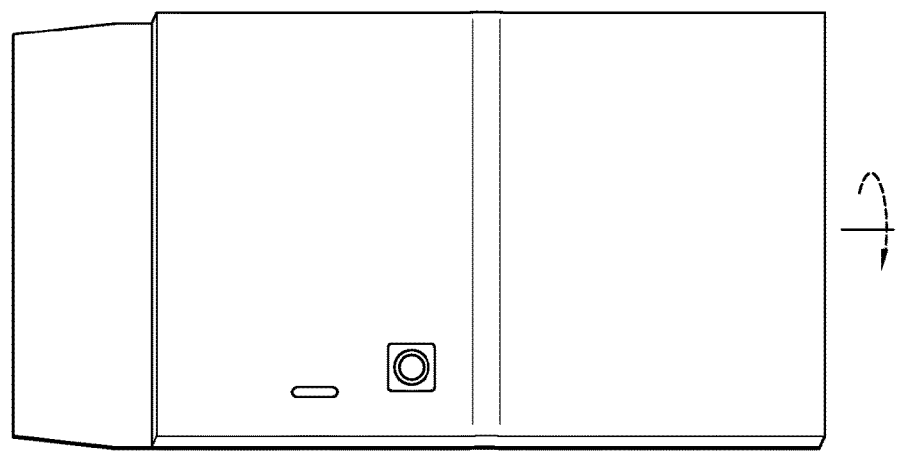
Figure 30B:
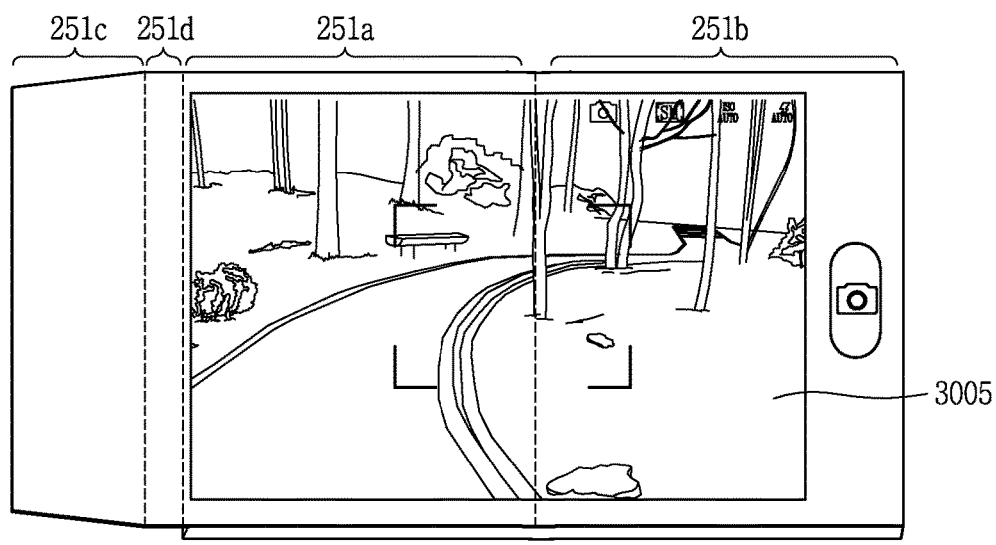

As another example, referring to FIGS. 30B(a) to 20B(c), in an open state, a web page screen 3003 may be output to the first inner display region 251a and the second inner display region 251b, and icons 3004 of recently-used applications may be displayed on the outer display region 251c and the side display region 251d. When a user's touch input applied to one of the icons 3002 has been maintained, if the mobile terminal makes one revolution (rotation) or if the mobile terminal is backward inclined by more than a predetermined angle to thus be forward rotated (refer to FIG. 30B(b)), a camera application selected by the user's touch input is executed. And the web page screen which has been output to the first inner display region 251a and the second inner display region 251b is changed into a preview screen 3005 by driving of a camera.

Figure 30C:
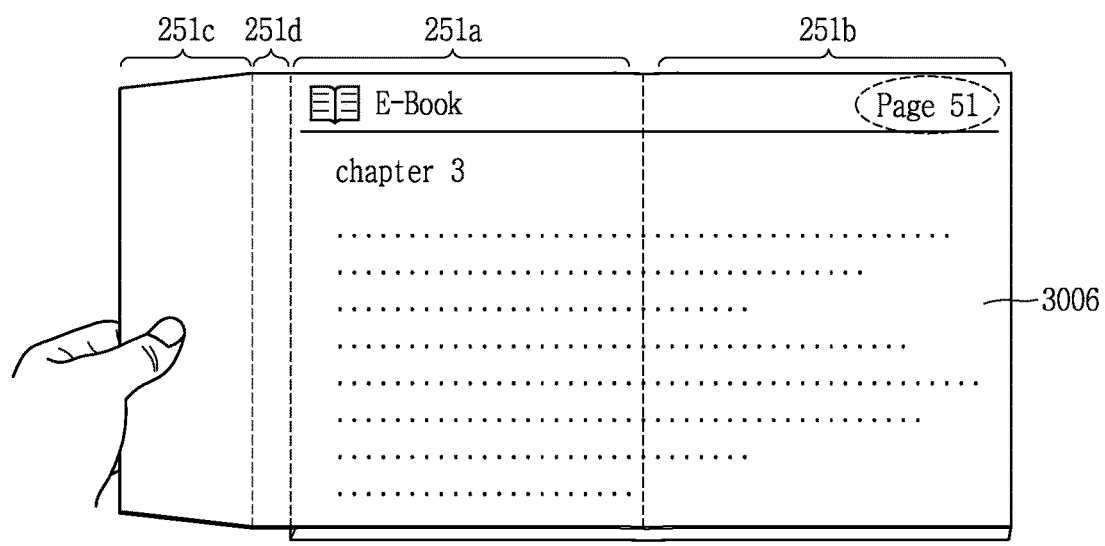
Figure 30C:
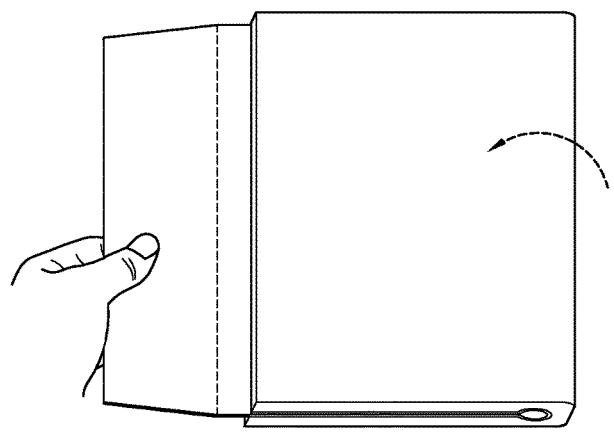
Figure 30C:
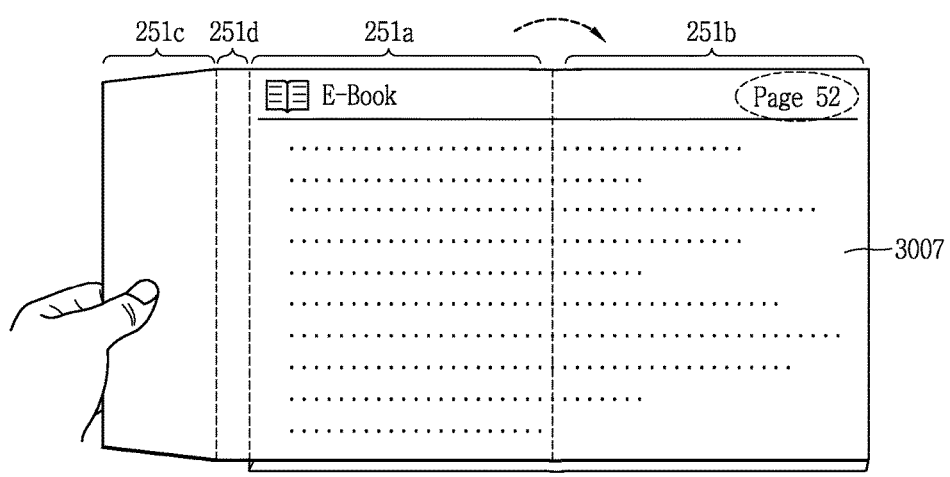

As another example, referring to FIGS. 30C(a) to 30C(c), in an open state where an execution screen 3006 of an e-book application has been output to the first inner display region 251a and the second inner display region 251b, a touch input is applied to the outer display region 251c. While the touch input is maintained, if a user folds and then unfolds the second inner display region 251b, or if a user folds a little and then unfolds the outer display region 251c toward the second inner display region 251b, a next page is displayed as shown in FIG. 30C(c). When the touch input applied to the outer display region 251c is maintained, if a user folds and then unfolds the first inner display region 251a, a previous page is displayed. Under such a configuration, a user can enjoy an e-book like turning over pages of a real book.

In addition, the amount of pages to be turned over may be controlled according to a position on the outer display region 251c where a touch input has been applied. For instance, if a user folds and then unfolds the display region while touching a lower side of the Outer display region 251c, a larger number of pages are turned over. Further, if a user folds and then unfolds the display region while touching an upper side of the outer display region 251c, a smaller number of pages are turned over. As still another example, if a user folds and then unfolds the display region while touching a lower side of the outer display region 251c, pages may be turned over in unit of a chapter, a middle title or a small title.

If the first inner display region 251a is folded to be unfolded, a previous page of a currently-output page (or a first page of a previous chapter) is output. Further, if the second inner display region 251b is folded to be unfolded, a next page of a currently-output page (or a first page of a next chapter) is output.

Figure 30D:
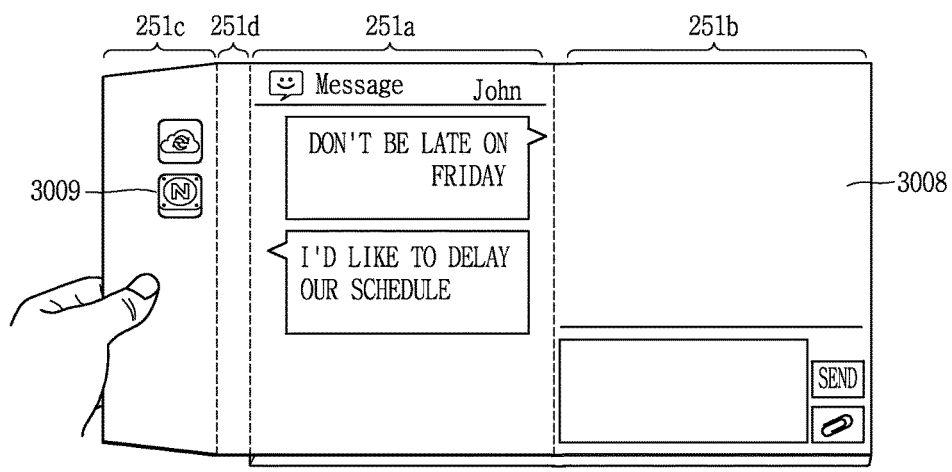
Figure 30D:
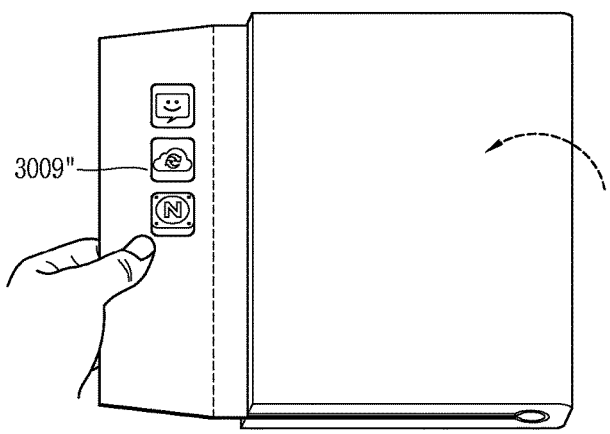
Figure 30D:
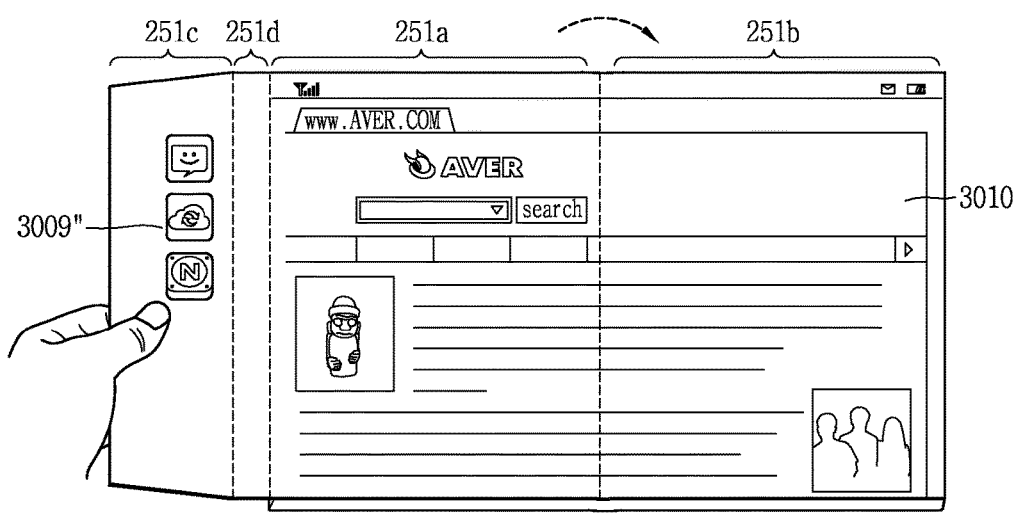

As still another example, referring to FIGS. 30D(a) to 30D(c), in an extended open state of the display unit 251, an execution screen 3008 of a specific application may be output to the first inner display region 251a and the second inner display region 251b, and icons 3009 related to recently-executed applications may be output to the outer display region 251c and the side display region 251d.

When a touch input applied to the outer display region 251c is maintained, if a user folds the second inner display region 251b on the first inner display region 251a, or if a user folds a little and then unfolds the second inner display region 251b, an icon of an application which has been output immediately before occurrence of a folding event (i.e., message application) is added to the outer display region 251c and the side display region 251d (refer to 3009"). In this state, if the second inner display region 251b is unfolded, the execution screen 3008 which has been output to the first inner display region 251a and the second inner display region 251b is changed into an execution screen of a previous application, i.e., a web page screen 3010 as shown in FIG. 30D(c).

The mobile terminal according to an embodiment of the present invention provides several advantages. First, even in a covered state of the first and second inner display regions, an output from the first and second inner display regions can be controlled by using the outer display region.

Secondly, guide information on an application or an operation executed on the first and second inner display regions can be provided by using the outer display region. Thirdly, while a user unfolds the mobile terminal so as to view the inner display regions, a locked state can be released or information on a recently-executed application can be provided by using the outer side surface extended display. Fourth, different screens or different functions can be provided according to various operations to fold or unfold the first and second inner display regions and the adjacent outer surface displays. This can enhance a user's convenience.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the head mounted display.

As the present features may be embodied in several forms without departing from the characteristics thereof, it should also be understood that the above-described embodiments are not limited by any of the details of the foregoing, description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body having an inner surface, an outer surface and side surfaces, and configured to be opened into an open state where the inner surface is exposed to an upper side, and closed into a closed state where the outer surface and the side surface are exposed to an upper side while the inner surface is covered;
   a touch screen having a first region and a second region disposed on the inner surface, a third region disposed on the outer surface, and a fourth region disposed on the side surface between the first region and the third region, in the closed state; and
   a controller configured to:
   display an execution screen of at least one application to at least one of the first and second regions in the open state,
   display information related to the execution screen on at least one of the third and fourth regions, based on a closed type of the terminal body corresponding to an occurred folding event of folding closed the terminal body, and
   execute a function related to the displayed information based on a received touch input applied to the corresponding first, second, third or fourth regions where the information is displayed.

2. The mobile terminal of claim 1, further comprising:
   a sensing unit configured to sense the closed type of the terminal body by detecting a gradient change at the first and second regions when the folding event occurs,
   wherein the controller is further configured to activate one of the third and fourth regions based on the detected closed type, such that the information related on the execution screen is displayed on the activated display region.

3. The mobile terminal of claim 2, wherein upon detection of a first closed type where a gradient change is detected only from the first region, the controller is further configured to display a first image indicating the execution screen-related information on the third region,
   wherein upon detection of a second closed type where a gradient change is detected from the first and second regions, the controller is further configured to display a second image indicating the execution screen-related information, on the fourth region, and
   wherein the first image is different from the second image.

4. The mobile terminal of claim 3, wherein upon detection of the first closed type, the controller is further configured to activate the fourth region, and
wherein when a drag input toward the fourth region from the third region is applied to the first image, the controller is further configured to change a size or a shape of the first image along a path of the drag input to thus extend up to the fourth region, and execute a function corresponding to the first image.

5. The mobile terminal of claim 3, wherein upon detection of the first closed type, the controller is further configured to activate the fourth region, and
wherein when a function corresponding to the first image is performed in the first closed type, the controller is further configured to display, on the fourth region, a third image associated with the execution of the function corresponding to the first image.

6. The mobile terminal of claim 1, further comprising:
a wireless communication unit configured to transmit and receive a message,
wherein the controller is further configured to display a message transceived through the wireless communication unit on the first and second regions in the open state, and
wherein when a folding event occurs on the touch screen when a written message has not been sent, the controller is further configured to display an icon for sending the written message on one of the third and fourth regions, based on a closed type corresponding to the folding event.

7. The mobile terminal of claim 1, wherein when the folding event occurs when at least one task is being performed on the execution screen, the controller is further configured to display a first icon indicating that the task is being performed, on one of the third and fourth regions, and change the first icon into a second icon when the task is completed.

8. The mobile terminal of claim 1, wherein the controller is further configured to block input of a control command applied to the third and fourth regions during the folding event, and
wherein when the open state is converted into the closed state based on the folding event, the controller is further configured to activate one of the third and fourth regions and release the blocking, based on a closed type corresponding to the folding event.

9. The mobile terminal of claim 1, wherein the fourth region disposed on the side surface extends from the third region and has a predetermined curvature, and
wherein when a folding event occurs on the touch screen, the controller is further configured to display information on the execution screen on the third region and part of the fourth region along the curvature, or only on the fourth region, based on a closed type corresponding to the folding event.

10. The mobile terminal of claim 1, wherein when an event occurs from at least one application in the open state, the controller is further configured to output an alarm informing the event,
wherein when a drag input toward the fourth region from the first region is applied to one side of the first region in response to the alarm, the controller is further configured to execute a first function related to the event, and
wherein when the drag input applied to one side of the first region is ended within the first region, the controller is further configured to execute a second function related to the event.

11. The mobile terminal of claim 10, wherein when the open state is converted into the closed state in response to the alarm, the controller is further configured to display an image object related to processing of the event, to one of the third and fourth regions, and
wherein when a drag input applied to the image object is out of a reference range, the controller is further configured to execute a third function related to the event.

12. The mobile terminal of claim 1, wherein when a touch input is not applied to one of the third and fourth regions where information on the execution screen has been displayed, for a preset time in the closed state, the information disappears, and
wherein when an opening event occurs in the closed state, the controller is further configured to re-display the disappeared information or display other information on one of the third and fourth regions.

13. The mobile terminal of claim 12, wherein when the opening event occurs in a first closed state where the first region is folded to cover the second region, the controller is further configured to display information on the execution screen or other information on the execution screen on the third region, and
wherein when the opening event occurs in a second closed state where the fourth region is exposed to an upper side and the first region faces the second region, the controller is further configured to display information on the execution screen or other information on the execution screen on the fourth region.

14. The mobile terminal of claim 13, wherein when a touch input is applied to the fourth region in the second closed state, the controller is further configured to display icons of applications corresponding to the execution screen based on a point where the touch input has been applied.

15. The mobile terminal of claim 1, wherein when the open state is converted into the closed state in response to the folding event, and when the closed state is re-converted into the open state when a touch input applied to one of the third and fourth regions where the information has been displayed is maintained, the controller is further configured to re-display a previously-output execution screen on at least one of the first and second regions, and control a screen change due to execution of a function corresponding to the touch input, to be displayed on the execution screen.

16. The mobile terminal of claim 1, wherein when the closed state corresponding to the folding event is a second closed type where the fourth region is exposed to an upper side and the first region faces the second region, the controller is further configured to sense a plurality of touch inputs applied to the fourth region, and
wherein when an opening event occurs in the second closed state, the controller is further configured to convert a locked state of the mobile terminal into a released state, according to whether the plurality of sensed touch inputs match a preset pattern or not.

17. The mobile terminal of claim 16, wherein the fourth region is divided into a plurality of virtual regions,
wherein the plurality of virtual regions are generated based on an initial touch input applied to the fourth region, and
wherein the plurality of touch inputs correspond to touch inputs sequentially applied to at least one region in a preset order, the at least one region corresponding to the preset pattern among the generated virtual regions.

18. The mobile terminal of claim 16, wherein among the plurality of touch inputs applied to the fourth region, the controller is further configured to ignore a touch input detected when the opening event occurs, or a touch input which has been detected before occurrence of the opening event to thus be maintained during the opening event.

19. The mobile terminal of claim 18, wherein when the mobile terminal is converted into the released state, the controller is further configured to display icons of applications corresponding to the released state, on the fourth region, and
   wherein when the open state corresponding to the opening event is a first open type where only the first region has been unfolded, the controller is further configured to display, on the first region, screen information indicating events generated from applications corresponding to the released state,
   wherein when the open state corresponding to the opening event is a second open type where only the second region has been unfolded while the fourth region is exposed to an upper side, the controller is further configured to display, to the second region, an execution screen of one of applications corresponding to the released state, and
   wherein when the open state corresponding to the opening event is a third open type where both the first region and the second region have been unfolded, the controller is further configured to display screen information indicating the event, and an execution screen of one of applications corresponding to the released state.

20. The mobile terminal of claim 1, wherein the fourth region includes a fingerprint recognition sensor, and
   wherein when an opening event occurs in the second closed state where the first region and the second region face each other and the fourth region is exposed to an upper side, the controller is further configured to perform a user authentication by activating the fingerprint recognition sensor, and convert a locked state into a released state based on a result on the user authentication.

21. The mobile terminal of claim 20, wherein when an opening event occurs in the second closed state where the first region and the second region face each other and the fourth region is exposed to an upper side, the controller is further configured to display icons of executable applications on the fourth region, and
   wherein when an angle between the first region and the second region is equal to or more than a reference value, when a touch input applied to one of the icons has been maintained, the controller is further configured to display, on the fourth region, additional information on an application corresponding to the selected icon.

22. The mobile terminal of claim 1, wherein the third region includes a fingerprint recognition sensor, and
   wherein when a touch event is detected from the third region in the first closed state where the first region is folded to cover the second region, the controller is further configured to perform a user authentication by activating the fingerprint recognition sensor, and convert a locked state into a released state based on a result on the user authentication, and
   wherein when the first closed state is converted into the second closed state where the fourth region is exposed to an upper side and the first region and the second region face each other, the controller is further configured to display information on the execution screen on the third region, and
   wherein when the third region is unfolded by a predetermined angle, the controller is further configured to display a scroll bar on the fourth region, the scroll bar for scrolling information output to the third region.

23. The mobile terminal of claim 1, wherein when an event occurs in the first closed state where the first region is folded to cover the second region, the controller is further configured to display a notification icon indicating the event on the third region, and execute a different function according to a drag direction of a touch input applied to the notification icon.

24. The mobile terminal of claim 1, further comprising:
   a camera disposed on the outer surface,
   wherein when the camera operates in the open state, the controller is further configured to display a first captured image corresponding to a first capturing mode to at least one of the first and second regions,
   wherein when the closed state corresponding to the folding event is a first closed state where the first region covers the second region, the controller is further configured to convert the first capturing mode into a second capturing mode, and display a second captured image corresponding to the second capturing mode to the third region.

25. The mobile terminal of claim 24, wherein in one of the first capturing mode and the second capturing mode, when the open state or the first closed state is converted into the second closed state where the fourth region is exposed to an upper side and the first region and the second region face each other, the controller is further configured to display, on the fourth region, execution icons for sharing at least one of the first captured image and the second captured image.

26. The mobile terminal of claim 1, wherein the controller is further configured to display screen information corresponding to conversion of a locked state into a released state to at least one of the first and second regions, and
   wherein when the open state is converted into the closed state corresponding to the folding event and a preset time lapses, the controller is further configured to re-convert the released state into the locked state, and
   wherein when a touch input corresponding to the folding event is maintained even in the closed state, the controller is further configured to maintain the released state.

27. The mobile terminal of claim 1, wherein when an event occurs from at least one application in the open state, the controller is further configured to output guide information for inducing the closed state to the first region, and
   wherein when the event is ended in the closed state, the controller is further configured to output guide information for inducing the open state to at least one of the third and fourth regions.

* * * * *